United States Patent [19]
Helterbrand et al.

[11] Patent Number: 6,021,213
[45] Date of Patent: Feb. 1, 2000

[54] AUTOMATIC CONTEXTUAL SEGMENTATION FOR IMAGING BONES FOR OSTEOPOROSIS THERAPIES

[75] Inventors: Jeffrey Donald Helterbrand, Indianapolis; Richard Earl Higgs, Jr., New Palestine; Philip Wayne Iversen, Indianapolis, all of Ind.

[73] Assignee: Eli Lilly and Company, Indianapolis, Ind.

[21] Appl. No.: 08/662,391

[22] Filed: Jun. 13, 1996

[51] Int. Cl.⁷ ........................................................ G06K 9/00
[52] U.S. Cl. ............................................. 382/128; 382/257
[58] Field of Search ..................... 382/128, 131, 382/132, 173, 180, 256, 257, 270; 128/922

[56] References Cited

U.S. PATENT DOCUMENTS

| | | | |
|---|---|---|---|
| 5,187,658 | 2/1993 | Cline et al. | 364/413.13 |
| 5,361,763 | 11/1994 | Kao et al. | 128/653.2 |
| 5,740,266 | 4/1998 | Weiss et al. | 382/128 |
| 5,832,134 | 11/1998 | Avinash et al. | 382/257 |
| 5,835,619 | 11/1998 | Morimoto et al. | 382/132 |
| 5,859,891 | 1/1999 | Hibbard | 378/62 |

*Primary Examiner*—Andrew W. Johns
*Attorney, Agent, or Firm*—Baker & Daniels

[57] ABSTRACT

An automatic contextual segmentation method which can be used to identify features in QCT images of femora, tibiae and vertebrae. The principal advantages of this automatic approach over traditional techniques such as histomorphometry are, 1) the algorithms can be implemented in a fast, uniform, non-subjective manner across many images allowing unbiased comparisons of therapeutic efficacy, 2) much larger volumes in the region of interest can be analyzed, and 3) QCT can be used longitudinally. Two automatic contextual segmentation algorithms relate to a cortical bone algorithm (CBA) and a whole bone algorithm (WBA). These methods include a preprocessing step, a threshold selection step, a segmentation step satisfying logical constraints, a pixel wise label image updating step, and a feature extraction step; with the WBA including whole bone segmentation, cortical segmentation, spine segmentation, and centrum segmentation. The algorithms are constructed to provide successful segmentations for known classes of bones with known topological constraints.

52 Claims, 10 Drawing Sheets

Microfiche Appendix Included
(6 Microfiche, 10 Pages)

FIG_ 6

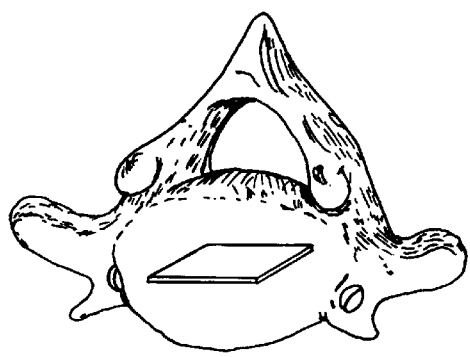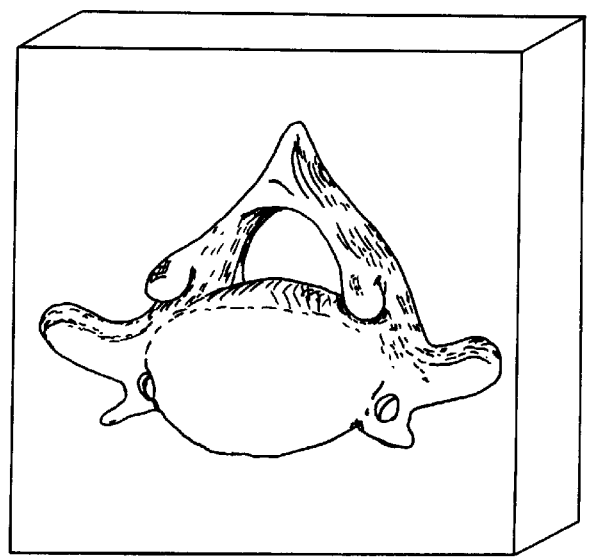
FIG. 11

AUTOMATIC CONTEXTUAL SEGMENTATION FOR IMAGING BONES FOR OSTEOPOROSIS THERAPIES

SOURCE CODE APPENDIX

This application includes two appendixes having (A) 36 and (B) 19 pages. A portion of the disclosure of this patent document contains material which is the subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to image analysis with the conceptual interpretation of features identified in complex scenes. More specifically, the field of the invention is bone imaging.

2. Prior Art

Image segmentation is used to identify relevant features in an image of body tissue such as an x-ray, MRI, or ultrasonic image. The data are gray levels, or a finite set of colors, on a rectangular lattice of picture elements (pixels), and correspond to digitized values of radiated intensity from some photochemical or photoelectric sensor. Image segmentation algorithms are used in the context of classification where the entities to be classified are pixels or groups of pixels. These algorithms assign to each pixel a unique number (label) representing membership to a set of pixels that define an object or region in the image. Image segmentation has applications in photon emission tomography, magnetic resonance imaging, remote sensing by satellites, and object/background discrimination.

There are three requirements of a good image segmentation technique:

1) Each resulting segmented region or pixel group should be as homogeneous as possible-typically in terms of pixel intensities;

2) Pixels in different regions should be non-homogeneous; and

3) The resulting groups should have some scene-specific meaning, such as objects, background, etc.

A text by Schalkoff (Schalkoff, R. J., *Digital Image Processing and Computer Vision*. Wiley, N.Y., 1989), which is incorporated by reference herein, separates segmentation algorithms into two classes. In noncontextual segmentation, spatial relations among pixels or regions are ignored; though often computationally efficient, the performance of these techniques is adversely affected by noise in the image recording process and multiple features of similar intensity included in a scene. In contextual segmentation, the segmentation process employs neighboring relations among pixels and regions. Contextual classification is often more successful in fulfilling the three goals above because the local image information typically reinforces a classification decision.

SUMMARY OF THE INVENTION

The present invention involves automatic contextual segmentation methods which can be used to identify features in QCT images of femora, tibiae, and vertebrae. The fully automated contextual spatial segmentation method accurately classifies pixels from proximal tibiae, femora, and vertebrae images into background, cortical, marrow/trabecular, spine, and centrum regions such that the resulting segmentations satisfied logical constraints. An example of an important logical constraint for femora and tibiae is that the pixel group defining cortical bone must form a spatially connected region that completely surrounds the marrow/trabecular bone region. For vertebrae, an analogous constraint is that the spinal region is surrounded by completely connected cortical and marrow/trabecular regions. The inventional method constructs a label image (i.e., an image where each pixel is labeled according to its group membership) based on the data of the observed image as well as a priori information (i.e., the logical constraints). Measurements based on extracted features from the segmented image and intensity data from the original image are used for statistical analyses comparing standard and experimental therapies.

The principal advantages of this automatic approach over traditional techniques such as histomorphometry are, 1) the algorithms can be implemented in a fast, uniform, non-subjective manner across many images allowing unbiased comparisons of therapeutic efficacy, 2) much larger areas in the region of interest can be analyzed, and 3) QCT can be used longitudinally. Two contextual segmentation methods of the invention have been applied in a project to compare the effects of long-term dosing of standard and experimental therapies on non-reproductive tissues of ovariectomized rats. The experimental therapies are clinically important agents that are available or will soon be available to treat women for post-menopausal osteoporosis. After ten months of dosing, lumbar (L-4) vertebrae and proximal tibiae were examined for all treated rats. A cross-section of the left proximal tibia was imaged using a 960A pQCT (Norland/Stratec, Ft. Atkinson, Wis.). This device was also used to image a slice of the L-4 vertebrae.

One complicating factor for automatic segmentation is the presence of partial volume averaging near region transitions due to the low resolution of the QCT instrument. The contextual segmentation methods of the invention have been used succesfully on over 600 images of array dimension 128×128. In each instance, the final segmentations have satisfied the required logical constraints. Inspection of the visual quality of the resulting segmentations reports a success rate in excess of 99%.

The automatic contextual segmentation methods of the invention use intensity threshold selection techniques and morphological operations of the type commonly found in the image processing literature (such as in the Schalkoff text). A cortical bone algorithm (CBA) accurately segments femur and tibia QCT images. A whole bone algorithm (WBA) provides extra flexibility for segmenting QCT images of vertebrae as well as femora and tibiae.

The present invention relates to a computer implemented image processing method that identifies and measures distinct portions of an image representing a particular anatomical region which is examined for medical diagnosis. The method includes several steps, starting with an initial step of converting a single or multiple recordings into an array of pixel values. After a pixel value array representing the image is created, a threshold value for the distinct portions of the image is selected for identifying the anatomical region. The threshold value is used to perform multiple dilations and/or region growing operations are performed on the array of pixel values until the identified region satisfies the logical constraints of the anatomical region. Once the logical constraints are satisfied, each pixel in the array is given a region affiliation according to its initial intensity value and the identified region to designate whether the pixel is part of the anatomical region or another region, taking into account possible variations introduced by the dilation and/or region growing steps. The resulting map of pixels with region affiliations allows for the calculation of region dimensions and areas, for uniform statistical analysis.

One aspect of the invention relates to the segmentation of femora and tibiae bones, later referred to as the Cortical Bone Algorithm (or CBA). In the CBA, the image has three regions which are identified: background, cortical bone, and marrow/trabecular regions. The cortical bone region has the logical constraint that it must be spacially connected and surround the marrow/trabecular region, so that background and marrow/trabecular pixels may not be adjacent each other. This logical constraint may be implemented by designating a protected "fence" of cortical bone pixels which are not allowed to be changed during any of the dilation or region growing operations.

Another aspect of the invention relates to the segmentation of femora, tibiae, and vertebra bones, later referred to as the Whole Bone Algorithm (or WBA). In the WBA, the image has background and "whole bone" regions. The "whole bone" region includes cortical and non-cortical regions, with the cortical region defining a marrow/trabecular sub-region with the non-cortical regions having spine and centrum sub-regions. The cortical region is identified using a process similar to the CBA process. Once the marrow/trabecular sub-region is identified, the spinal region is initially determined by every pixel that is below the threshold value, with those pixels being subject to region growing operations to form a spacially connected spinal region within the marrow/trabecular region. This spinal region is then used to identify the centrum region as adjacent the spinal region and bounded by the cortical region and eigenvectors determined by the spinal region. The identified regions can be used to measure the area of those regions, and the pixel intensities within the regions may be used to determine mineral density or content in those regions.

The invention also relates to an image processing system for identifying and measuring distinct portions of an image representing a target anatomical region which is examined for medical diagnosis. The system includes a medical imaging device capable of providing image data relating to the target anatomical region. The system also includes a computer having a processor and a program, with the program including instructions enabling the computer to perform contextual segmentation on the image data, and instructions enabling the computer to calculate characteristics of the target anatomical region based on the image data and a statistical compilation of previous image data.

BRIEF DESCRIPTION OF THE DRAWINGS

The file of this patent contains at least one drawing executed in color. Copies of this patent with color drawings will be provided by the U.S. Patent and Trademark Office upon request and payment of the necessary fee.

FIG. 11 is a perspective view of a vertebrae bone.

DESCRIPTION OF THE EXEMPLARY EMBODIMENTS

Figure 12:
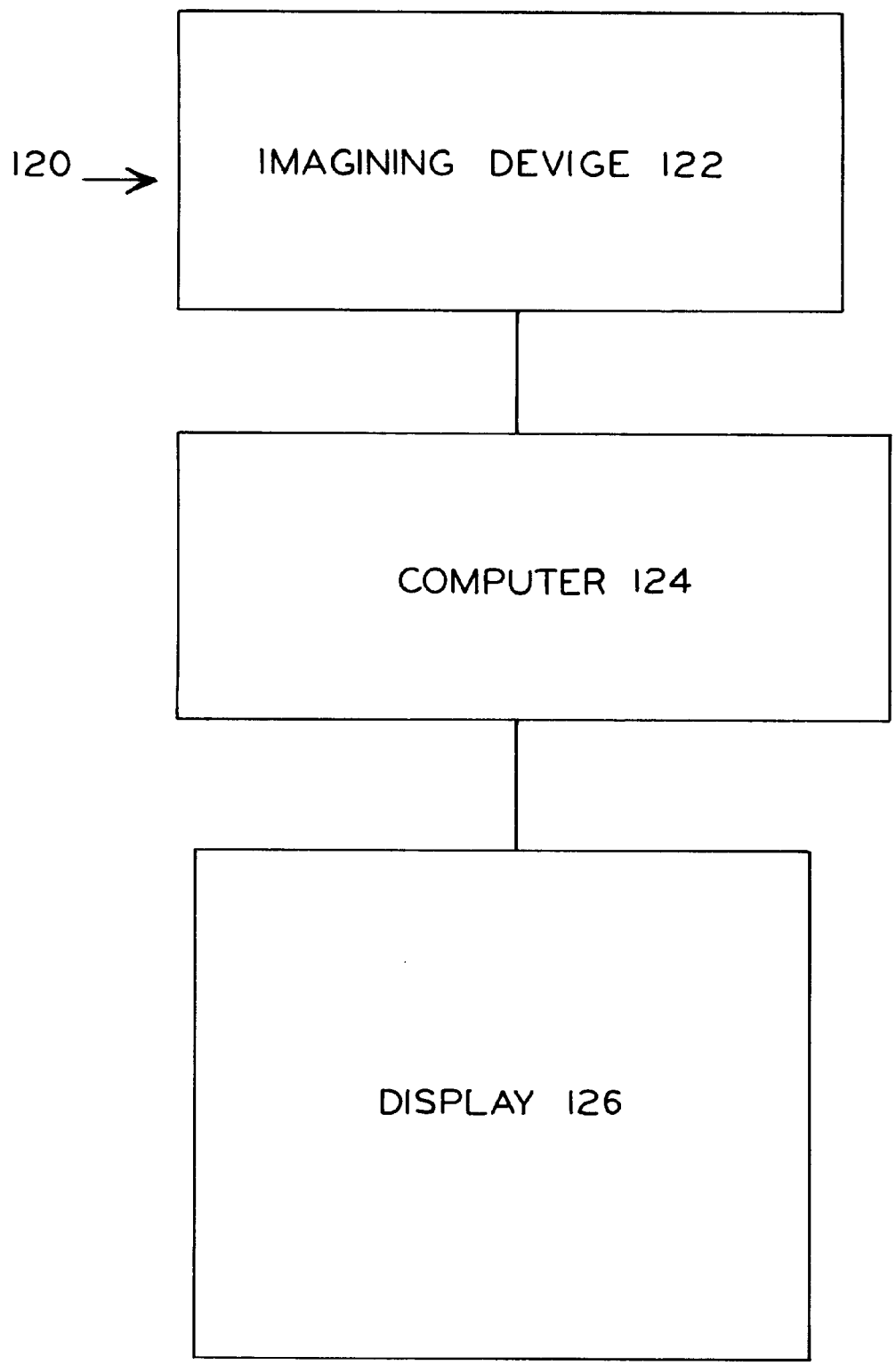
FIG. 12 is a schematic diagram of an apparatus of the present invention.

A schematic arrangement of the system of the present invention is illustrated in FIG. 12. Image processing system 120 includes imagining device 122, computer 124, and display device 126. Imaging device 122 may be a suitable medical imaging apparatus for obtaining an image of body tissue, such as an x-ray, MRI, or ultrasonic image machine. Computer 124 may be a general purpose computer with a specific program (such as the programs in the source code appendixes), or alternatively, computer 124 may be implemented as a dedicated computer with specific programming embedded in its memory, or as a discrete device implementing the functionality described below. Display device 126 may be a video monitor, a printer, or other output device capable of providing a visual image, alternatively if system 120 is used purely for measurement purposes, display device 126 may be a printer, LCD device, or audio speaker. Computer 124 executes certain algorithms on data supplied by imaging device 122 to provide outputs such as visual displays or printouts, as well as measurements and other analysis as described in greater detail below.

The threshold selection techniques and morphological operations used in the CBA and WBA algorithms are variants of those commonly found in the image processing literature (see e.g., Schalkoff, 1989).

The goal of thresholding is to produce a binary image from a gray-scale image by setting all pixels with an intensity greater than a selected threshold value to one and all other pixels to zero. Frequently, this operation is performed to identify regions of interest. Threshold value selection is based on the histogram of pixel intensities. When large features with different ranges of intensity values are present in an image the intensity histogram is multimodal. There are a variety of methods for selecting meaningful threshold values for an application including the use of a priori information (e.g., different tissues register different intensities on QCT images), the use of training images, or derivative-based histogram threshold selection techniques performed on an image by image basis with the goal of selecting a threshold between two modes of the histogram representing regions to be distinguished in an image. The major disadvantage of histogram-based threshold selection is that spatial information of pixel location is ignored and hence thresholding alone rarely results in a segmentation that succeeds in completely identifying the regions of interest. One method to incorporate spatial information and potentially gain additional separation between the modes of the intensity histograms is to linearly convolve the image with a spatial filter prior to histogram-based threshold selection.

The key morphology tools used in the CBA and the WBA are erosions, dilations, and region growing. For a detailed description of these tools, see the Russ text (Russ, J. C., *The Image Processing Handbook*. CRC Press Inc, 1992.) which is incorporated by reference herein.

Briefly, erosions and dilations are typically neighbor operations applied to binary images. The operations simply add (dilate) or remove (erode) pixels from the group of pixels with an intensity value equal to one (i.e., lit pixels) according to certain rules, which depend on the pattern of neighboring pixels. Each operation is performed individually on each pixel in the original image.

Erosion turns off lit pixels. In the CBA and the WBA, classical erosion is used, where any lit pixel with an adjacent unlit pixel is unlit. The definition of adjacent is important in application. In some instances adjacent pixels are defined as only those pixels vertically or horizontally adjacent to the target pixel. This is referred to as the set of four-neighbors. In other instances, the set of adjacent pixels also includes diagonally adjacent pixels. This is referred to the set of eight-neighbors. Topologically and in implementation, the four-neighbor/eight-neighbor distinction is critical; for brevity, we will not make this distinction in the following descriptions.

As a complement to erosion, dilation can be used to add pixels. The classical dilation rule lights a previously unlit pixel if the pixel is adjacent to lit pixels.

Region growing is a slightly more complex morphological operation that utilizes dilation to group pixels that satisfy similarity criteria and are spatially contiguous. Region growing begins by starting at a seed pixel location, neighboring pixels are examined one at a time and added to the growing region if they are sufficiently similar. The procedure continues until no pixels can be added to the group. After one region is completely defined, a new region is started based on a new seed location that has yet to be labeled. In the CBA and the WBA, binary images of interest are defined and region growing is used to identify and label contiguous regions.

With this basic discussion of threshold detection techniques, the methodology of the invention may be better understood.

The Cortical Bone Algorithm (CBA)

The CBA was developed to successfully segment femora and tibiae. The first step of the algorithm combines preprocessing, intensity thresholding, and morphology steps to identify the cortical bone region of interest. The morphological operations segment the image space into initial background, cortical bone, and marrow/trabecular regions that adhere to the a priori logical constraints. The initial region estimates are primarily intensity-based and the use of image morphology may misclassify pixels in an effort to obtain a permissible (defined as adherence to all relevant logical constraints) segmentation. Thus, the CBA next uses pixelwise updating to allow pixels to change region affiliation based on local intensity information in order to refine the segmentation while maintaining logical constraints.

The CBA uses the following five processing steps to segment digitized QCT images:
1. preprocessing
2. threshold selection
3. initial cortical segmentation that satisfies all logical constraints
4. pixelwise label image updating to obtain a final segmentation
5. feature extraction Preprocessing The preprocessing steps for the CBA involve creating a linearly scaled version of the original image with all original pixel intensities less than or equal to zero set to zero, the maximum original pixel intensity set to 255, and all other pixels linearly scaled between zero and 255. This action is reasonable based on the properties of the recording instrument since negative values are an artifact of the back projection algorithm used to construct the raw image from multiple x-ray scans and most likely correspond to low pixel intensities.

Threshold Selection

For the CBA, the underlying philosophy is to partition high intensity pixels that most likely correspond to the cortical bone from the remainder of the image space. This is a rational approach since the major constraint for femora and tibiae is that the pixel group defining cortical bone must form a spatially connected region that completely surrounds the entire marrow/trabecular bone region. The validity of any final estimate will concentrate on the properties of the cortical region.

For the CBA, based on training images, it was found that using the 50th-percentile of the intensity range of the preprocessed image performed well as an initial cortical threshold. However, an additional suitability criterion is incorporated in the CBA to examine the suitability of the final label estimate and possibly adaptively adjust the cortical threshold. The suitability of a final label estimate is assessed by counting the number of cortical pixels that have both background and trabecular/marrow pixels adjacent to them and have intensities below the cortical threshold; these pixels are hence being classified as cortical only to maintain permissibility. If over, say, 5% of the classified cortical pixels are in this subset, the cortical threshold can be adaptively lowered and a new label estimate produced. This procedure continues until the suitability criterion is met. This adaptive thresholding step of the algorithm has rarely been necessary in application.

Figure 1A:
FIGS. 1A–1E are images of a rat tibia from a QCT scan as modified in the CBA.
Figure 1B:
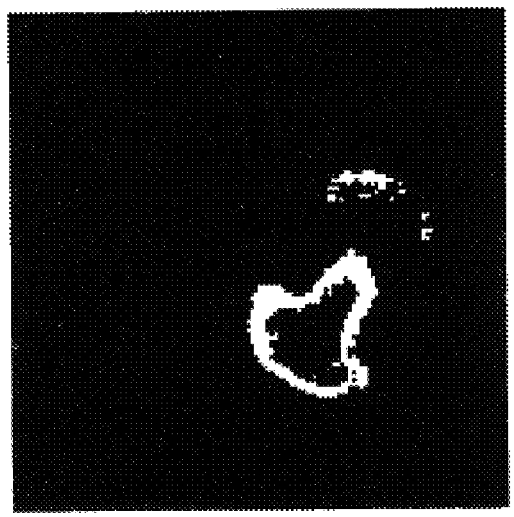

A sample, low resolution (128×128 pixels) rat tibia along with the resulting binary image after cortical thresholding are shown in FIGS. 1A and 1B, respectively.

Initial Cortical Segmentation

In general, for the CBA, after thresholding is performed the desired region of interest (the cortical region of the femur or tibia) is not yet accurately identified. Reasons include the presence of additional bones observed in the image space, noise in the image recording process, and classification errors based on the threshold used. Additionally, the cortical region identified by thresholding alone usually does not satisfy the constraint that the group forms a spatially contiguous region that completely surrounds a group of unlit pixels that may serve as an initial estimate of the marrow/trabecular region. Using image morphology, the CBA segments the image space into three regions to satisfy the logical constraint:

1. Background: defined as the true background as well as pixels defining bones that are not of interest 2. Cortical bone: a spatially connected region that completely surrounds the entire marrow/trabecular region 3. Marrow/Trabecular region: A spatially connected region of unlit pixels that is completely surrounded by the cortical bone region.

To begin, dilation is performed three times (in the 128×128 QCT examples presented; more iterations would be required for higher resolution applications) on the cortical bone region defined by the threshold algorithm; this step agglomerates small sets of contiguous lit pixels in order to protect the procedure from failing due to small gaps of unlit pixels impeding the generation of a reasonable initial cortical region. After this step, region growing is performed to identify and label all spatially contiguous lit regions. Since there is only one cortical region for the femur and tibia bones, only the largest lit region is extracted and pixels belonging to all other lit regions are unlit. The other previously lit pixels are assumed to belong to small bones that are not of interest in the image or non-bone pixels that were erroneously classified as bone due to noise.

This technique usually, but not always, results in one spatially connected cortical region that partitions the background space into two contiguous regions; again using region-growing and their spatial relationship to the cortical bone region these regions can be identified and labeled as background and marrow/trabecular. In the few instances when this technique fails, the algorithm includes a provision for additional dilations to be performed prior to region growing. One concern with continual dilations is that all original non-cortical bone pixels that eventually will be deemed marrow/trabecular may become lit and thus an image will result with one completely solid cortical bone estimate and one background region. To account for this, a cortical centroid finding technique is included to assist in identifying a set of pixels that cannot become cortical during the dilation step; this technique maintains at least a seed from which to refine the marrow/trabecular region in future stages of the algorithm. This cortical centroid finding algorithm was rarely required in application.

Figure 1C:
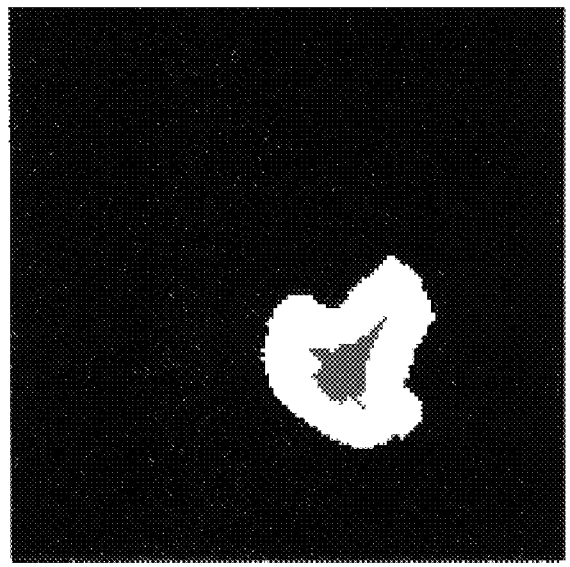

The initial background, cortical, and marrow/trabecular segmentation after initial cortical segmentation is shown in FIG. 1C for the example rat tibia.

Pixelwise Label Image Updating

At this stage of the CBA, reasonable initial label estimates have been constructed such that the labelings are permissible. The goal at this stage is to refine these label estimates. Note that although the initial estimates are primarily intensity-based, the use of image morphology may misclassify pixels in an effort to obtain a permissible segmentation. The goal of this stage of the algorithm is to allow pixels to change region affiliation based on local intensity information yet maintain the desired permissibility.

The use of dilations in the above step of the CBA is used to obtain a permissible cortical region. However, blindly dilating the cortical region without regard to intensity information typically adds several pixels to the cortical region that should actually be classified as background or marrow/trabecular bone. At this stage the algorithm attempts to correctly reclassify these pixels based on local intensity information and identified thresholds yet maintain the necessary connectedness requirement.

To accomplish this, pixelwise updating near label transitions in the label image is used. More specifically, a target pixel is considered for reclassification if one of its adjacent neighbors, say neighbor S, has a different classification in the current estimate. The target pixel is reclassified to the label of neighbor S if its intensity information falls on the same side of the intensity threshold as neighbor S; otherwise the target pixel keeps its current label. After updating the target pixel, a new target pixel is selected for possible reclassification. This updating step is continued until no updating of the boundary occurs in one full pass of the boundary.

In the CBA, target pixels on the boundary between cortical and marrow/trabecular regions are first considered for reclassification. In order to ensure the logical constraint that no marrow/trabecular pixel can be adjacent to a background pixel, during the first marrow/trabecular/cortical boundary updating iteration, a set of cortical pixels are not allowed to change region affiliation. This 'fence' of fixed cortical bone pixels is constructed by dilating the background region the same number of times as is used in the original morphology step and not allowing these pixels to change region affiliation. After cortical vs. marrow/trabecular updating, the fence is removed and a new fence is placed on the cortical pixels with adjacent marrow/trabecular neighbors prior to starting updating on the boundary between the cortical and background region. The fence technique ensures that the final cortical region will not yield adjacent marrow/trabecular and background pixels. Following cortical/background boundary updating, another pass of marrow/trabecular/cortical boundary updating is performed with the fence constructed only out of those cortical bone pixels with adjacent background neighbors. Note that through this updating scheme, it is possible that some extraneous pixels may be labeled as cortical bone but not remain connected to the final cortical region estimate. To complete the final updating step with a permissible labeling, region growing is performed and these pixels are reclassified to the region for which they are surrounded.

Figure 1D:
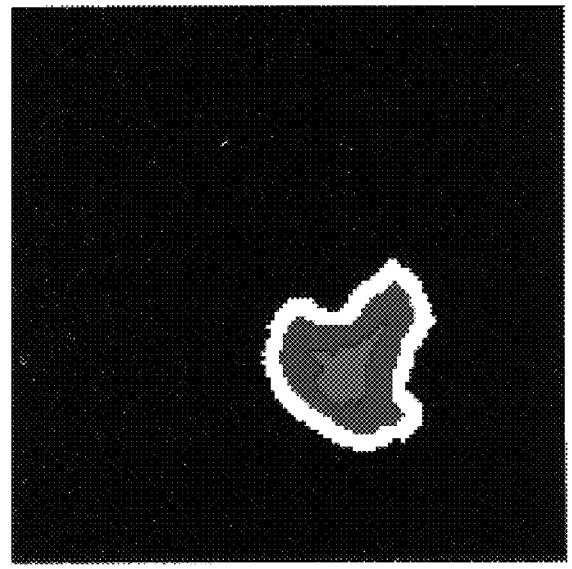
Figure 1E:
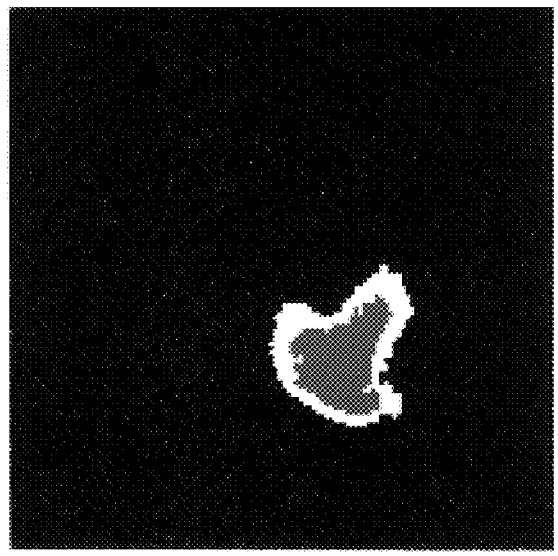

A segmentation including the 'fence' at the initialization of pixelwise label image updating (image D) and the final background, cortical, and marrow/trabecular segmentation (image E) after pixelwise label image updating is shown in FIGS. 1D and 1E for the example rat tibiae, respectively.

Implementation

Images were processed in batch mode using 16-bit signed binary files as inputs with outputs consisting of flat files for each final label estimate and a flat file containing all feature measurements of interest. An option was also available to extract binary and label images at various intermediate steps of the algorithm. For easy inspection, a summary booklet was produced containing each original image and its corresponding segmented image; using the PV-Wave visual data analysis software package (V 6.0).

The C code for the CBA took on average 6 seconds actual time per image on a Challenger Series SGI UNIX computer. The feature measurement files were imported into SAS-JMP for statistical analysis. The C code is included in the source code appendix A.

The Whole Bone Algorithm (WBA)

The WBA was developed to successfully segment femora, tibiae and vertebrae bones. The first step of the WBA combines intensity thresholding with morphological region growing to identify the whole bone region of interest. Next, a morphological erosion is performed to obtain a ring of pixels to use as an initial estimate of the cortical bone region. Intensity information and spatial proximity to the cortical ring are used to develop an index for the classification of pixels contained inside the cortical ring. This index combined with a selective cortical bone region growing algorithm are used to obtain a segmentation of whole bone pixels into two classes: cortical and non-cortical (e.g. marrow, trabecular, spine, centrum). For vertebrae, the spine region is identified using a threshold derived from an intensity histogram and a region growing algorithm. The centrum region of vertebrae is segmented using contextual and spatial information of the spine and marrow/trabecular regions.

The WBA uses the following six processing steps to segment digitized QCT images:
1. preprocessing
2. whole bone segmentation
3. cortical segmentation
4. spine segmentation (vertebrae only)
5. centrum segmentation (vertebrae only)
6. feature extraction Preprocessing The preprocessing steps for the WBA include making the following modification to the original image: a 3×3 Gaussian kernel convolved with the original image.

Figure 2:
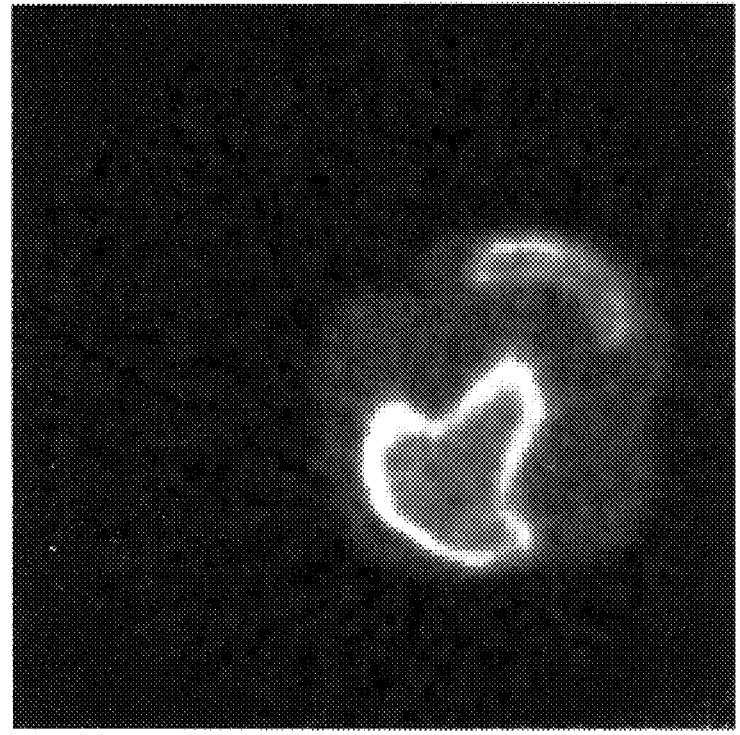
FIG. 2 is an image of a rat tibia from a QCT scan as modified in the WBA.

A sample, low resolution (128×128 pixels), rat tibia (image A) along with the filtered image (image B) are shown in FIGS. 1A and 2, respectively.

Whole Bone Segmentation

The objective of the whole bone segmentation step is to identify the region of interest (the entire bone region) for further segmentation. Specific areas of an image that are eliminated by this step include: background areas, tissue areas, smaller bones (e.g. proximal tibiae), and specimen mount areas (e.g. vertebrae).

Figure 3:
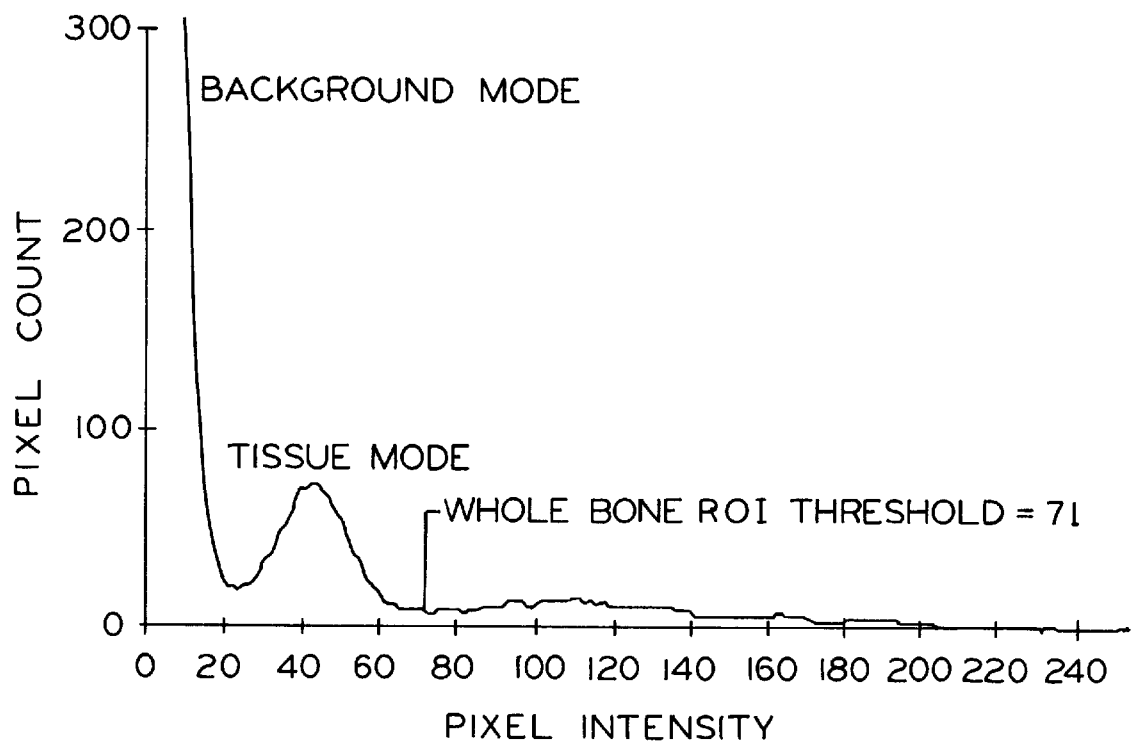
FIG. 3 is a histogram graph of rat tibia pixel intensities.
Figure 4:
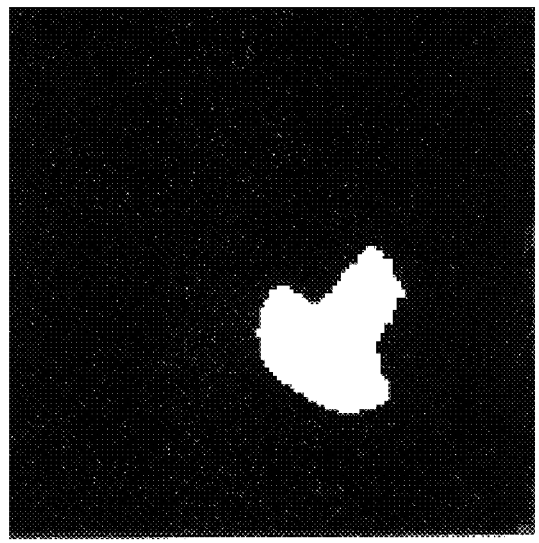
FIG. 4 is an image of a whole bone segment of a rat tibia.

The whole bone segmentation begins by analyzing the histogram of pixel intensities from the filtered, scaled image (image B). The filtered QCT image is used to provide a smoother histogram for automatic threshold selection. The histogram contains a mode attributed to the background area, a mode attributed to the tissue area, and a long tail attributed to the cortical, marrow/trabecular, and partial volume averaged pixels. The intensity histogram of the example rat tibia is shown in FIG. 3. For larger bones (e.g. cows), a mode attributed to high intensity cortical pixels may emerge. The intensity histogram is filtered using a moving average filter (order=10) and the first derivative of the smoothed histogram is used to locate the intensity level of the rightmost tail of the tissue mode. The algorithm determines the whole bone threshold by finding the pixel intensity where the derivative of the histogram has returned to zero (±0.1) from the tissue mode. This intensity level is used as the whole bone threshold. A binary image is then produced by setting all pixels with an intensity greater than the whole bone threshold to one and all other pixels to zero. A region growing operation is performed to segment the pixels above the threshold into spatially connected regions. Next, the interior holes of every object in the binary image are filled with an interior hole filling procedure. The object with the largest area, the whole bone region of interest (WBROI), is retained and all other objects (noise, smaller bones, specimen mount, etc.) are set to zero. The WBROI for the example rat tibia is shown in FIG. 4.

Cortical Segmentation

Figure 5:
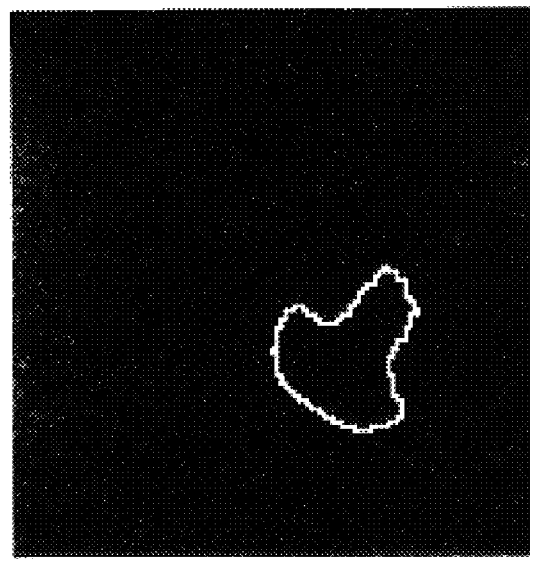
FIG. 5 is an image of a cortical ring of a rat tibia.

Given a whole bone region of interest, a segmentation is performed to automatically classify each WBROI pixel as either cortical or non-cortical. The first step in this process is to identify a boundary ring of pixels comprised of cortical pixels and partial volume average pixels of cortical and tissue. This cortical ring is obtained by subtracting an eroded copy of the WBROI from the WBROI. The cortical ring image for the example rat tibia is shown in FIG. 5.

To complete the cortical segmentation, the cortical ring is grown using a selective region growing algorithm using a pixelwise label updating algorithm similar to that described for the CBA algorithm. For each pixel inside the cortical ring a cortical index is computed based on the intensity of the pixel and the distance of the pixel to the cortical ring. The cortial index for a pixel at image location (i,j) is given by:

$$\text{CorticalIndex}(i, j) = \frac{\text{Intensity}(i, j)}{\text{RingDist}(i, j)^r}$$

where Intensity(i,j) is the intensity of pixel (i,j) and RingDist (i,j) is the minimum Euclidean distance from pixel (i,j) to the cortical ring.

The value of r is determined empirically and can be specified for different classes of bone (e.g. rats, cows, etc.).

The CorticalIndex of pixels inside the cortical ring tend to cluster into three groups: pixels that are very likely cortical, pixels that are most likely cortical, and a large group of pixels that are most likely not cortical. To determine a threshold for the CorticalIndex, the CorticalIndex was clustered into three classes using a k-means algorithm with initial cluster seeds set to the minimum, median, and maximum CorticalIndex value. The threshold value of the CorticalIndex is set to the minimum CorticalIndex value of all members of the cluster representing pixels that are most likely cortical. A selective region growing algorithm is then used in combination with the CorticalIndex threshold to classify pixels as cortical if they are touching the cortical region and their CorticalIndex exceeds the computed threshold value. The selective region growing operation is repeated until no additional pixels are added to the cortical region.

Figure 6:
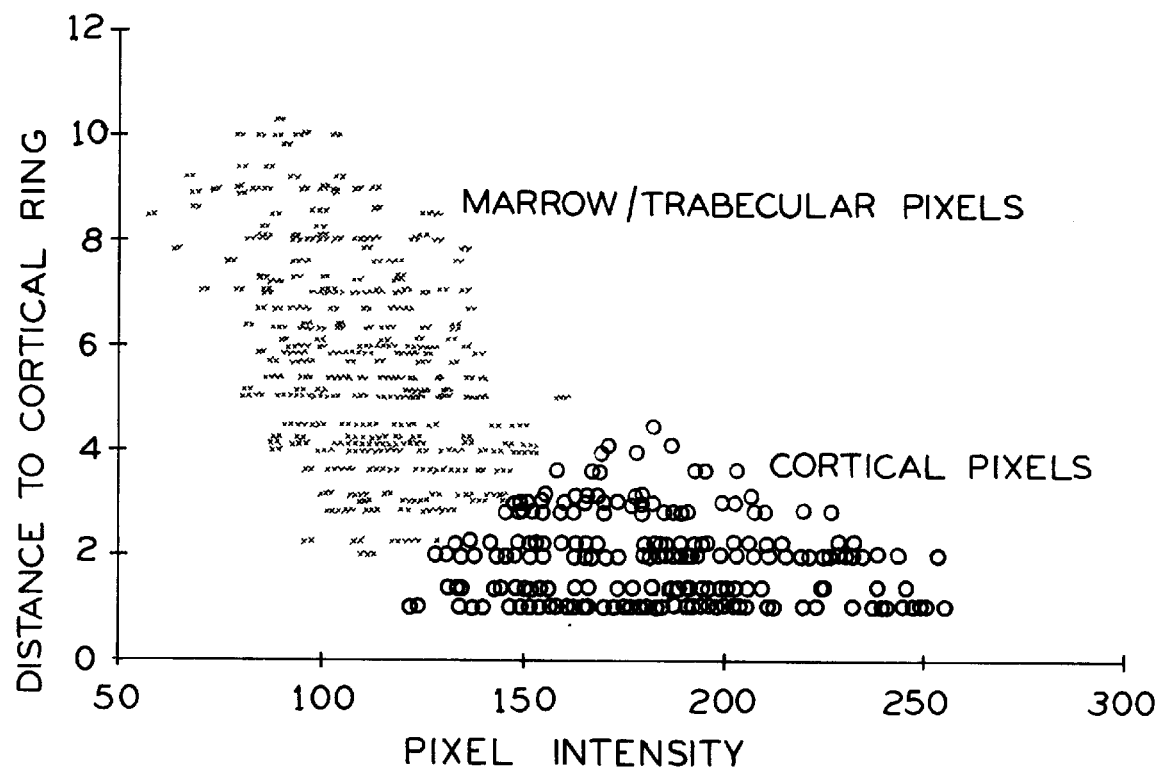
FIG. 6 is a graph showing classification results of pixels inside a cortical ring.
Figure 7:
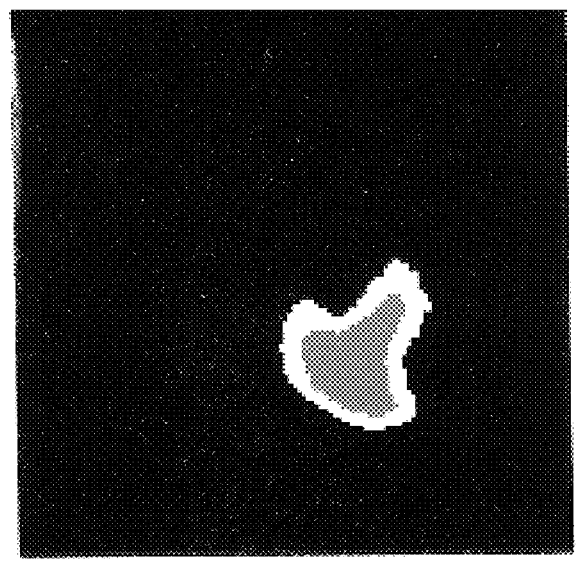
FIG. 7 is a segmented image of a rat tibia.

A plot of the pixel distance to the cortical ring versus pixel intensity for the example rat tibia is shown in FIG. 6. Pixels classified as cortical tend to be located in the lower right-hand portion of the plot (large intensity and small distance to cortical ring) while pixels classified as marrow/trabecular tend to be located in the upper left-hand portion of the plot (small intensity and large distance to cortical ring). The pixel classification resulting from the selective region growing algorithm is depicted in FIG. 7 with the cortical pixels shaded white and marrow/trabecular pixels shaded gray.

Spine Segmentation (Vertebrae Only)

For images of vertebrae, an additional segmentation of the marrow/trabecular region is performed to identify low density spinal pixels. The spinal ROI is determined by creating a binary image by setting any marrow/trabecular pixel with an intensity less than the WBROI threshold to one and all other pixels to zero. A region growing operation is performed to segment the pixels below the WBROI into spatially connected regions. The largest connected object is classified as the spinal segment of the image while all smaller objects are classified as marrow/trabecular.

Centrum Segmentation (Vertebrae Only)

Figure 8:
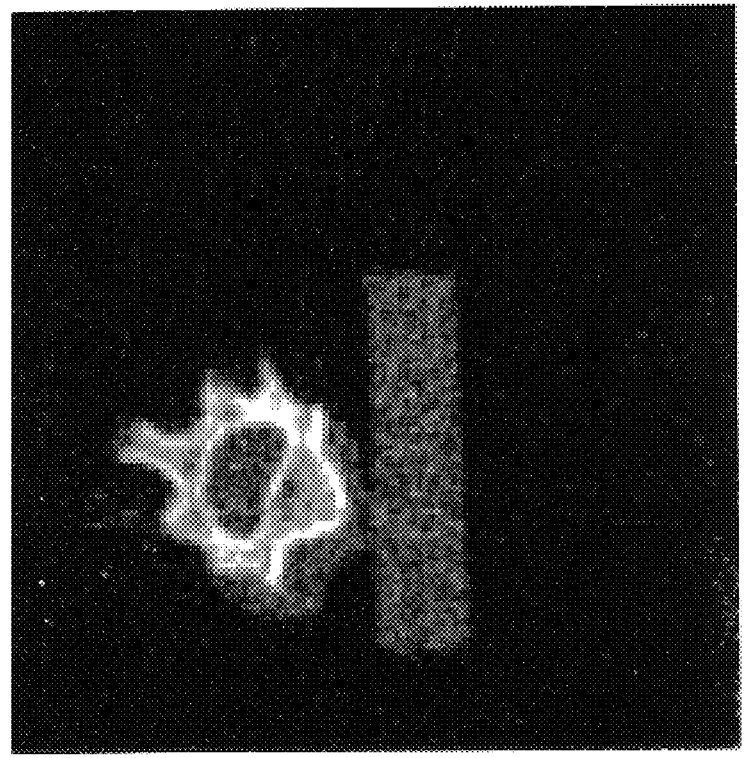
FIG. 8 is an image of a rat L4 vertebrae from a QCT scan.

For images of vertebrae, an additional segmentation of the marrow/trabecular region is performed to identify the centrum. A digitized QCT image of an example rat vertebra is shown in FIG. 8.

Figure 9:
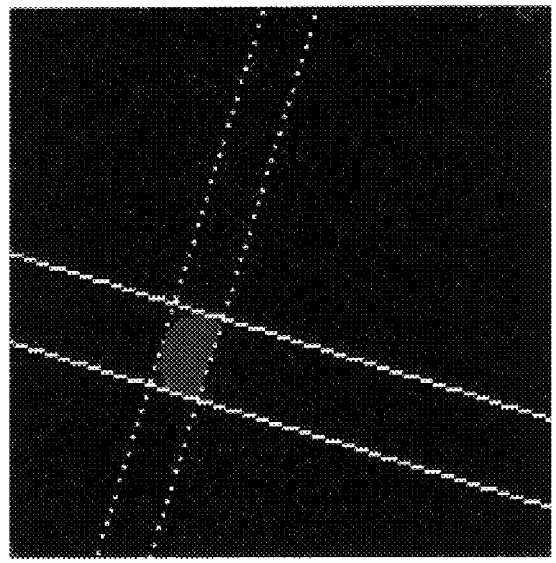
FIG. 9 is an image of the spinal region of FIG. 8 showing tangent eigenvectors.
Figure 10:
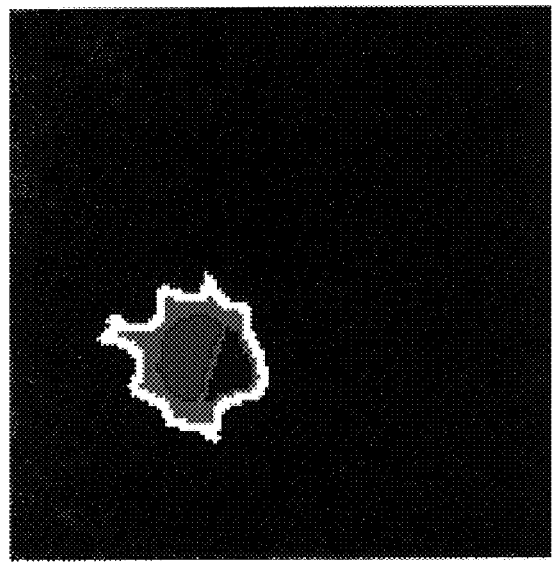
FIG. 10 is a segmented image of the rat L4 vertebrae of FIG. 8.

The spinal ROI is used by the algorithm as a landmark for locating the centrum. A 2×2 variance-covariance matrix ($\Sigma$) is generated using the x and y coordinates of the spinal ROI. The eigenvector corresponding to the largest eigenvalue of $\Sigma$ is in the direction of the major axis of the spine while the eigenvector corresponding to the smaller eigenvalue of $\Sigma$ is in the direction of the minor axis of the spine. Boundary lines are placed on the image by creating four lines tangent to the spinal region in the direction of the eigenvectors. A plot of the spinal region and the tangent eigenvectors for the example rat vertebra is shown in FIG. 9. Two candidate centrum ROIs are produced by the marrow/trabecular region bounded by the two rectangles formed by the boundary lines on either side of the major axis of the spine. Usually the larger bounded marrow/trabecular region is the centrum ROI. For images when this is not the case an algorithm parameter may be set to select the smaller candidate centrum ROI. A visual examination of all automatic image segmentations is recommended to protect against incorrect segmentations. For vertebrae, a visual inspection of the segmentation is required to correct any centrum segmentation errors. These visual inspections represent the only manual step in the entire segmentation process, contribute no bias to the segmentation, and provide a quality review to identify any outlier images or segmentations. The resulting segmentation of the example rat vertebra into cortical, marrow/trabecular, spine, and centrum regions is shown in FIG. 10.

Implementation

The automatic WBA was developed with the PV-Wave visual data analysis software package (version 6.00) installed on an HP9000/725-100 UNIX workstation running the HP-UX 10.01 operating system. For 128×128 QCT images less than 20 seconds are required to segment an image. The PV-wave source code is included in the source code appendix B.

Feature Extraction

For each region identified by either segmentation algorithm (cortical, marrow/trabecular, spine, and centrum) the following features are computed:

$N_{ROI}$—number of pixels $\bar{I}_{ROI}$—average pixel intensity $IMIN_{ROI}$—minimum pixel intensity $IMAX_{ROI}$—maximum pixel intensity $\overline{VMD}_{ROI}$—average volumetric mineral density (mg/cc)

$A_{ROI}$—cross sectional area (mm$^2$).

$BMC_{ROI}$—bone mineral content (mg)

Pixel intensity values are converted to volumetric mineral density using the following linear equation provided by the QCT manufacturer (Stratec in the exemplary embodiment).

$$VMD(i,j) = \max\{0, 0.982723 \text{Intensity}(i,j) - 229.0\}$$

The QCT manufacturer calibrated the instrument to hydroxylapetite and COMAC phantoms to obtain the equation for VMD(i,j).

The average volumetric mineral density for a region is calculated by $$\overline{VMD}_{ROI} = \frac{\sum_{(i,j) \in ROI} VMD(i,j)}{N_{ROI}}$$

The cross-sectional area of the region is calculated by the following equation for a pixel size of 0.148 mm×0.148 mm.

$$A_{ROI} = N_{ROI} 0.148^2$$

Bone mineral content was computed using the following equation for a voxel size of 0.148 mm×0.148 mm×1.2 mm.

$$BMC_{ROI} = 0.0012 \overline{VMD}_{ROI} A_{ROI}$$

The features from the segmented regions are then used for unbiased comparative analysis.

Comparing Segmentation Algorithms and Histomorphometry

Both automatic segmentation algorithms presented are guaranteed to converge to locally optimal (with respect to an entropy function) permissible label estimates since the pixelwise updating steps are analogous to iterated conditional modes (ICM). ICM approximates simulated annealing routines that are used in stochastic global optimization, as disclosed in the Besag article (Besag, J, "On the Statistical analysis of dirty pictures," *Journal of the Royal Statistical Society*: Series B, 48:259–279, 1986) which is incorporated by reference herein.

Both algorithms successfully result in quality segmentations in a fast, automatic, objective manner. However their underlying philosophies differ. The CBA concentrates on accurately identifying the cortical region at an early stage. This tactic was our chosen as the initial approach to automatic bone segmentation since it was originally believed that it would be easier to distinguish high intensity cortical pixels from non-cortical pixels than distinguishing bone pixels from non-bone pixels (the philosophy underlying the WBA). Identifying the cortical region accurately is important for the femora and tibiae images since there is the logical constraint regarding the cortical region. A different set of theoretical constraints is necessary for the vertebrae images and the CBA is ill-suited to that application. The CBA has the ability to use spatial information to adjust the cortical threshold adaptively. A disadvantage of the CBA is its inclusion of several morphological steps to ensure the logical constraints.

In the subsequent development of the WBA, we found that it was in fact easy to originally distinguish bone pixels from non-bone pixels for the images analyzed using histogram-based threshold selection. Additionally, the top-down philosophy of the WBA is well suited for the femur, tibia and vertebrae images.

One potential issue regarding both algorithms concerns the critical step of threshold value selection for region identification. Simply taking the 50-th percentile intensity as the cortical threshold in the CBA and using derivative-based threshold selection for the whole-bone threshold in the WBA will yield a different threshold for each image. We believe the approaches adopted in these algorithms are appropriate since variations in the image recording process and bone positioning can lead to changes in image quality and the recorded intensity value range from image to image. In application, over 80% of the identified thresholds have been contained within a 7% interval of the intensity scale with 100% within a 13% interval of the intensity scale for the CBA algorithm.

To compare the algorithms with one another as well as with histomorphometry, we first correlate measurements obtained for important bone features across the two automatic segmentation algorithms and histomorphometry, the accepted standard for bone density. The use of correlation in this context does not imply an attempt to predict one measure from another; rather, it is to determine the extent to which different methods are measuring the same thing. We note that histomorphometry quantitates a different and very much smaller region in the bone (see FIG. 11 and Table 1). Thus, one would not expect QCT and histomorphometry to correlate exactly. Secondly, we correlate the feature measurement results obtained from the vertebrae images via the WBA and histomorphometry. Thirdly, we compare the density and cross-sectional area measurements obtained from the CBA and WBA across images. Finally, we examine the comparability of segmentations resulting from the two algorithms by examining the pixel classifications from both algorithms.

TABLE 1

Location of analysis regions.

| Method | Region Location and Size | Analysis Volume |
|---|---|---|
| Tibia | | |
| QCT | Left proximal tibia, 9 mm² × 1.2 mm | 10.8 mm³ |
| Histo. | Right proximal tibia, 2 mm² × 0.005 mm | 0.01 mm³ |
| Vertebra | | |
| QCT | L-4 vertebra, 25 mm² × 1.2 m | 30.0 mm³ |
| Histo. | L-5 vertebra, 1.5 mm² × 0.005 mm | 0.0075 mm³ |

Comparisons of Feature Measurements

Three feature measurements from histomorphometry and QCT should be highly correlated since they are attempting to quantitate trabecular bone: 1) bone volume as a percent of total volume (BV/TV) measured by histomorphometry; 2) trabecular number (Tr.N) measured by histomorphometry; 3) average density in the marrow/trabecular region for tibia and vertebra or average density in the centrum for vertebra measured by the automatic QCT algorithms.

Only the two control groups, positive and negative (N=39 for tibiae, N=37 for vertebrae), from the osteoporosis studies have been used in these calculations, since bone formation, architecture, and density are better understood in these groups than in the treated groups.

Table 2 shows correlations for the proximal tibia site. There is very close agreement between CBA and WBA average density measurements (r=0.99). QCT correlates better with histomorphometric Tr.N (r=0.93) than with BV/TV (r=0.86–0.87), but both correlate highly and these correlations are similar to the correlation observed between the two histomorphometric measures, BV/TV with Tr.N (r=0.95). In other words, QCT correlates with histomorphometry nearly as well as different histomorphometry parameters correlate with themselves.

In general, the correlations between the WBA average densities and histomorphometric measures are lower for the vertebra site, Table 3. Since there are fewer pixels in the centrum region that are available for analysis than in tibia, we also correlate the histomorphometric measures with the vertebra marrow/trabecular region (defined as the centrum plus all other marrow/trabecular pixels) and the whole bone average density in the vertebra. The three QCT regions correlate highly with each other (r=0.88 to 0.96). The QCT whole bone region correlates best with BV/TV and Tr.N, possibly because there is more information (i.e., voxels). As opposed to the tibia site, BV/TV correlates better with QCT than Tr.N does. Excluding one outlier, animal (SHAM #4), BV/TV would correlate with QCT nearly as well (r=0.75) as with Tr.N (r=0.78). One additional explanation for the lower correlations in vertebra is that the QCT was performed on L-4 bone and histomorphometry was performed on L-5 bone, and these two bones may not be as similar to each other as the left and right proximal tibia sites.

TABLE 2

Correlations of CBA, WBA2, BV/TV and Tr.N. for proximal tibia trabecular density. SHAM and OVX groups only.

| Correlation | WBA2 | BV/TV | Tr.N. |
|---|---|---|---|
| CBA | 0.99 | 0.87 | 0.93 |
| WBA2 | | 0.86 | 0.93 |
| BV/TV | | | 0.95 |

TABLE 3

Correlations of WBA with MaTr and Centrum ROI, BV/TV and Tr.N. for vertebra bone density. SHAM and OVX groups only.

| Correlation | WBA Cent | WBA Whole | BV/TV | Tr.N. |
|---|---|---|---|---|
| WBA MaTr | 0.96 | 0.96 | 0.65 | 0.46 |
| WBA Cent | | 0.88 | 0.62 | 0.41 |
| WBA Whole | | | 0.66 | 0.49 |
| BV/TV | | | | 0.78 |

Comparison of OCT Segmentations

The CBA and the WBA region density results for the tibia site were compared and is displayed in Table 4. All treatment groups were included in the algorithm comparisons (N=82). The results indicate close agreement in the feature density measurements of the two algorithms. For comparison, based on the WBA, the standardized mean difference for the marrow/trabecular average density between the two control groups in the osteoporosis study (Sato et. al., 1996) was 41.9%.

TABLE 4

CBA vs. WBA.

| Measure | Standardized Mean Difference* | StD | Mean % Difference** | StD |
|---|---|---|---|---|
| WBone Avg Density | 1.4% | 0.69% | +1.4% | 0.67% |
| Cort Bone Avg Density | 7.0% | 5.73% | +5.2% | 4.42% |
| MaTr Avg Density | −1.3% | 4.60% | +1.0% | 11.54% |

*Standardized using average density of whole bone region from WBA (666.414 mg/cc)
**Calculated as (CBA - WBA)/WBA on an image-by-image and region-by-region basis It is very informative to graphically overlay on the observed image the image segmentations from WBA and CBA in an alternating manner to spatially compare how the algorithm segmentations differ. Non-spatially, an informative way to summarize how the two segmentation algorithms differ is to construct a two-way frequency table to summarize the number of pixels that are similarly or differently classified into background, cortical and marrow/trabecular regions. Though it is most informative to examine two-way frequency tables on an image by image basis, Table 5 summarizes these results over all tibia images. Several general conclusions can be made by inspecting Table 5. First, of the over 1.3 million pixels classified, greater than 99.3% of the pixels are similarly classified by the two algorithms. Deleting those pixels classified similarly as background, greater than 86.3% of the remaining pixels are similarly classified by the two algorithms. Second, 5.5%, 6.7%, and 4.2% more pixels are classified as whole bone, cortical bone, and marrow/trabecular bone by the WBA compared to the CBA, respectively. It is of interest to note that over 12% of the pixels classified as cortical bone by the WBA are classified as background by the CBA. Additionally, over 8% of the pixels classified as cortical bone by the CBA are classified as marrow/trabecular by the WBA. It can thus be concluded that a typical WBA segmentation pushes in an outward direction both the inner and outer perimeters of the cortical region compared to a typical CBA segmentation. For both algorithms, marrow/trabecular pixels constitute 47% of the pixels classified as belonging to the whole bone region.

TABLE 5

Comparing CBA and WBA pixel classifications for Tibiae
(N = 82 images)

| Frequency<br>Row Percentage<br>Col Percentage | CBA<br>Background | CBA<br>Cortical | CBA<br>Marrow/<br>Trab | Total |
|---|---|---|---|---|
| WBA<br>Background | 1,278,073<br>99.93<br>99.66 | 900<br>0.07<br>2.82 | 0<br>0.00<br>0.00 | 1,278,973 |
| WBA Cortical | 4218<br>12.36<br>0.32 | 28,599<br>83.82<br>89.48 | 1302<br>3.82<br>4.46 | 34,119 |
| WBA<br>Marrow/Trab | 54<br>0.18<br>0.00 | 2463<br>8.10<br>7.71 | 27,879<br>91.72<br>95.54 | 30,396 |
| TOTAL | 1,282,345 | 31,962 | 29,181 | 1,343,488 |

Inspection of the visual quality of the 82 image segmentations resulting from each algorithm have been excellent (i.e., the segmentations appear reasonable to the eye). For the CBA algorithm, there was one instance where the segmentation appeared unsatisfactory. In this instance, the cortical pixel intensities were not well distinguished from the marrow/trabecular pixels in portions of the cortical region and the CBA "manufactured" a one-pixel wide cortical band to ensure the cortical constraint. For the WBA algorithm, all segmentations have been excellent; there were no difficulties in automatically identifying an initial segmentation into bone and non-bone regions and there was no adverse impact of partial volume averaging on defining an initial cortical region. In addition, mainly due to the use of spatial information in the cortical index measure, the cortical regions are almost always smoother in the WBA segmentations. For these reasons as well as the extra flexibility of the WBA algorithm for the vertebral site, the WBA has advantages for many of the potential uses of the invention.

The automatic contextual spatial segmentation algorithms of the invention accurately classify pixels from proximal tibiae, femora, and vertebrae images in a fast objective, non-user specific manner. Though some decisions regarding choice of morphological operations and threshold selection techniques are made, the important advance is that these algorithms are implemented in a uniform manner across all images. This allows for unbiased comparisons between therapies for important scene-specific features. Additionally, these approaches allow much larger areas of the region of interest to be used in subsequent analyses. Due to the high signal-to-noise ratios in the QCT images, the algorithms appear robust to moderate changes in threshold selection design. These issues will be more fully explored by a subsequent sensitivity analysis of the WBA. Relationships observed among treatment effects utilizing these algorithms were in agreement with histomorphometric results.

The high signal-to-noise ratio of the images observed allowed for successful segmentation. However, some difficulty in the interpretation of features identified in the scenes was caused by partial volume averaging for pixels near region boundaries; this problem can be reduced through the use of higher resolution machines. Partial volume averaging can also corrupt the ability of histogram-based thresholding algorithms to accurately choose meaningful thresholds. Though its inclusion was not obviously necessary for this project, one possible action to reduce the effects of partial volume averaging is to perform histogram-based threshold optimization based on selective histograms (Russ, page 260), where pixels in areas with large spatial gradients would be removed from the histogram prior to threshold optimization. For some feature measurements, such as average cortical density, intensity information available at pixels near region transitions can be excluded to reduce any effects due to partial volume averaging, These algorithms are constructed to achieve success on a known class of bone images with known topological constraints. Though these automated techniques can be applied to a wide spectrum of medical images, in general, algorithms need to be customized to the application of interest.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

Jeffrey D. Helterbrand
Richard E. Higgs Jr.
Philip W. Iversen

AUTOMATIC CONTEXTUAL SEGMENTATION FOR IMAGING
BONES FOR OSTEOPOROSIS THERAPIES

APPENDIX A

```
/*
    Program:      Rat.c
    Written by:   Jeff Helterbrand and Frank Smietana
    Last update:  9/12/95
*/ include    <ctype.h>
include    <fcntl.h>
#include    <errno.h>
#include    <float.h>
#include    <limits.h>
#include    <math.h>
#include    <memory.h>
#include    <stdio.h>
#include    <stddef.h>
#include    <string.h>
#include    <stdlib.h>
include    <time.h> define   NR_END      1
define   FREE_ARG    char*
#define   LDEFAULT    30000
#define   RDEFAULT    -30000
#define   SIZE        1
define   COUNT       0 define   pr          printf
define   fpr         fprintf
#define   sqr(x)      ((x)*(x))

int     CentroidMethod(int **DB,int otherthresh,int **newBitmap,long maxRow,long maxCol);
void    Dilate(int **reggrow,long maxRow,long maxCol);
void    Erode(int** reglab,int erodenum,int **rg,long maxRow,long maxCol);
void    FindBig(int **B,int **DB,int *centrow,int *centcol,long maxRow,long maxCol);
void    FindOut(int** reglab,long maxRow,long maxCol);
void    FirstFence3(int **reglab,int dilatecount,long maxRow,long maxCol);
void    FreeIvector(int* v,long nl,long nh);
void    FreeImatrix(int** v,long nrl,long nrh,long ncl,long nch);
void    Histogram(int** matrix,long maxRow,long maxCol, int bintype,int binval,int left,int right);
void    HoleFill(int** matrix,long maxRow,long maxCol);
int     **Imatrix(long nrh,long nrl,long ncl,long nch);
void    ImagesMessage();
void    IntroMessage();
int     *Ivector(long nl,long nh);
int     Max(int a,int b);
int     Min(int a,int b);
void    Nrerror(char* error_text);
void    NewStatOpt3(int** Y,int **rl,int threshval,int dilatecount,long maxRow,long maxCol);
void    RegGrow2(int** B,int *onlytwo,long maxRow,long maxCol);
void    RegGrow3(int **B,int **reglab,int *numlab,long maxRow,long maxCol);
void    RegGrow4(int **B,int **reglab,long maxRow,long maxCol);
void    ResultsMessage(char *ResultsFileName);
void    ShellSort(int *a, long N);
void    SplitInner(int **reglab,int **newBitmap,int *threshval,long maxRow,long maxCol);
```

A-1

```
void      Summary(int **reglab,int **nB,int **INreg,char *ImageFileName,char *FinalFileName,FILE
*ResultsHandle,int thresh,int isopixs,long maxRow,long maxCol);

int CentroidMethod(int **DB,int otherthresh,int **newBitmap,long maxRow,long maxCol)
{
        int     i,j,dilateflag,centrow,centcol,**centreg,flag;
        long    rowtot,coltot,growsum;

rowtot = coltot = growsum = 0;
        centreg = Imatrix(1,maxRow,1,maxCol);

for (i = 1; i <= maxRow; i++) {
                for (j = 1; j <= maxCol; j++) {
                        centreg[i][j] = 0;
                        if (DB[i][j] == 1) {
                                rowtot += i;
                                coltot += j;
                                growsum++;
                        }
                }
        } dilateflag = 0;
        centrow = (int)(rowtot / growsum);
        centcol = (int)(coltot / growsum);
        centreg[centrow][centcol] = 1;

if (newBitmap[centrow][centcol] < otherthresh)      {
                flag = 1;
                goto L20;
        }
        else {
L49:            flag = 0;
                Dilate(centreg,maxRow,maxCol);
                dilateflag++;
                if (dilateflag == 6) {
                        FreeImatrix(centreg,1,maxRow,1,maxCol);
                        return(-1);
                } for (i = 1; i <= 15; i++)    {
                        for (j = 1; j <= 15; j++)    {
                                if (centreg[centrow+i-8][centcol+j-8] == 1 && newBitmap[centrow+i-
8][centcol+j-8] < otherthresh) { flag = 1; goto L20; } }          }
        }

L20:    if (flag == 1) {
                for (i = 1; i <= 15; i++)
                        for (j = 1; j <= 15; j++)
```

```
                                    if (centreg[centrow+i-8][centcol+j-8] == 1) DB[centrow+i-
8][centcol+j-8] = 0;
        }
        else
                goto L49;

FreeImatrix(centreg,1,maxRow,1,maxCol);
return(0);
} void Dilate(int **rg,long maxRow,long maxCol)
{
        int i,j,**nb;

nb = Imatrix(1,maxRow,1,maxCol);

for (i = 1; i <= maxRow; i++)
                for (j = 1; j <= maxCol; j++) nb[i][j] = 0;

for (i = 2; i <= maxRow-1; i++)
                for (j = 2; j <= maxCol-1; j++)
                        nb[i][j] =Max(rg[i][j],Max(rg[i-1][j],Max(rg[i+1][j],Max(rg[i][j-1],rg[i][j+1]))));

for (j = 2; j <= maxCol-1; j++) {
                nb[1][j]      = Max(rg[1][j],Max(rg[maxRow][j],Max(rg[2][j],Max(rg[1][j-1], rg[1][j+1]))));
                nb[maxRow][j] = Max(rg[1][j],Max(rg[maxRow][j],Max(rg[maxRow-1][j],Max(rg[maxRow][j-
1],rg[maxRow][j+1]))));
        }
        for (j = 2; j <= maxRow-1; j++) {
                nb[j][1]      = Max(rg[j][1],Max(rg[j][maxCol],Max(rg[j][2], Max(rg[j-1][1], rg[j+1][1]))));
                nb[j][maxCol] = Max(rg[j][1],Max(rg[j][maxCol],Max(rg[j][maxCol-1],Max(rg[j-
1][maxCol],rg[j+1][maxCol]))));
        } nb[1][1]      = Max(rg[1][1], Max(rg[2][1], Max(rg[maxRow][1],
Max(rg[1][maxCol],rg[1][2]))));
        nb[maxRow][1] = Max(rg[1][1], Max(rg[maxRow-
1][1],Max(rg[maxRow][1],Max(rg[maxRow][maxCol],rg[maxRow][2]))));
        nb[1][maxCol] = Max(rg[1][maxCol],Max(rg[2][maxCol],
Max(rg[maxRow][maxCol],Max(rg[1][maxCol-1],rg[1][1]))));
        nb[maxRow][maxCol]=Max(rg[1][maxCol],Max(rg[maxRow-
1][maxCol],Max(rg[maxRow][maxCol],Max(rg[maxRow][maxCol-1],rg[maxRow][1]))));

for (i = 1; i <= maxRow; i++)
                for (j = 1; j <= maxCol; j++) rg[i][j] = nb[i][j];

FreeImatrix(nb,1,maxRow,1,maxCol);
} void Erode(int reglab,int erodenum,int rg,long maxRow,long maxCol)
{
        int **nb,ErodeInc,ErodeNum,i,j,l,m;
        nb = Imatrix(1,maxRow,1,maxCol);
```

A-3

```
        for (i = 1; i <= maxRow; i++) {
                for (j = 1; j <= maxCol; j++) {
                        nb[i][j] = rg[i][j] = 0;
                        if (reglab[i][j] == 3)      rg[i][j] = 1;
                }
        }

ErodeInc = 0;
L77:    ErodeInc++;
        if (ErodeInc > ErodeNum) goto L70;

L40:    for (i = 2; i <= maxRow-1; i++)
                for (j = 2; j <= maxCol-1; j++)
                        nb[i][j] = Min(rg[i][j],Min(rg[i-1][j],Min(rg[i+1][j],Min(rg[i][j-
1],Min(rg[i+1][j-1],Min(rg[i-1][j-1],Min(rg[i][j+1],Min(rg[i-1][j+1],rg[i+1][j+1]))))))));

for (j = 2; j <= maxCol-1; j++) {
                        nb[1][j]   = Min(rg[1][j],Min(rg[maxRow][j],Min(rg[2][j], Min(rg[1][j-
1],Min(rg[maxRow][j-1],Min(rg[2][j-1], Min(rg[1][j+1],Min(rg[maxRow][j+1],rg[2][j+1]))))))));
                        nb[maxRow][j] = Min(rg[1][j],Min(rg[maxRow][j],Min(rg[maxRow-
1][j],Min(rg[1][j-1],Min(rg[maxRow][j-1],Min(rg[maxRow-1][j-
1],Min(rg[1][j+1],Min(rg[maxRow][j+1],rg[maxRow-1][j+1]))))))));
                }
                for (j = 2; j <= maxRow-1; j++) {
                        nb[j][1]   = Min(rg[j][1],Min(rg[j][maxCol],Min(rg[j][2], Min(rg[j-
1][1],Min(rg[j-1][maxCol],Min(rg[j-1][2], Min(rg[j+1][1],Min(rg[j+1][maxCol],rg[j+1][2]))))))));
                        nb[j][maxCol] = Min(rg[j][1],Min(rg[j][maxCol],Min(rg[j][maxCol-
1],Min(rg[j-1][1],Min(rg[j-1][maxCol],Min(rg[j-1][maxCol-
1],Min(rg[j+1][1],Min(rg[j+1][maxCol],rg[j+1][maxCol-1]))))))));
                } nb[1][1]     = Min(rg[1][1], Min(rg[2][1],  Min(rg[maxRow][1],
Min(rg[1][maxCol],Min(rg[2][maxCol],
Min(rg[maxRow][maxCol],Min(rg[1][2],Min(rg[2][2],rg[maxRow][2]))))))));
                        nb[maxRow][1]  = Min(rg[1][1], Min(rg[maxRow-1][1],
Min(rg[maxRow][1], Min(rg[1][maxCol],Min(rg[maxRow-
1][maxCol],Min(rg[maxRow][maxCol],Min(rg[1][2],Min(rg[maxRow-1][2],rg[maxRow][2]))))))));
                        nb[1][maxCol] = Min(rg[1][maxCol],Min(rg[2][maxCol],
Min(rg[maxRow][maxCol],Min(rg[1][maxCol-1],Min(rg[2][maxCol-1], Min(rg[maxRow][maxCol-
1],Min(rg[1][1],Min(rg[2][1],rg[maxRow][1]))))))));
                        nb[maxRow][maxCol] = Min(rg[1][maxCol],Min(rg[maxRow-
1][maxCol],Min(rg[maxRow][maxCol],Min(rg[1][maxCol-1],Min(rg[maxRow-1][maxCol-1],
Min(rg[maxRow][maxCol-1],Min(rg[1][1],Min(rg[maxRow-1][1],rg[maxRow][1]))))))));

for (l = 1; l <= maxRow; l++)
                        for (m = 1; m <= maxCol; m++) rg[l][m] = nb[l][m];

goto L77;
L70:    FreeImatrix(nb,1,maxRow,1,maxCol);
}
```

A-4

```
void FindBig(int **B,int **DB,int *centrow,int *centcol,long maxRow,long maxCol)
{
        int **usedimage,**rg,**nb,**temp,**D,growsum,BigWhiteSum;
        int i,j,k,l,m,n,rowtot,coltot,oldgrowsum,usedleft;

usedimage = Imatrix(1,maxRow,1,maxCol);
        rg = Imatrix(1,maxRow,1,maxCol);
        nb = Imatrix(1,maxRow,1,maxCol);
        temp = Imatrix(1,maxRow,1,maxCol);
        D = Imatrix(1,maxRow,1,maxCol);

for (i = 1; i <= maxRow; i++) {
                for (j = 1; j <= maxCol; j++) {
                        temp [i][j] = nb [i][j] = 0;
                        D[i][j] = B[i][j];
                }
        } for (i = 1; i <= 3; i++) Dilate(D, maxRow,maxCol);

for (i = 1;i <= maxRow; i++) {
                for (j = 1; j <= maxCol; j++) {
                        if (D[i][j] == 0)    usedimage[i][j] = 1;
                        else                 usedimage[i][j] = 0;
                }
        }

BigWhiteSum = 0;
L10:    usedleft = 0;
        for (i = 1; i <= maxRow; i++)
                for (j = 1; j <= maxCol; j++) rg[i][j]= 0;

l= maxRow/2;
L20:    l ++;
        if (l > maxRow)   k = l - maxRow;
        else              k = l;
        if (l == 1.5 * maxRow) goto L22;

m = maxCol/2;
L21:    m++;
        if (m > maxCol)   n = m -maxCol;
        else              n = m;
        if (m == 1.5*maxCol)     goto L20;
        if (usedimage[k][n] == 0) {
                usedleft = 1;
                rg[k][n] = 1;
                oldgrowsum = 1;
        }
        else
                goto L21;
```

A- 5

```
L22:    if (usedleft != 0) {
L40:        for (i = 2; i <= maxRow-1; i++)
                for (j = 2; j <= maxCol-1; j++)    nb[i][j] = Max(rg[i][j],Max(rg[i-
1][j],Max(rg[i+1][j],Max(rg[i][j-1],rg[i][j+1]))));

for (j = 2; j <= maxCol-1; j++) {
                nb[1][j]   = Max(rg[1][j],Max(rg[maxRow][j],Max(rg[2][j], Max(rg[1][j-1],
rg[1][j+1]))));
                nb[maxRow][j] = Max(rg[1][j],Max(rg[maxRow][j],Max(rg[maxRow-
1][j],Max(rg[maxRow][j-1],rg[maxRow][j+1]))));
            }
            for (j = 2; j <= maxRow-1; j++) {
                nb[j][1]   = Max(rg[j][1],Max(rg[j][maxCol],Max(rg[j][2], Max(rg[j-1][1],
rg[j+1][1]))));
                nb[j][maxCol] = Max(rg[j][1],Max(rg[j][maxCol],Max(rg[j][maxCol-
1],Max(rg[j-1][maxCol],rg[j+1][maxCol]))));
            } nb[1][1]=Max(rg[1][1],Max(rg[2][1],Max(rg[maxRow][1],Max(rg[1][maxCol],rg[1][2]))));
            nb[maxRow][1]   = Max(rg[1][1], Max(rg[maxRow-1][1], Max(rg[maxRow][1],
Max(rg[maxRow][maxCol],rg[maxRow][2]))));
            nb[1][maxCol]   = Max(rg[1][maxCol],Max(rg[2][maxCol],
Max(rg[maxRow][maxCol],Max(rg[1][maxRow-1],rg[1][1]))));
            nb[maxRow][maxCol] = Max(rg[1][maxCol],Max(rg[maxRow-
1][maxCol],Max(rg[maxRow][maxCol],Max(rg[maxRow][maxCol-1],rg[maxRow][1]))));

for (i = 1; i <= maxRow; i++)
                    for (j = 1; j <= maxCol; j++) rg[i][j] = nb[i][j]*D[i][j];

growsum = 0;
            for (l = 1; l <= maxRow; l++)
                for (m = 1; m <= maxCol; m++) growsum += rg[l][m];

if (oldgrowsum != growsum) {
            oldgrowsum = growsum;
            goto L40;
        } for (i = 1; i <= maxRow; i++)
            for (j = 1; j <= maxCol;j++)       usedimage[i][j] =
Max(usedimage[i][j],rg[i][j]);

if (growsum > BigWhiteSum) {
                BigWhiteSum = growsum;
                rowtot = coltot = 0;
                for (i = 1; i <= maxRow; i++) {
                    for (j = 1; j <= maxCol; j++) {
                        if (temp[i][j] == 1) temp[i][j] = 0;
                        if (rg[i][j] == 1) {
                            temp[i][j] = 1;
```

A- 6

```
                                                    rowtot += i;
                                                    coltot += j;
                                            }
                                    }
                            }
                            *centrow = (int)(rowtot / growsum);
                            *centcol = (int)(coltot / growsum);
                            }
                            goto L10;
                    } for (i = 1; i <= maxRow; i++) {
                    for (j = 1; j <= maxCol; j++) {
                            B[i][j] *= temp[i][j] ;
                            DB[i][j] = temp[i][j];
                    }
            }

FreeImatrix(usedimage,1,maxRow,1,maxCol);
            FreeImatrix(rg,1,maxRow,1,maxCol);
            FreeImatrix(nb,1,maxRow,1,maxCol);
            FreeImatrix(temp,1,maxRow,1,maxCol);
            FreeImatrix(D,1,maxRow,1,maxCol);
} void FindOuter(int **reglab,long maxRow,long maxCol)
{
            int **rg,**binimage,**nb,i,j,k,z,m,growsum,oldgrowsum;

rg = Imatrix(1,maxRow,1,maxCol);
            binimage = Imatrix(1,maxRow,1,maxCol);
            nb = Imatrix(1,maxRow,1,maxCol);

growsum = 0;
            for (i = 1; i <= maxRow; i++) {
                    for (j = 1; j <= maxCol; j++) {
                            rg[i][j] = binimage[i][j] = nb[i][j] = 0;
                            if (reglab[i][j] == 3) {
                                    rg[i][j] = binimage[i][j] = 1;
                                    growsum++;
                            }
                            if (reglab[i][j] == 2) binimage[i][j] = 1;
                    }
            } do {
                    oldgrowsum = growsum;

for (i = 2; i <= maxRow-1; i++)
                            for (j = 2; j <= maxCol-1; j++)
                                    nb[i][j] = Max(rg[i][j],Max(rg[i-1][j],Max(rg[i+1][j],Max(rg[i][j-1],rg[i][j+1]))));

for (j = 2; j <= maxCol-1; j++) {
```

```
                    nb[1][j]   = Max(rg[1][j],Max(rg[maxRow][j],Max(rg[2][j], Max(rg[1][j-1],
rg[1][j+1])))); 
                    nb[maxRow][j] = Max(rg[1][j],Max(rg[maxRow][j],Max(rg[maxRow-
1][j],Max(rg[maxRow][j-1],rg[maxRow][j+1]))));
            }
            for (j = 2; j <= maxRow-1; j++) {
                    nb[j][1]   = Max(rg[j][1],Max(rg[j][maxCol],Max(rg[j][2], Max(rg[j-1][1],
rg[j+1][1]))));
                    nb[j][maxCol] = Max(rg[j][1],Max(rg[j][maxCol],Max(rg[j][maxCol-
1],Max(rg[j-1][maxCol],rg[j+1][maxCol]))));
            } nb[1][1]   = Max(rg[1][1], Max(rg[2][1],  Max(rg[maxRow][1],
Max(rg[1][maxCol],rg[1][2]))));
            nb[maxRow][1]   = Max(rg[1][1], Max(rg[maxRow-1][1], Max(rg[maxRow][1],
Max(rg[maxRow][maxCol],rg[maxRow][2]))));
            nb[1][maxCol]  = Max(rg[1][maxCol],Max(rg[2][maxCol],
Max(rg[maxRow][maxCol],Max(rg[1][maxCol-1],rg[1][1]))));
            nb[maxRow][maxCol] = Max(rg[1][maxCol],Max(rg[maxRow-
1][maxCol],Max(rg[maxRow][maxCol],Max(rg[maxRow][maxCol-1],rg[maxRow][1]))));

for (z = 1; z <= maxRow; z++)
                    for (m = 1; m <= maxCol; m++)
                            rg[z][m] = nb[z][m] * binimage[z][m];

growsum = 0;
            for (z = 1; z <= maxRow; z++)
                    for (m = 1; m <= maxCol; m++)   growsum += rg[z][m];

}
    while (growsum != oldgrowsum);

for (i = 1; i <= maxRow; i++)
            for (j = 1; j <= maxCol; j++)
                    if (reglab[i][j] == 2 && rg[i][j] == 0) reglab[i][j] = 1;

Freelmatrix(rg,1,maxRow,1,maxCol);
    Freelmatrix(binimage,1,maxRow,1,maxCol);
    Freelmatrix(nb,1,maxRow,1,maxCol);
}
void FirstFence3(int **reglab,int dilatecount,long maxRow,long maxCol)
{
        int **reglabtemp,dilator,i,j,k,z;

reglabtemp = lmatrix(1,maxRow,1,maxCol);

dilator = 0;
L320: if (dilator == dilatecount) goto L321;

for (i = 1; i <= maxRow; i++)
```

A-8

```
                                    for (j = 1; j <= maxCol; j++)         reglabtemp[i][j] = reglab[i][j];

for (i = 2; i <= maxRow-1; i++) {
                for (j = 2; j <= maxCol-1; j++) {
                    if (reglab[i][j] == 2) {
                        for (k = 1; k <= 3; k++) {
                            for (z = 1; z <= 3; z++) {
                                if ((reglab[i+k-2][j+z-2] == 1) || (reglab[i+k-2][j+z-2] == 4)) reglabtemp[i][j] = 4;
                            }
                        }
                    }
                }
            } for (i = 1; i <= maxRow; i++)
                for (j = 1; j <= maxCol; j++)         reglab[i][j] = reglabtemp[i][j];

dilator ++;
        goto L320;
L321:   FreeImatrix(reglabtemp,1,maxRow,1,maxCol);

} void FreeImatrix(int **m, long nrl, long nrh, long ncl, long nch)
{
        free((FREE_ARG) (m[nrl]+ncl-NR_END));
        free((FREE_ARG) (m+nrl-NR_END));
} void FreeIvector(int *v, long nl, long nh)
{
        free((FREE_ARG) (v+nl-NR_END));
} void Histogram(int** matrix,long maxRow,long maxCol,int bintype,int binval,int left,int right)
{
        int maxx,minn,j,k,bincount,binsize,*bins;

minn = left;
        maxx = right;
        if (left == LDEFAULT || right == RDEFAULT)       {
                for (j = 1; j <= maxRow; j++) {
                    for (k = 1; k <= maxCol; k++) {
                        if (matrix[j][k] > maxx)    maxx = matrix[j][k];
                        if (matrix[j][k] < minn)    minn = matrix[j][k];
                    }
                }
                if (right != RDEFAULT)   maxx = right;
                if (left != LDEFAULT)    minn = left;
        } if (bintype == SIZE)       {
                bincount = (maxx - minn)/binval;
                binsize = binval;
```

```
        }
        else {
                bincount = binval;
                binsize = (maxx - minn)/binval;
        }
        bins = Ivector(0,bincount);
        /*memset(bins,'\0',sizeof(bincount));*/ for (j = 0; j <= bincount; j++) bins[j] = 0;

for (j = 1; j <= maxRow; j++) {
                for (k = 1; k <= maxCol; k++)      {
                        (bins[  (int)((matrix[j][k] - minn)/binsize)  ])++;
                }
        } for (j = 0; j <= bincount; j++)      pr("\n bins   %d    %d",j,bins[j]);

FreeIvector(bins,0,bincount);
} void HoleFill(int **rl,long maxRow,long maxCol)
{
        int **B,**newlab ,*oldlab,i,j,z,m,k,Minregnum,Maxreg, *numlab ;

B = Imatrix(1,maxRow,1,maxCol);
        newlab = Imatrix(1,maxRow,1,maxCol);
        numlab = Ivector(1,100L);
        oldlab = Ivector(1,100L);

for (i=1; i <= 100; i++) numlab[i] = oldlab[i] = 0;

for (i = 1; i <= maxRow; i++) {
                for (j = 1; j <= maxCol; j++) {
                        newlab[i][j] = 0;
                        if (rl[i][j] == 2)    B[i][j] = 1;
                        else                  B[i][j] = 0;
                }
        }

RegGrow3(B,newlab,numlab, maxRow,maxCol);

if (numlab[4] > 0) {
                for (m = 1; m <=100; m++)         oldlab[m] = numlab[m];

ShellSort(numlab,100L);

Minregnum = numlab[98];

for (i = 1; i <=100; i++) {
                        if (oldlab[i] < Minregnum && oldlab[i] > 0) {
                                Maxreg = 0;
```

```
                        for (k = 1; k <= maxRow; k++)
                                for (z = 1; z <= maxCol; z++)
                                        if (newlab[k][z] == i)    rl[k][z] = 0;

for (k = 2; k < maxRow; k++) {
                                for (z = 2; z < maxCol; z++) {
                                        if (newlab[k][z] == i) {
                                                if (rl[k-1][z] > Maxreg)   Maxreg = rl[k-1][z];
                                                if (rl[k+1][z] > Maxreg)   Maxreg = rl[k+1][z];
                                                if (rl[k][z-1] > Maxreg)   Maxreg = rl[k][z-1];
                                                if (rl[k][z+1] > Maxreg)   Maxreg = rl[k][z+1];
                                        }
                                }
                        } for (k = 1; k <= maxRow; k++)
                                for (z = 1; z <= maxCol; z++)
                                        if (newlab[k][z] == i)    rl[k][z] = Maxreg;
                        }
                }
        }

FreeImatrix(B,1,maxRow,1,maxCol);
        FreeImatrix(newlab,1,maxRow,1,maxCol);
        FreeIvector(numlab,1,100L);
        FreeIvector(oldlab,1,100L);
} void ImagesMessage()
{
        pr("\n\n\n\n The file containing the image names that you wish to process could not be ");
        pr("\n found in the current directory. This file contains the image name(s),");
        pr("\n one to a line. The file's contents should look something like this:");
        pr("\n\n        OV1.X00");
        pr("\n         OV2.X00");
        pr("\n         RA1.X01\n\n\n ");
} int **Imatrix(long nrl, long nrh, long ncl, long nch)
{
        long i, nrow=nrh-nrl+1,ncol=nch-ncl+1;
        int **m;

m=(int **) malloc((size_t)((nrow+NR_END)*sizeof(int*)));
        if (!m) Nrerror("allocation failure 1 in matrix()");
        m += NR_END;
        m -= nrl;

m[nrl]=(int *) malloc((size_t)((nrow*ncol+NR_END)*sizeof(int)));
        if (!m[nrl]) Nrerror("allocation failure 2 in matrix()");
```

```
            m[nrl] += NR_END;
            m[nrl] -= ncl;

for(i=nrl+1;i<=nrh;i++) m[i]=m[i-1]+ncol;

return m;
} void IntroMessage()
{
            pr("\n\n\n\n To run the QCT program, type:");
            pr("\n\n QCT <file containing image file name(s)> <maxRows><maxCols>");
            pr("\n\n The image file contains the name(s) of the images that you wish to process,");
            pr("\n one to a line. The file's contents should look something like this:");
            pr("\n\n        OV1.X00");
            pr("\n         OV2.X00");
            pr("\n         RA1.X01 ");
            pr("\n\n The results file is created by the QCT program and contains the summary");
            pr("\n statistics for each image with fields seperated by commas. ");
            pr("\n\n Image maxRowution is a number such as 128, 512 or 1024");
            pr("\n\n The QCT program also creates a file for each original image containing the");
            pr("\n final, segmented image data. Those files will have an extension of .FINAL");
            pr("\n and can be found in the current directory. For example:");
            pr("\n \n   Original image file:     OV1.X00 ");
            pr("\n    Final segmented image file: OV1.X00.FINAL\n\n\n");
} int *Ivector(long nl, long nh)
{
            int *v;

v=(int *)malloc((size_t) ((nh-nl+1+NR_END)*sizeof(int)));
            if (!v) Nrerror("allocation failure in Ivector()");

return v-nl+NR_END;
} int Max(int a,int b)
{
if (a > b)       return(a);
else    return(b);
} int Min(int a,int b)
{
if (a < b)       return(a);
else    return(b);
} void NewStatOpt3(int Y,int rl,int threshval,int dilatecount,long maxRow,long maxCol)
{
            int **C,bigiter,bigcount,i,j,k,z,iter,count;
            int r1,r2,r3,r4,ll;
```

```
            bigiter = 0;
            bigcount = 1;
            r1 = r2 = r3 = r4 = 0;

L300:   if (bigcount == 0)  goto L372;

bigcount = 0;
            bigiter++;

if (bigiter == 1) {
                    FirstFence3(rl,dilatecount, maxRow,maxCol);
                    goto L231;
            }
            else { for (i = 2; i <= maxRow-1; i++) {
                        for (j = 2; j <= maxCol-1; j++) { if (rl[i][j] ==  2) {
                                        for (k = 1; k <= 3; k++) {
                                                for (z = 1; z <= 3; z++) {
                                                        if (rl[i+k-2][j+z-2] == 1) { rl[i][j] = 4;
                                                            r4++;

}
                                                    }
                                                }
                                            }
                                    }
                            }
                    }

L231:   iter = 0;

count = 1;

L170:   if (count == 0)    goto L272 ;
                iter++;
                count = 0;

for (i = 2; i <= maxRow-1; i++) {
                    for (j = 2; j <= maxCol-1; j++) { if (rl[i][j] == 2) {
                                    k = 0;

L136:   k++;
                            if (k == 4) goto L171;
```

A-13

```
                                z = 0;
L137:       z++;
                                if (z == 4) goto L136;
                                if (rl[i+k-2][j+z-2] == 3) {
                                        if (Y[i][j] < threshval) {
                                                rl[i][j] = 3;
                                                r1++;
                                                count = 1;
                                                bigcount = 1;
                                        }
                                        goto L171;
                                }
                                else
                                        goto L137;
                        }
                        if (rl[i][j] == 3)    {
                                k = 0;
L146:       k++;
                                if (k == 4) goto L171;
                                z = 0;
L147:       z++;
                                if (z == 4) goto L146;
                                if (((rl[i+k-2][j+z-2]==2)||(rl[i+k-2][j+z-2] == 4))&&((k+z == 5)||(k+z==3))) {
                                        if (Y[i][j] >= threshval) {
                                                rl[i][j] = 2;
                                                r2++;
                                                count = 1;
                                                bigcount = 1;
                                        }
                                        goto L171;
                                }
                                else    goto L147;
                        }
L171:           ll=0;
                }
        }
        goto L170;
L272:   ll=0;

for (i = 2; i <= maxRow-1; i++) {
                for (j = 2; j <= maxCol-1; j++) {
                        if (rl[i][j] == 4) {  rl[i][j] = 2;    r2++; }
                }
        } for (i = 2; i <= maxRow-1; i++) {
                for (j = 2; j <= maxCol-1; j++) {
                        if (rl[i][j] == 2) {
                                for (k = 1; k <= 3; k++) {
                                        for (z = 1; z <= 3; z++) {
                                                if (rl[i+k-2][j+z-2] == 3)   { rl[i][j] = 4; r4++; }
```

```
                                }
                            }
                        }
                    }
                }
            iter = 0;
            count = 1;

L70:        if (count == 0)   goto L72;
            iter++;
            count = 0;

for (i = 2;i <= maxRow-1; i++) {
                for (j = 2; j <= maxCol-1; j++) {
                    if (rl[i][j] == 2) { k = 0;
L26:        k++;
                        if (k == 4) goto L71;
                        z = 0;
L27:        z++;

if (z == 4) goto L26;
                        if (rl[i+k-2][j+z-2] == 1)  {
                            if (Y[i][j] < threshval)     {
                                rl[i][j] = 1;
                                r3++;
                                count = 1;
                                bigcount = 1;
                            }
                            goto L71;
                        }
                        else    goto L27;
                    } if (rl[i][j] == 1) {
                        k = 0;
L36:        k++;
                        if (k == 4) goto L71;
                        z = 0;
L37:        z++;
                        if (z == 4) goto L36;
                        if (((rl[i+k-2][j+z-2] == 2)||(rl[i+k-2][j+z-2] == 4)) && ((k+z == 3)||(k+z == 5) )) {
                            if (Y[i][j] >= threshval) {
                                rl[i][j] = 2;
                                r2++;
                                count = 1;
                                bigcount = 1;
                            }
                        goto L71;
```

A-15

```
                    }
                    else
                              goto L37;
            }
L71:    ll = 0;
                    }
            }
            goto L70;
L72:    ll=0;

for (i = 2; i<= maxRow-1; i++) {
                    for (j = 2; j <= maxCol-1; j++) {
                              if (rl[i][j] == 4) {        rl[i][j] = 2;   r2++; }
                    }
            } goto L300;

L372:   ll=0;
} void Nrerror(char error_text[])
{
            fprintf(stderr,"\n\nMemory allocation/deallocation error...");
            fprintf(stderr,"%s\n\n\n Exiting to system.\n\n\n",error_text);
            exit(1);
} void RegGrow2(int** B,int *onlytwo,long maxRow,long maxCol)
{
            int **usedimage,**rg,**nb,usedleft,i,j,k,l,lab,m,growsum,oldgrowsum;

usedimage = Imatrix(1,maxRow,1,maxCol);
            rg = Imatrix(1,maxRow,1,maxCol);
            nb = Imatrix(1,maxRow,1,maxCol);

for (i = 1; i <= maxRow; i++)
                    for (j = 1; j <= maxCol; j++) usedimage[i][j] = 0;

lab = 0;
            for (j = 1; j <= maxRow; j++) {
                    for (k = 1; k <= maxCol; k++) {
                              if (B[j][k] != 0)   usedimage[j][k] = 1;
                              else                usedimage[j][k] = 0;
                    }
            }

L10:    usedleft = 0;

for (l = 1; l <= maxRow; l++)
```

```
            for (m = 1; m <= maxCol; m++) rg[l][m] = 0;

l = 0;
L20:    l++;
        if (l == maxRow+1) goto L22;
        m = 0;
L21:    m++;
        if (m == maxCol+1) goto L20;
        if (usedimage[l][m] == 0) {
                if (lab == 2) {
                        lab++;
                        goto L60;
                }
                usedleft = 1;
                rg[l][m] = 1;
        }
        else
                goto L21;

L22:    if (usedleft != 0) { oldgrowsum = 1;

L40:            for (i = 2; i <= maxRow-1; i++)
                        for (j = 2; j <= maxCol-1; j++)
                                nb[i][j] = Max(rg[i][j],Max(rg[i-1][j],Max(rg[i+1][j],Max(rg[i][j-1],Max(rg[i+1][j-1],Max(rg[i-1][j-1],Max(rg[i][j+1],Max(rg[i-1][j+1],rg[i+1][j+1]))))))));

for (j = 2; j <= maxCol-1; j++) {
                                nb[1][j]   = Max(rg[1][j],Max(rg[maxRow][j],Max(rg[2][j],
Max(rg[1][j-1],Max(rg[maxRow][j-1],Max(rg[2][j-1],
Max(rg[1][j+1],Max(rg[maxRow][j+1],rg[2][j+1]))))))));
                                nb[maxRow][j] =
Max(rg[1][j],Max(rg[maxRow][j],Max(rg[maxRow-1][j],Max(rg[1][j-1],Max(rg[maxRow][j-1],Max(rg[maxRow-1][j-1],Max(rg[1][j+1],Max(rg[maxRow][j+1],rg[maxRow-1][j+1]))))))));
                        }
                        for (j = 2; j <= maxRow-1; j++) {
                                nb[j][1]   = Max(rg[j][1],Max(rg[j][maxCol],Max(rg[j][2],
Max(rg[j-1][1],Max(rg[j-1][maxCol],Max(rg[j-1][2],
Max(rg[j+1][1],Max(rg[j+1][maxCol],rg[j+1][2]))))))));
                                nb[j][maxCol] =
Max(rg[j][1],Max(rg[j][maxCol],Max(rg[j][maxCol-1],Max(rg[j-1][1],Max(rg[j-1][maxCol],Max(rg[j-1][maxCol-1],Max(rg[j+1][1],Max(rg[j+1][maxCol],rg[j+1][maxCol-1]))))))));
                        } nb[1][1]   = Max(rg[1][1], Max(rg[2][1], Max(rg[maxRow][1],
Max(rg[1][maxCol],Max(rg[2][maxCol],
Max(rg[maxRow][maxCol],Max(rg[1][2],Max(rg[2][2],rg[maxRow][2]))))))));
                                nb[maxRow][1] = Max(rg[1][1], Max(rg[maxRow-1][1],
Max(rg[maxRow][1], Max(rg[1][maxCol],Max(rg[maxRow-1][maxCol],Max(rg[maxRow][maxCol],Max(rg[1][2],Max(rg[maxRow-1][2],rg[maxRow][2]))))))));
```

```
                              nb[1][maxCol]   = Max(rg[1][maxCol],Max(rg[2][maxCol],
Max(rg[maxRow][maxCol],Max(rg[1][maxCol-1],Max(rg[2][maxCol-1], Max(rg[maxRow][maxCol-
1],Max(rg[1][1],Max(rg[2][1],rg[maxRow][1]))))))));
                              nb[maxRow][maxCol] = Max(rg[1][maxCol],Max(rg[maxRow-
1][maxCol],Max(rg[maxRow][maxCol],Max(rg[1][maxCol-1],Max(rg[maxRow-1][maxCol-1],
Max(rg[maxRow][maxCol-1],Max(rg[1][1],Max(rg[maxRow-1][1],rg[maxRow][1]))))))));

for (l = 1; l <= maxRow; l++)
                 for (m = 1; m <= maxCol; m++) rg[l][m] = nb[l][m] * (1-B[l][m]);

growsum = 0;
          for (l = 1; l <= maxRow; l++)
                 for (m = 1; m <= maxCol; m++)  growsum += rg[l][m];

if (growsum != oldgrowsum) {
                 oldgrowsum = growsum;
                 goto L40;
          } lab++;

for (l = 1; l <= maxRow; l++)
                 for (m = 1; m <= maxCol; m++)  usedimage[l][m]  += rg[l][m];

goto L10;

}

/* This is the end of region growing, now check to see that
   we have only one region for the outer bone */

L60:    if (lab > 1)     *onlytwo = 1;
        else             *onlytwo = 0;

FreeImatrix(usedimage,1,maxRow,1,maxCol);
        FreeImatrix(rg,1,maxRow,1,maxCol);
        FreeImatrix(nb,1,maxRow,1,maxCol);
}
void RegGrow3(int **B,int **reglab,int *numlab,long maxRow,long maxCol)
{
        int  **ui,**rg,lab,oldgrowsum,**nb,growsum,pixval,z,m,i,j,usedleft;

ui = Imatrix(1,maxRow,1,maxCol);
        rg = Imatrix(1,maxRow,1,maxCol);
        nb = Imatrix(1,maxRow,1,...Col);

for (i = 1; i <= maxRow; i++)
               for (j = 1; j <= maxCol; j++)       ui[i][j] = 0;
```

A- 18

```
        lab = 0;

L10:  usedleft = 0;
        for (z = 1; z <= maxRow; z++)
                for (m = 1; m <= maxCol; m++)    rg[z][m] = 0;

z = 0;
  L20:  z++;
        if (z != maxRow+1) {
                m = 0;
  L21:          m++;
                if (m == maxCol+1) goto L20;
                if (ui[z][m] == 0) {
                        usedleft = 1;
                        rg[z][m] = 1;
                        pixval = B[z][m];
                }
                else
                        goto L21;
        } if (usedleft != 0) {           /* IF... GOTO 60 */ oldgrowsum = 1;

L40:                  if (pixval == 1) { for (i = 2; i <= maxRow-1; i++)
                                        for (j = 2; j <= maxCol-1; j++)
                                                nb[i][j] = Max(rg[i][j],Max(rg[i-1][j],Max(rg[i+1][j],Max(rg[i][j-1],rg[i][j+1]))));

for (j = 2; j <= maxCol-1; j++) {
                                        nb[1][j]  =
Max(rg[1][j],Max(rg[maxRow][j],Max(rg[2][j], Max(rg[1][j-1], rg[1][j+1]))));
                                        nb[maxRow][j] =
Max(rg[1][j],Max(rg[maxRow][j],Max(rg[maxRow-1][j],Max(rg[maxRow][j-1],rg[maxRow][j+1]))));
                                }
                                for (j = 2; j <= maxRow-1; j++) {
                                        nb[j][1]  =
Max(rg[j][1],Max(rg[j][maxCol],Max(rg[j][2], Max(rg[j-1][1], rg[j+1][1]))));
                                        nb[j][maxCol] =
Max(rg[j][1],Max(rg[j][maxCol],Max(rg[j][maxCol-1],Max(rg[j-1][maxCol],rg[j+1][maxCol]))));
                                }
                                nb[1][1]     = Max(rg[1][1], Max(rg[2][1],
Max(rg[maxRow][1], Max(rg[1][maxCol],rg[1][2]))));
                                nb[maxRow][1]  = Max(rg[1][1], Max(rg[maxRow-1][1],
Max(rg[maxRow][1], Max(rg[maxRow][maxCol],rg[maxRow][2]))));
                                nb[1][maxCol]  = Max(rg[1][maxCol],Max(rg[2][maxCol],
Max(rg[maxRow][maxCol],Max(rg[1][maxCol-1],rg[1][1]))));
```

A-19

```
                        nb[maxRow][maxCol] =
Max(rg[1][maxCol],Max(rg[maxRow-1][maxCol],Max(rg[maxRow][maxCol],Max(rg[maxRow][maxCol-
1],rg[maxRow][1]))));

for (i = 1; i <= maxRow; i++)
                        for (j = 1; j <= maxCol; j++)        rg[i][j] = nb[i][j]
* B[i][j];
                }
                else {
                    for (i = 2; i <= maxRow-1; i++)
                        for (j = 2; j <= maxCol-1; j++)
                            nb[i][j] = Max(rg[i][j],Max(rg[i-
1][j],Max(rg[i+1][j],Max(rg[i][j-1],Max(rg[i+1][j-1],Max(rg[i-1][j-1],Max(rg[i][j+1],Max(rg[i-
1][j+1],rg[i+1][j+1]))))))));

for (j = 2; j <= maxCol-1; j++) {
                        nb[1][j] =
Max(rg[1][j],Max(rg[maxRow][j],Max(rg[2][j], Max(rg[1][j-1],Max(rg[maxRow][j-1],Max(rg[2][j-1],
Max(rg[1][j+1],Max(rg[maxRow][j+1],rg[2][j+1]))))))));
                        nb[maxRow][j] =
Max(rg[1][j],Max(rg[maxRow][j],Max(rg[maxRow-1][j],Max(rg[1][j-1],Max(rg[maxRow][j-
1],Max(rg[maxRow-1][j-1],Max(rg[1][j+1],Max(rg[maxRow][j+1],rg[maxRow-1][j+1]))))))));
                    }
                    for (j = 2; j <= maxRow-1; j++) {
                        nb[j][1] =
Max(rg[j][1],Max(rg[j][maxCol],Max(rg[j][2], Max(rg[j-1][1],Max(rg[j-1][maxCol],Max(rg[j-1][2],
Max(rg[j+1][1],Max(rg[j+1][maxCol],rg[j+1][2]))))))));
                        nb[j][maxCol] =
Max(rg[j][1],Max(rg[j][maxCol],Max(rg[j][maxCol-1],Max(rg[j-1][1],Max(rg[j-1][maxCol],Max(rg[j-
1][maxCol-1],Max(rg[j+1][1],Max(rg[j+1][maxCol],rg[j+1][maxCol-1]))))))));
                    } nb[1][1]    = Max(rg[1][1], Max(rg[2][1],
Max(rg[maxRow][1], Max(rg[1][maxCol],Max(rg[2][maxCol],
Max(rg[maxRow][maxCol],Max(rg[1][2],Max(rg[2][2],rg[maxRow][2]))))))));
                    nb[maxRow][1] = Max(rg[1][1], Max(rg[maxRow-1][1],
Max(rg[maxRow][1], Max(rg[1][maxCol],Max(rg[maxRow-
1][maxCol],Max(rg[maxRow][maxCol],Max(rg[1][2],Max(rg[maxRow-1][2],rg[maxRow][2]))))))));
                    nb[1][maxCol] = Max(rg[1][maxCol],Max(rg[2][maxCol],
Max(rg[maxRow][maxCol],Max(rg[1][maxCol-1],Max(rg[2][maxCol-1], Max(rg[maxRow][maxCol-
1],Max(rg[1][1],Max(rg[2][1],rg[maxRow][1]))))))));
                    nb[maxRow][maxCol] =
Max(rg[1][maxCol],Max(rg[maxRow-1][maxCol],Max(rg[maxRow][maxCol],Max(rg[1][maxCol-
1],Max(rg[maxRow-1][maxCol-1], Max(rg[maxRow][maxCol-1],Max(rg[1][1],Max(rg[maxRow-
1][1],rg[maxRow][1]))))))));

for ( z = 1; z <= maxRow; z ++)
                        for (m = 1; m <= maxCol; m++)     rg[z][m] =
nb[z][m] * (1-B[z][m]);
                } growsum = 0;
                for (z = 1; z <= maxRow; z++)
```

A-20

```
                        for (m = 1; m <= maxCol; m++)    growsum += rg[z][m];

if (growsum != oldgrowsum) {
                    oldgrowsum = growsum;
                    goto L40;
            } lab++;
            for (z = 1; z <= maxRow; z++) {
                    for (m = 1; m <= maxCol; m++) {
                            ui[z][m] += rg[z][m];
                            reglab[z][m] += (rg[z][m] * lab) ;
                            numlab[lab] = growsum;
                    }
            } goto L10;
}
     FreeImatrix(ui,1,maxRow,1,maxCol);
     FreeImatrix(rg,1,maxRow,1,maxCol);
     FreeImatrix(nb,1,maxRow,1,maxCol);
}
void RegGrow4(int **B,int **rl,long maxRow,long maxCol)
{
     int **usedimage,**rg,**nb,lab,usedleft,oldgrowsum,growsum,l,m,i,j,rl1,rl2;

usedimage = Imatrix(1,maxRow,1,maxCol);
     nb = Imatrix(1,maxRow,1,maxCol);
     rg = Imatrix(1,maxRow,1,maxCol);

for (i = 1; i <= maxRow; i++) {
             for (j = 1; j <= maxCol; j++) {
                     usedimage[i][j] = 0;
                     if (B[i][j] == 1)   usedimage[i][j] = rl[i][j] = 1;
             }
     } lab = 1;

do { usedleft = 0;

for (l = 1; l <= maxRow; l++)
                     for (m = 1; m <= maxCol; m++)    rg[l][m] = 0;

l = 0;
L20:     l++;
             if (l != maxRow+1) {
```

```
              m = 0;
L21:          m++;
                    if (m == maxCol+1) goto L20;
                    if (usedimage[l][m] == 0) usedleft = rg[l][m] = 1;
                    else
                              goto L21;
              } if (usedleft != 0) { growsum = 1;

do {
                              oldgrowsum = growsum;

for (i = 2; i <= maxRow-1; i++)
                                    for (j = 2; j <= maxCol-1; j++)
                                              nb[i][j] = Max(rg[i][j],Max(rg[i-
1][j],Max(rg[i+1][j],Max(rg[i][j-1],Max(rg[i+1][j-1],Max(rg[i-1][j-1],Max(rg[i][j+1],Max(rg[i-
1][j+1],rg[i+1][j+1]))))))));

for (j = 2; j <= maxCol-1; j++) {
                                              nb[1][j] = Max(rg[1][j],Max(rg[maxRow][j],Max(rg[2][j],
Max(rg[1][j-1],Max(rg[maxRow][j-1],Max(rg[2][j-1],
Max(rg[1][j+1],Max(rg[maxRow][j+1],rg[2][j+1]))))))));
                                              nb[maxRow][j] =
Max(rg[1][j],Max(rg[maxRow][j],Max(rg[maxRow-1][j],Max(rg[1][j-1],Max(rg[maxRow][j-
1],Max(rg[maxRow-1][j-1],Max(rg[1][j+1],Max(rg[maxRow][j+1],rg[maxRow-1][j+1]))))))));
                              }
                              for (j = 2; j <= maxRow-1; j++) {
                                              nb[j][1] = Max(rg[j][1],Max(rg[j][maxCol],Max(rg[j][2],
Max(rg[j-1][1],Max(rg[j-1][maxCol],Max(rg[j-1][2],
Max(rg[j+1][1],Max(rg[j+1][maxCol],rg[j+1][2]))))))));
                                              nb[j][maxCol] =
Max(rg[j][1],Max(rg[j][maxCol],Max(rg[j][maxCol-1],Max(rg[j-1][1],Max(rg[j-1][maxCol],Max(rg[j-
1][maxCol-1],Max(rg[j+1][1],Max(rg[j+1][maxCol],rg[j+1][maxCol-1]))))))));
                              } nb[1][1]   = Max(rg[1][1], Max(rg[2][1],  Max(rg[maxRow][1],
Max(rg[1][maxCol],Max(rg[2][maxCol],
Max(rg[maxRow][maxCol],Max(rg[1][2],Max(rg[2][2],rg[maxRow][2]))))))));
                              nb[maxRow][1]  = Max(rg[1][1], Max(rg[maxRow-1][1],
Max(rg[maxRow][1], Max(rg[1][maxCol],Max(rg[maxRow-
1][maxCol],Max(rg[maxRow][maxCol],Max(rg[1][2],Max(rg[maxRow-1][2],rg[maxRow][2]))))))));
                              nb[1][maxCol]  = Max(rg[1][maxCol],Max(rg[2][maxCol],
Max(rg[maxRow][maxCol],Max(rg[1][maxCol-1],Max(rg[2][maxCol-1], Max(rg[maxRow][maxCol-
1],Max(rg[1][1],Max(rg[2][1],rg[maxRow][1]))))))));
                              nb[maxRow][maxCol] = Max(rg[1][maxCol],Max(rg[maxRow-
1][maxCol],Max(rg[maxRow][maxCol],Max(rg[1][maxCol-1],Max(rg[maxRow-1][maxCol-1],
Max(rg[maxRow][maxCol-1],Max(rg[1][1],Max(rg[maxRow-1][1],rg[maxRow][1]))))))));

for (l = 1; l <= maxRow; l++) {
```

A-22

```
                    for (m = 1; m <= maxCol; m++) {
                        rg[l][m] = nb[l][m] * (1-B[l][m]);
                    }
                } growsum = 0;
                for (l = 1; l <= maxRow; l++) {
                    for (m = 1; m <= maxCol; m++) {
                        growsum = growsum + rg[l][m];
                    }
                }

}
            while (growsum != oldgrowsum);

lab++;

for (l = 1; l <= maxRow; l++) {
                for (m = 1; m <= maxCol; m++) {
                    usedimage[l][m] += rg[l][m];
                    rl[l][m] = rg[l][m] * lab + rl[l][m];
                }
            }

} /* if (usedleft != 0) */

}
    while (usedleft != 0);

rl1 = rl2 = 0;
    for (i = 1; i <= maxRow; i++) {
        for (j = 1; j <= maxCol; j++) {
            if (rl[i][j] == 1)         { rl[i][j] = 2; rl1++; }
            else {
                if (rl[i][j] == 2)     { rl[i][j] = 1; rl2++; }
            }
            if (rl[i][j] > 2)    rl[i][j] = 3;
        }
    }

Freelmatrix(usedimage,1,maxRow,1,maxCol);
    Freelmatrix(rg,1,maxRow,1,maxCol);
    Freelmatrix(nb,1,maxRow,1,maxCol);
} void ResultsMessage(char *ResultsFileName)
{
    pr("\n\n\n\n The system could not create the summary file named %s. ",ResultsFileName);
    pr("\n Please ask your system administrator for assistance.\n\n\n");
}
```

```
void ShellSort(int *a,long N)
{
        long i,j,h;
        int v;

for (h = 1;h <= N/9L; h = 3L*h+1);
        for (; h > 0; h/= 3L)
                for (i = h+1L; i <= N; i+=1L) {
                        v = a[i];
                        j = i;
                        while (j > h && a[j-h] > v) {
                                a[j] = a[j-h]; j -= h;
                        }
                        a[j] = v;
                }
} void SplitInner(int reglab,int newBitmap,int *threshval,long maxRow,long maxCol)
{
        int **BGbin,**out1bin,**out2bin,**inbin, r95,i,j;
        double rcount;
        int *sortr;

inbin = Imatrix(1,maxRow,1,maxCol);
        out1bin = Imatrix(1,maxRow,1,maxCol);
        out2bin = Imatrix(1,maxRow,1,maxCol);
        BGbin = Imatrix(1,maxRow,1,maxCol);
        sortr = Ivector(1, maxRow*maxCol);

for (j = 1; j <= maxRow*maxCol; j++)     sortr[j] = 0;

for (i=1; i <= maxRow; i++) {
                for (j = 1; j <= maxCol; j++) {
                        BGbin[i][j] = out1bin[i][j] = out2bin[i][j] = inbin[i][j] = 0;
                        if (reglab[i][j] == 1) BGbin[i][j] = 1;
                        if (reglab[i][j] == 2) out1bin[i][j] = out2bin[i][j] = 1;
                        if (reglab[i][j] == 3) inbin[i][j] = 1;
                }
        } for (j = 1; j <= 2; j++)     Dilate(out1bin,maxRow,maxCol);
        for ( j = 1; j <= 4; j++)    Dilate(out2bin,maxRow,maxCol);

rcount = 0.0;
        for (i = 1; i <= maxRow; i++)     {
                for (j = 1; j <= maxCol; j++)     {
                        if (out2bin[i][j]==1 && out1bin[i][j] == 0 && BGbin[i][j] == 1) {
                                rcount = rcount + 1.0;
                                sortr[ (int)rcount ] = newBitmap[i][j];
                        }
                }
        }

ShellSort(sortr,maxRow*maxCol);
```

```
        r95 = (int)floor((float)(maxRow*maxCol) - (.05*rcount));
        *threshval = (int)sortr[ r95 ];

for (i = 1; i <= maxRow; i++)
                for (j = 1; j <= maxCol; j++)
                        if (inbin[i][j] == 1 && newBitmap[i][j] > *threshval) reglab[i][j] = 4;

Freelvector(sortr,1, maxRow*maxCol);
        Freelmatrix(inbin,1,maxRow,1,maxCol);
        Freelmatrix(out1bin,1,maxRow,1,maxCol);
        Freelmatrix(out2bin,1,maxRow,1,maxCol);
        Freelmatrix(BGbin,1,maxRow,1,maxCol);
} void Summary(int reglab,int nB,int **INreg,char *ImageFileName,char *FinalFileName,FILE
*ResultsHandle,int thresh,int isopixs,long maxRow,long maxCol)
{
int **BGbin,**CObin,**TRbin,**MAbin,**CObindilate,**MATRbin,**INbin,i,j,nbcount;

char ch,datestring[11],timestring[9],str[80];

/*      Parameters for the 5 primary regions */ float
BGarea,BGsum,BGmean,BGsumsqu,BGmax,BGmin,BGvar,BGstd,COarea,COsum,COmean,COsumsqu,
COmax,COmin,COvar,COstd,MAarea,MAsum,MAmean,MAsumsqu,MAmax,MAmin,MAvar,MAstd,TR
area,TRsum,TRmean,TRsumsqu,TRmax,TRmin,TRvar,TRstd,MATRrowtot,MATRcoltot,MATRgrowsu
m,INarea,INsum,INmean,INsumsqu,INmax,INmin,INvar,INstd;

int
maxN,minN,maxNW,minNW,maxNE,minNE,maxE,minE,maxW,minW,maxS,minS,maxSE,minSE,max
SW,minSW,MATRcentrow,MATRcentcol,N,S,E,W,NE,NW,SE,SW;

/*      Parameters for the 3 combined regions */ float
WBarea,WBsum,WBmean,WBsumsqu,WBmax,WBmin,WBvar,WBstd,COTRarea,COTRsum,COTRmea
n,COTRsumsqu,COTRmax,COTRmin,COTRvar,COTRstd,MATRarea,MATRsum,MATRmean,MATRsu
msqu,MATRmax,MATRmin,MATRvar,MATRstd,COVMD,COVMC,COXarea,MAXarea,TRXarea,MA
TRXarea,WBVMD,WBVMC,WBXarea,MATRVMD,MATRVMC,COpctWB,MApctWB,TRpctWB,COp
ctCOTR,TRpctCOTR,MApctMATR,TRpctMATR,rowtot,coltot,growsum,outerperim,innerperim,wallthic
k,INVMD,INVMC,INXarea;

int centrow,centcol,othresh;

time_t timer;
        struct tm *t;

FILE    *FinalHandle;

datestring[10] = timestring[8] = 0;

timer = time(NULL);
```

```
t = localtime(&timer);
strcpy(str, asctime(t));
memcpy(datestring,str,10);
memcpy(timestring,str+11,8);
datestring[3]=datestring[7] = '_';

CObindilate = Imatrix(1,maxRow,1,maxCol);
BGbin = Imatrix(1,maxRow,1,maxCol);
CObin = Imatrix(1,maxRow,1,maxCol);
INbin = Imatrix(1,maxRow,1,maxCol);

TRbin = Imatrix(1,maxRow,1,maxCol);
MAbin = Imatrix(1,maxRow,1,maxCol);
MATRbin=Imatrix(1,maxRow,1,maxCol);

INarea = INsum = INsumsqu = INmax = 0;
BGarea = BGsum = BGsumsqu = BGmax = 0;
COarea = COsum = COsumsqu = COmax = 0;
MAarea = MAsum = MAsumsqu = MAmax = 0;
TRarea = TRsum = TRsumsqu = TRmax = 0;
WBarea = WBsum = WBsumsqu = WBmax = 0;
COTRarea = COTRsum = COTRsumsqu = COTRmax = 0;
MATRarea = MATRsum = MATRsumsqu = MATRmax = 0;

INmin = BGmin = COmin = INmin = MAmin = TRmin = COTRmin =WBmin = MATRmin = 10000;

for (i = 1; i <= maxRow; i++) {
        for (j = 1; j <= maxCol; j++) {
INbin[i][j] = CObindilate[i][j]=BGbin[i][j]=CObin[i][j]=TRbin[i][j]=MAbin[i][j] = MATRbin[i][j] = 0;

if (reglab[i][j] == 1)     {      /*      Background = 1 */
                                BGbin[i][j] = 1;
                                BGarea++;
                                BGsum += nB[i][j];
                                BGsumsqu += sqr(nB[i][j]);

if (nB[i][j] > BGmax)     BGmax = nB[i][j];
                                if (nB[i][j] < BGmin)     BGmin = nB[i][j];
                        }
                        if (reglab[i][j] == 2)     {      /*      Cortical = 2      */
                                CObin[i][j] = 1 ;
                                CObindilate[i][j] = 1;

COarea++;
                                WBarea++;
                                COTRarea++;
                                COsum += nB[i][j];
                                WBsum += nB[i][j];
                                COTRsum += nB[i][j];
                                COsumsqu += sqr(nB[i][j]);
                                WBsumsqu += sqr(nB[i][j]);
                                COTRsumsqu += sqr(nB[i][j]);
```

```
            if (nB[i][j] > COmax)    COmax = nB[i][j];
            if (nB[i][j] < COmin)    COmin = nB[i][j];
            if (nB[i][j] >WBmax)     WBmax = nB[i][j];
            if (nB[i][j] < WBmin)    WBmin = nB[i][j];
            if (nB[i][j] > COTRmax)  COTRmax = nB[i][j];
            if (nB[i][j] <COTRmin)   COTRmin = nB[i][j];
     }
     if (reglab[i][j] == 3)      {      /*       Marrow = 3      */
            MAbin[i][j] = MATRbin[i][j] = 1;

MAarea++;
            WBarea++;
            MATRarea++;
            MAsum += nB[i][j];
            WBsum += nB[i][j];
            MATRsum += nB[i][j];
            MAsumsqu += sqr(nB[i][j]);
            WBsumsqu += sqr(nB[i][j]);
            MATRsumsqu += sqr(nB[i][j]);

if (nB[i][j] > MAmax)    MAmax = nB[i][j];
            if (nB[i][j] < MAmin)    MAmin = nB[i][j];
            if (nB[i][j] > WBmax)    WBmax = nB[i][j];
            if (nB[i][j] < WBmin)    WBmin = nB[i][j];
            if (nB[i][j] > MATRmax)  MATRmax = nB[i][j];
            if (nB[i][j] < MATRmin)  MATRmin = nB[i][j];
     }
     if (reglab[i][j] == 4)      {      /*       Trabecular = 4      */
            TRbin[i][j] = MATRbin[i][j] = 1;
            TRarea++;
            WBarea++;
            COTRarea++;
            MATRarea++;
            TRsum += nB[i][j];
            WBsum += nB[i][j];
            COTRsum += nB[i][j];
            MATRsum += nB[i][j];
            TRsumsqu += sqr(nB[i][j]);
            WBsumsqu += sqr(nB[i][j]);
            COTRsumsqu += sqr(nB[i][j]);
            MATRsumsqu +=sqr(nB[i][j]);

if (nB[i][j] > TRmax)     TRmax = nB[i][j];
            if (nB[i][j] < TRmin)     TRmin = nB[i][j];
            if (nB[i][j] > WBmax)     WBmax = nB[i][j];
            if (nB[i][j] < WBmin)     WBmin = nB[i][j];
            if (nB[i][j] > COTRmax)   COTRmax = nB[i][j];
            if (nB[i][j] < COTRmin)   COTRmin = nB[i][j];
            if (nB[i][j] > MATRmax)   MATRmax = nB[i][j];
            if (nB[i][j] < MATRmin)   MATRmin = nB[i][j];
     } if (INreg[i][j] == 1)      {      /*       inner region */
```

A- 27

```
                              INbin[i][j] = 1;
                              INarea++;
                              INsum += nB[i][j];
                              INsumsqu += sqr(nB[i][j]);

if (nB[i][j] > INmax)    INmax = nB[i][j];
                              if (nB[i][j] < INmin)    INmin = nB[i][j];
                    }

}
}
/*      calculate region means     */

BGmean = BGsum / BGarea;
COmean = COsum / COarea;
MAmean = MAsum / MAarea;
WBmean = WBsum / WBarea;
INmean = INsum / INarea;
COTRmean = COTRsum / COTRarea;
MATRmean = MATRsum / MATRarea;

/*      calculate region std deviations     */

BGvar = (BGarea*BGsumsqu - sqr(BGsum))/(BGarea*(BGarea - 1));
BGstd = sqrt(BGvar);

INvar = (INarea*INsumsqu - sqr(INsum))/(INarea*(INarea - 1));
INstd = sqrt(INvar);

COvar = (COarea*COsumsqu - sqr(COsum))/(COarea*(COarea - 1));
COstd = sqrt(COvar);

MAvar = (MAarea*MAsumsqu - sqr(MAsum))/(MAarea*(MAarea - 1));
MAstd = sqrt(MAvar);

WBvar = (WBarea*WBsumsqu - sqr(WBsum))/(WBarea*(WBarea - 1));
WBstd = sqrt(WBvar);

COTRvar = (COTRarea*COTRsumsqu-sqr(COTRsum))/(COTRarea*(COTRarea-1));
COTRstd = sqrt(COTRvar);

MATRvar = (MATRarea*MATRsumsqu-sqr(MATRsum))/(MATRarea*(MATRarea-1));
MATRstd = sqrt(MATRvar);

/* calculate VMD */

INVMD =    0.982723 * INmean - 229.0;
COVMD =    0.982723 * COmean - 229.0;
WBVMD =    0.982723 * WBmean - 229.0;
MATRVMD =  0.982723 * MATRmean - 229.0;

/*calculate VMC */
```

A-28

```
INVMC  =   INVMD * 0.12 * 0.0148 * 0.0148 * INarea;
COVMC  =   COVMD * 0.12 * 0.0148 * 0.0148 * COarea;
WBVMC  =   WBVMD * 0.12 * 0.0148 * 0.0148 * WBarea;
MATRVMC =  MATRVMD * 0.12 * 0.0148 * 0.0148 * MATRarea;

/* calculate cross sectional area */

INXarea = INarea * 0.148 * 0.148;
WBXarea = WBarea * 0.148 * 0.148;
COXarea = COarea * 0.148 * 0.148;
MAXarea = MAarea * 0.148 * 0.148;
MATRXarea = MATRarea * 0.148 * 0.148;

/*       calculate percent of total bone for each region       */

COpctWB = COarea / WBarea;
MApctWB = MAarea / WBarea;

COpctCOTR = COarea / COTRarea;

MApctMATR = MAarea / MATRarea;
TRpctWB = TRarea / WBarea;

Dilate(CObindilate, maxRow,maxCol);

/*       calculate moment of inertia and perimeters       */

MATRrowtot = MATRcoltot = MATRgrowsum = rowtot = coltot = growsum = outerperim =
innerperim = 0;

for (i =1; i <= maxRow; i++) {
                for (j=1; j<= maxCol; j++) {
                        if (MAbin[i][j] == 1)  {
                                rowtot += i;
                                coltot += j;
                                growsum += 1;
                        } if (MATRbin[i][j] == 1)  {
                                MATRrowtot += i;
                                MATRcoltot += j;
                                MATRgrowsum += 1;
                        } if (CObindilate[i][j] == 1 && BGbin[i][j] == 1)   outerperim++;
                        if (CObindilate[i][j] == 1 && BGbin[i][j] == 0 && CObin[i][j] == 0)
                                innerperim++;
                }
        }

/*       calculate wall thickness of cortical bone       */
```

```
MATRcentrow = (int)(MATRrowtot /MATRgrowsum);
MATRcentcol = (int)(MATRcoltot / MATRgrowsum );
maxN = maxS = maxE = maxW = maxNE =maxNW = maxSE = maxSW = 0;
minN = minS = minE = minW = minNE = minNW = minSE = minSW = maxRow*maxCol;

for (i = 1; i <= 40; i++) { if (MATRcentrow-i >= 1 && MATRcentrow-
i<=maxRow&&MATRcentcol>=1&&MATRcentcol<=maxRow) {
                N = CObin[MATRcentrow - i][MATRcentcol];
                        if (N==1 && i > maxN)   maxN = i;
                        if (N==1 && i < minN)   minN = i;
        } if (MATRcentrow-i >= 1 && MATRcentrow-
i<=maxRow&&MATRcentcol>=1&&MATRcentcol<=maxRow) {
                NE = CObin[MATRcentrow - i][MATRcentcol+i];
                        if (NE==1 && i > maxNE)   maxNE = i;
                        if (NE==1 && i < minNE)   minNE = i;
        } if (MATRcentrow >= 1 &&
MATRcentrow<=maxRow&&MATRcentcol+i>=1&&MATRcentcol+i<=maxRow) {
                NW = CObin[MATRcentrow][MATRcentcol+i];
                        if (NW==1 && i > maxNW) maxNW = i;
                        if (NW==1 && i < minNW) minNW = i;
        } if (MATRcentrow+i >= 1 &&
MATRcentrow+i<=maxRow&&MATRcentcol+i>=1&&MATRcentcol+i<=maxRow) {
                E = CObin[MATRcentrow + i][MATRcentcol+i];
                        if (E==1 && i > maxE)   maxE = i;
                        if (E==1 && i < minE)   minE = i;
        } if (MATRcentrow+i >= 1 &&
MATRcentrow+i<=maxRow&&MATRcentcol>=1&&MATRcentcol<=maxRow) {
                W = CObin[MATRcentrow + i][MATRcentcol];
                        if (W==1 && i > maxW)   maxW = i;
                        if (W==1 && i < minW)   minW = i;
        } if (MATRcentrow+i >= 1 && MATRcentrow+i<=maxRow&&MATRcentcol-
i>=1&&MATRcentcol-i<=maxRow) {
                S= CObin[MATRcentrow + i][MATRcentcol-i];
                        if (S==1 && i > maxS)   maxS = i;
                        if (S==1 && i < minS)   minS = i;
        } if (MATRcentrow>= 1 && MATRcentrow<=maxRow&&MATRcentcol-
i>=1&&MATRcentcol-i<=maxRow) {
                SE = CObin[MATRcentrow][MATRcentcol-i];
```

```
                    if (SE==1 && i > maxSE) maxSE= i;
                    if (SE==1 && i < minSE) minSE= i;
            } if (MATRcentrow-i>= 1 && MATRcentrow-i<=maxRow&&MATRcentcol-
i>=1&&MATRcentcol-i<=maxRow) {
                    SW = CObin[MATRcentrow - i][MATRcentcol-i];
                    if (SW==1 && i > maxSW)   maxSW= i;
                    if (SW==1 && i < minSW)  minSW= i;
            }
    } wallthick =  0.125*( (float) (maxN+maxNE+maxNW+maxS+maxSW+maxSE+maxE+maxW -
minN - minNE - minNW-minS-minSW-minSE-minE-minW) );

centrow =  (int)(rowtot / growsum);
    centcol =  (int)(coltot / growsum );

/*     dump stats to diskfile     */ fpr(ResultsHandle,"\n%s,%s,%s,%12.5f,%12.5f,%12.5f,%12.5f,%12.5f,%12.5f,%12.5f,%12.5f,
%12.5f,%12.5f,%12.5f,%12.5f,%12.5f,%12.5f,%12.5f,%12.5f,%12.5f,%12.5f,%12.5f,%12.5f,%1
2.5f,%12.5f,%12.5f,%12.5f,%12.5f,%12.5f,%12.5f,%12.5f,%12.5f,%12.5f,%12.5f,%12.5f,%12.5f
,%12.5f,%12.5f,%12.5f,%12.5f,%12.5f,%12.5f,%12.5f,%12.5f,%12.5f,%12.5f,%12.5f,%12.5f,%1
2.5f,%12.5f,%12.5f,%12.5f,%d,%d,%12.5f,%12.5f,%12.5f,%d,%d",ImageFileName,datestring,timestring
,BGmean,BGstd,BGarea,BGmax,BGmin,COmean,COstd,COarea,COmax,COmin,COVMD,COVMC,CO
Xarea,MAmean,MAstd,MAarea,MAmax,MAmin,MAXarea,WBmean,WBstd,WBarea,WBmax,WBmin,
WBVMD,WBVMC,WBXarea,INmean,INstd,INarea,INmax,INmin,INVMD,INVMC,INXarea,COTRmea
n,COTRstd,COTRarea,COTRmax,COTRmin,MATRmean,MATRstd,MATRarea,MATRmax,MATRmin,
MATRVMD,MATRVMC,COpctWB,MApctWB,TRpctWB,COpctCOTR,MApctMATR,centrow,centcol,
wallthick,outerperim,innerperim,thresh,isopixs);

if ((FinalHandle = fopen(FinalFileName,"wb")) != NULL)    { /* was "wt" */
            for (i = 1; i <= maxRow; i++) {
                    for (j = 1; j <= maxCol; j++) {
                            /*fpr(FinalHandle,"\n%d",reglab[i][j]);*/ fputc(reglab[i][j], FinalHandle);
                            fputc(0,FinalHandle);
                    }
            }
    /*fputc(thresh/256,FinalHandle);
    fputc(thresh-(thresh/256)*256,FinalHandle);

othresh = (int)otherthresh;
    fputc(othresh/256,FinalHandle);
    fputc(othresh-(othresh/256)*256,FinalHandle);*/ fclose(FinalHandle);
    }
    else {
```

```
                pr("\n\n\n The final image file named %s could no t be created.",FinalFileName);
                pr("\n Please contact the system administrator for assistance.\n\n\n");
        }

FreeImatrix(MATRbin,1,maxRow,1,maxCol);
        FreeImatrix(CObindilate ,1,maxRow,1,maxCol);
        FreeImatrix(BGbin ,1,maxRow,1,maxCol);
        FreeImatrix(CObin,1,maxRow,1,maxCol);
        FreeImatrix(TRbin ,1,maxRow,1,maxCol);
        FreeImatrix(MAbin ,1,maxRow,1,maxCol);
        FreeImatrix(INbin ,1,maxRow,1,maxCol);

}

/*      QCT.FOR */ void main(int argc,char **argv)
{
        int **Bitmap,**newBitmap,explo,exphi,thresh,**reglab,Maxx,Minn,retval;
        int
**B,**DB,**innerreg,onlytwo,dilatecount,i,j,k,centrow,centcol,int1,int2,threshval,r1,r2,r3,r4;

float varlo,varhi,stdexp,otherthresh;

char ImagesFileName[20],FinalFileName[27],ResultsFileName[20],ImageFileName[20];
        char buff[2],ch,hold;
        int maxxx,minnn,maxnew,incrthresh,isopixs,cortarea,nbcount,critiso,erodenum;
        long int offs,imagecount,maxRow,maxCol ;
        float newsum,regsum;

FILE *ImagesHandle,*ImageHandle, *ResultsHandle;

if (argc != 5) { /* User did not enter 2 filenames, maxRow and maxCol on command line */
                IntroMessage();
                exit(1);
        }
        else    {
                memcpy(ImagesFileName,argv[1],strlen(argv[1])+1);
                memcpy(ResultsFileName,argv[2],strlen(argv[2])+1);
                maxRow = atol(argv[3]);
                maxCol = atol(argv[4]);
        } if ((ImagesHandle = fopen(ImagesFileName,"r")) == NULL) {
```

```
                ImagesMessage();
                exit(1);
        } while ((ResultsHandle = fopen(ResultsFileName,"r")) !=NULL) {
                pr("\n\n\n The results file named %s already exists",ResultsFileName);
                pr("\n in the current directory. \n\n Do you wish to overwrite the file? Y)es N)o ");
                ch = getchar();
                if (ch == 'Y' || ch == 'y') break;
                else    {
                        pr("\n\n\n Enter new results file name: ");
                        scanf("%s",ResultsFileName);
                        fflush(stdin);
                }
        }
/*      Write the summary header to the  file */ if ((ResultsHandle = fopen(ResultsFileName,"w+")) != NULL)
fpr(ResultsHandle,"\nImageFileName,Date,Time,BGmean,BGstd,BGarea,BGmax,BGmin,COmean,COstd
,COarea,COmax,COmin,COVMD,COVMC,COXarea,MAmean,MAstd,MAarea,MAmax,MAmin,MAXa
rea,WBmean,WBstd,WBarea,WBmax,WBmin,WBVMD,WBVMC,WBXarea,INmean,INstd,INarea,INma
x,INmin,INVMD,INVMC,INXarea,COTRmean,COTRstd,COTRarea,COTRmax,COTRmin,MATRmean,
MATRstd,MATRarea,MATRmax,MATRmin,MATRVMD,MATRVMC,COpctWB,MApctWB,TRpctWB,
COpctCOTR,MApctMATR,CenterRow,CenterCol,WallThickness,OuterPerim,InnerPerim,Threshold,Isol
atedPixels");
                else
                        ResultsMessage(ResultsFileName);

imagecount = 0;
        newBitmap = Imatrix(1,maxRow,1,maxCol);
        DB = Imatrix(1,maxRow,1,maxCol);
        B = Imatrix(1,maxRow,1,maxCol);
        reglab = Imatrix(1,maxRow,1,maxCol);
        innerreg = Imatrix(1,maxRow,1,maxCol);

while (fscanf(ImagesHandle,"%s",ImageFileName) != EOF) { if (strlen(ImageFileName)>4 &&
                        (ImageHandle = fopen(ImageFileName,"rb")) != NULL) { pr("\n\n Processing image file: %s\n\n",ImageFileName);

/*      Read in current image file */ maxxx = minnn = offs = 0;
                for (i = 1; i <= maxRow; i++) {
                        for (j = 1; j <= maxCol; j++) {
                                int1 = fgetc(ImageHandle);
                                int2 = fgetc(ImageHandle);
                                if (int2 <maxRow)
                                                newBitmap[i][j] = (int2*256 )+ int1;
```

```
                        else
                                newBitmap[i][j] = ((int2*256) + int1)-65536;

if (newBitmap[i][j] > maxxx) maxxx = newBitmap[i][j];
                        if (newBitmap[i][j] <minnn) minnn = newBitmap[i][j];

}
        } fclose(ImageHandle);

/*      Perform preprocessing */ maxnew = 0;
        for (i = 1; i <= maxRow; i++) {
                for (j = 1; j <= maxCol; j++) { if (newBitmap[i][j] < 0)
                                newBitmap[i][j] = 0;
                        if (newBitmap[i][j] > maxnew)
                                maxnew = newBitmap[i][j];
                }
        }

Histogram(newBitmap, maxRow,maxCol,SIZE, 20,LDEFAULT,RDEFAULT);

incrthresh = -1;
L3000:          incrthresh++;
                threshval = maxnew*(0.5 - 0.01*incrthresh);

for (i = 1; i <= maxRow; i++) {
                        for (j = 1; j <= maxCol; j++) {
                                DB[i][j] = 0;
                                if (newBitmap[i][j] > threshval)    B[i][j] = 1;
                                else                                 B[i][j] = 0;
                        }
                } centrow = 0;
                centcol = 0;

pr("\n Entering Findbig");
                FindBig(B,DB,&centrow,&centcol, maxRow,maxCol);

r1 = r2 = r3 = r4 = 0;

dilatecount = 3;
                onlytwo = 0;

for (i = 1; i <= maxRow; i++)
                        for (j = 1; j <= maxCol; j++)       reglab[i][j] = 0;

pr("\n Entering RegGrow2");
```

A-34

```
                RegGrow2(DB,&onlytwo, maxRow,maxCol);

if (onlytwo != 1) {
                        for (i = 1; i <= 3; i++)        Dilate(DB,maxRow,maxCol);
        if ((retval=CentroidMethod(DB,threshval,newBitmap,maxRow,maxCol))==-1){
                                pr("\n\n Image processing failure in CentroidMethod.\n\n");
                                goto L00;
                        }
                        dilatecount = 6;
                }
                pr("\n Entering RegGrow4");
                RegGrow4(DB,reglab, maxRow,maxCol);
                pr("\n Entering NewStatOpt3");
                NewStatOpt3(newBitmap,reglab, threshval,dilatecount, maxRow,maxCol);
                pr("\n Entering FindOuter");
                FindOuter(reglab, maxRow,maxCol);
                pr("\n Entering HoleFill");
                HoleFill(reglab, maxRow,maxCol);
                pr("\n Entering SplitInner");
                SplitInner(reglab,newBitmap,&threshval,maxRow,maxCol);
                isopixs = 0;
                cortarea = 0;
                for (i=2; i <=maxRow-1; i++) {
                        for (j = 2; j <=maxCol-1; j++) {
                                if (reglab[i][j]==2)          cortarea = cortarea + 1;

if (reglab[i][j]==2 && newBitmap[i][j] < threshval) {
                                        nbcount++;
                                        if (reglab[i-1][j] ==2)    nbcount++;
                                        if (reglab[i+1][j] ==2)    nbcount++;
                                        if (reglab[i][j-1]==2)     nbcount++;
                                        if (reglab[i][j+1]==2)     nbcount++;

if (nbcount == 2)          isopixs++;
                                }
                        }
                }
                critiso = (int)(cortarea * 0.025 );
                if (isopixs > critiso) goto L3000;
                erodenum = 2;
                pr("\n Entering Erode");
                Erode(reglab,erodenum,innerreg,maxRow,maxCol);

memcpy(FinalFileName,ImageFileName,strlen(ImageFileName));
                memcpy(FinalFileName+strlen(ImageFileName),".FINAL\0",7);
                pr("\n Entering Summary");
Summary(reglab,newBitmap,innerreg,ImageFileName,FinalFileName,ResultsHandle,threshval,isopixs,ma
xRow,maxCol);

} /* Is the filename length > 4 and can the file be opened ? */
        L00:    imagecount++;
```

} /* Get the next image loop */

FreeImatrix(newBitmap,1,maxRow,1,maxCol);
FreeImatrix(DB,1,maxRow,1,maxCol);
FreeImatrix(innerreg,1,maxRow,1,maxCol);

FreeImatrix(B,1,maxRow,1,maxCol);
FreeImatrix(reglab,1,maxRow,1,maxCol);

fclose(ImagesHandle);
fclose(ResultsHandle);

pr("\n\n\n QCT has finished processing the images in file %s\n\n\n",ImagesFileName);
}

Jeffrey D. Helterbrand
Richard E. Higgs Jr.
Philip W. Iversen

<u>AUTOMATIC CONTEXTUAL SEGMENTATION FOR IMAGING
BONES FOR OSTEOPOROSIS THERAPIES</u>

APPENDIX B

```
Feb 14 09:42 1996  bonecontent.pro Page 1

Function BoneContent,density,xArea
;*****************************************
; * Calculates the bone mineral content in mg   *
; * from the average bone density (mg/cc) and   *
; * the bone cross sectional area (mm^2).       *
; *                                             *
; * density:                                    *
; * Average bone density (mg/cc).               *
; *                                             *
; * xArea:                                      *
; * Cross sectional area of bone (mm^2).        *
;*****************************************
@common return, density * xArea * VOXELDEPTH / 1000.0

End; BoneContent
```

```
Feb 14 09:44 1996  bonedensity.pro Page 1

Function BoneDensity,intensity
; ****************************************************
; * Calculates the bone density given an array        *
; * of pixel intensity values.  A density is          *
; * computed for each pixel.  Any pixel with          *
; * a negative computed density is set to 0.0.        *
; * The function returns the average density          *
; * value for the intensity array.  Density           *
; * values are in mg/cc.                              *
; *                                                   *
; * intensity:                                        *
; * Array of pixel intensity values.                  *
; ****************************************************
@common density = DENSITYSLOPE * intensity + DENSITYINTERCEPT index = where(density LT 0, count)
if (count GT 0) then begin
   density(index) = 0.0
endif return, avg(density)

End; BoneDensity
```

```
Feb 14 09:45 1996   bonexarea.pro Page 1

Function BoneXArea,count
;*****************************************************
; * Calculates the bone cross-sectional area          *
; * (in mm^2) from a pixel count.                     *
; *                                                   *
; * count:                                            *
; * The number of pixels in an area.                  *
;*****************************************************
@common return, VOXELWIDTH * VOXELHEIGHT * count End; BoneXArea
```

```
Mar 09 16:50 1996  centrumroi.pro Page 1

Function CentrumRoi,spinalImg,inRingImg
;************************************************************
; * Return a binary image with the centrum roi set           *
; * to 1 and all other pixels set to 0.  Centrum roi is      *
; * found by using the spine as a landmark.  The major       *
; * and minor axis of the spine are determined and the       *
; * centrum is the largest roi on either side of the         *
; * major axis of the spine.                                 *
; *                                                          *
; * In a few cases the centrum will not be the largest       *
; * roi on one side of the spine.  In these cases the        *
; * Unix environment variable INVERTCENTRUM should be        *
; * set to 1 and the smaller roi will be taken as the        *
; * centrum.                                                 *
; *                                                          *
; * spinalImg:                                               *
; * Binary image where the spine = 1, everything else 0      *
; *                                                          *
; * inRingImg:                                               *
; * Binary image where inside cortical ring = 1,             *
; * everything else 0.                                       *
;************************************************************
@common centrumImg     = BytArr(IMAGEWIDTH,IMAGEHEIGHT)
centrumRoiImg1 = BytArr(IMAGEWIDTH,IMAGEHEIGHT)
centrumRoiImg2 = BytArr(IMAGEWIDTH,IMAGEHEIGHT)

;Get environment variable flagging special case vertebra
invertCentrum = fix(getenv('INVERTCENTRUM'))

centrumImg = spinalImg
index = where(spinalImg EQ 1,count)
spineData = FltArr(count,2)
for i=0, count-1 do begin
   row = index(i) / IMAGEWIDTH
   col = index(i) - (row * IMAGEWIDTH)
   spineData(i,0) = float(col)
   spineData(i,1) = float(row)
endfor; i
cov = Covariances(spineData,/Var_Covar)

eigVal = EIG(cov, Vectors = eigVect, /Symmetric)

majorSlope = eigVect(1,0) / eigVect(0,0)
minorSlope = -1.0 * (1 / majorSlope)

;Find tangent lines for major axis
maxAbove = -9
maxBelow = -9
for i=0, count-1 do begin
   y0 = float (index(i) / IMAGEWIDTH)
   x0 = float (index(i) - (y0 * IMAGEWIDTH))
   numAbove = 0
   numBelow = 0
   for j=0, count-1 do begin
```

B-2/2

```
Mar 09 16:50 1996  centrumroi.pro Page 2 y = float (index(j) / IMAGEWIDTH)
      x = float (index(j) - (y * IMAGEWIDTH))
      eval = y - majorSlope * (x - x0) - y0
      if (eval GT 0) then numAbove = numAbove + 1
      if (eval LT 0) then numBelow = numBelow + 1
    endfor; j
    if (numAbove GT maxAbove) then begin
      maxAbove = numAbove
      xMajorAbove = x0
      yMajorAbove = y0
    endif
    if (numBelow GT maxBelow) then begin
      maxBelow = numBelow
      xMajorBelow = x0
      yMajorBelow = y0
    endif
  endfor; i ;Find tangent lines for minor axis
  maxAbove = -9
  maxBelow = -9
  for i=0, count-1 do begin
    y0 = float (index(i) / IMAGEWIDTH)
    x0 = float (index(i) - (y0 * IMAGEWIDTH))
    numAbove = 0
    numBelow = 0
    for j=0, count-1 do begin
      y = float (index(j) / IMAGEWIDTH)
      x = float (index(j) - (y * IMAGEWIDTH))
      eval = y - minorSlope * (x - x0) - y0
      if (eval GT 0) then numAbove = numAbove + 1
      if (eval LT 0) then numBelow = numBelow + 1
    endfor; j
    if (numAbove GT maxAbove) then begin
      maxAbove = numAbove
      xMinorAbove = x0
      yMinorAbove = y0
    endif
    if (numBelow GT maxBelow) then begin
      maxBelow = numBelow
      xMinorBelow = x0
      yMinorBelow = y0
    endif
  endfor; i ;Find the 2 candidate centrum ROIs for negative slope case
  if (majorSlope LE 0) then begin
    centrumRoiImg1(*,*) = 0
    centrumRoiImg2(*,*) = 0
    index = where (inRingImg GT 0,count)
    for i=0, count-1 do begin
      y = float (index(i) / IMAGEWIDTH)
      x = float (index(i) - (y * IMAGEWIDTH))

eval1 = y - minorSlope * (x - xMinorBelow) - yMinorBelow
      eval2 = y - minorSlope * (x - xMinorAbove) - yMinorAbove
```

```
Mar 09 16:50 1996  centrumroi.pro Page 3 eval3 = y - majorSlope * (x - xMajorBelow) - yMajorBelow
     if ((eval1 LT 0) AND (eval2 GT 0) AND (eval3 GT 0)) then begin
       centrumRoiImg1(x,y) = 1
     endif eval4 = y - majorSlope * (x - xMajorAbove) - yMajorAbove
     if ((eval1 LT 0) AND (eval2 GT 0) AND (eval4 LT 0)) then begin
       centrumRoiImg2(x,y) = 1
     endif
   endfor; i index1 = where(centrumRoiImg1 EQ 1,count)
   count1 = count
   index2 = where(centrumRoiImg2 EQ 1,count)
   count2 = count
   centrumImg = centrumRoiImg1
   if ((count2 GT count1) AND (Not(invertCentrum))) then begin
     centrumImg = centrumRoiImg2
   endif
   if ((count2 LT count1) AND (invertCentrum)) then begin
     centrumImg = centrumRoiImg2
   endif
 endif ;Find the 2 candidate centrum ROIs for positive slope case
 if (majorSlope GT 0) then begin
   centrumRoiImg1(*,*) = 0
   centrumRoiImg2(*,*) = 0
   index = where (inRingImg GT 0,count)
   for i=0, count-1 do begin
     y = float (index(i) / IMAGEWIDTH)
     x = float (index(i) - (y * IMAGEWIDTH))

eval1 = y - minorSlope * (x - xMinorBelow) - yMinorBelow
     eval2 = y - minorSlope * (x - xMinorAbove) - yMinorAbove
     eval3 = y - majorSlope * (x - xMajorBelow) - yMajorBelow
     if ((eval1 LT 0) AND (eval2 GT 0) AND (eval3 LT 0)) then begin
       centrumRoiImg1(x,y) = 1
     endif eval4 = y - majorSlope * (x - xMajorAbove) - yMajorAbove
     if ((eval1 LT 0) AND (eval2 GT 0) AND (eval4 LT 0)) then begin
       centrumRoiImg2(x,y) = 1
     endif endfor; i index1 = where(centrumRoiImg1 EQ 1,count)
   count1 = count
   index2 = where(centrumRoiImg2 EQ 1,count)
   count2 = count
   centrumImg = centrumRoiImg1
   if ((count2 GT count1) AND (Not(invertCentrum))) then begin
     centrumImg = centrumRoiImg2
   endif
   if ((count2 LT count1) AND (invertCentrum)) then begin
```

```
Mar 09 16:50 1996  centrumroi.pro Page 4 centrumImg = centrumRoiImg2
  endif
endif

;Add the eigen vectors to image for manuscript if specified
;---------------------------------------------------------------
if (MANUSCRIPTOUTPUT) then begin
  lineImg = IntArr(IMAGEWIDTH,IMAGEHEIGHT)
  lineImg = fix(spinalImg)
  for x = 0,IMAGEWIDTH-1 do begin
    y1 = minorSlope * (x - xMinorAbove) + yMinorAbove
    y2 = minorSlope * (x - xMinorBelow) + yMinorBelow
    y3 = majorSlope * (x - xMajorAbove) + yMajorAbove
    y4 = majorSlope * (x - xMajorBelow) + yMajorBelow if ((y1 GE 0) AND (y1 LT IMAGEHEIGHT)) then lineImg(x,y1) = 2
    if ((y2 GE 0) AND (y2 LT IMAGEHEIGHT)) then lineImg(x,y2) = 2
    if ((y3 GE 0) AND (y3 LT IMAGEHEIGHT)) then lineImg(x,y3) = 2
    if ((y4 GE 0) AND (y4 LT IMAGEHEIGHT)) then lineImg(x,y4) = 2
  endfor; x
  lineImg2 = IntArr(256,256)
  lineImg2 = fix(rebin(lineImg,256,256,Sample=1))
  openw,unit,'lines.img',/Get_Lun
  writeu,unit,lineImg2
  free_lun,unit
endif return, centrumImg End; CentrumRoi
```

```
;       :48 1996   classifyneighbors.pro Page 1

Pro ClassifyNeighbors,image,objectNum,row,col,numNeighbors
;***********************************************
;* Given a pixel defined by row and col,         *
;* classify the pixel and any numNeighbors lit   *
;* neighbor pixels as class objectNum.           *
;*                                               *
;* If any of the numNeighbors neighbor pixels    *
;* to the pixel defined by row and col are lit,  *
;* recursively call this procedure to classify   *
;* the numNeighbors neighbors of the original    *
;* neighbor pixel.                               *
;*                                               *
;* numNeighbors must be either 4 or 8.           *
;*                                               *
;* Note: Pixels in image that have a value of    *
;*       < 0 are pixels that are lit and have    *
;*       not yet been classified.                *
;*       Candidate pixels for classification     *
;*       are < 0 because it is assumed that all  *
;*       valid object numbers to assign a pixel  *
;*       are >= 0.                               *
;*                                               *
;* image:                                        *
;* Integer array of image to process             *
;*                                               *
;* objectNum:                                    *
;* Number to assign to pixels in object          *
;*                                               *
;* row:                                          *
;* Row identifying initial pixel to grow object  *
;*                                               *
;* col:                                          *
;* Column identifying initial pixel to grow      *
;* object                                        *
;*                                               *
;* numNeighbors:                                 *
;* Neighbor definition (must be either 4 or 8)   *
;***********************************************
@common ; Error check the input parameters
;---------------------------------
if ((numNeighbors NE 4) AND (numNeighbors NE 8)) then begin
   WriteLogFile, '*** Error: ClassifyNeighbors: numNeighbors must be 4 or 8'
endif for i=-1,1 do begin
   for j=-1,1 do begin
      pixDist = Abs(i) + Abs(j)
      if (((numNeighbors EQ 4) AND (pixDist LT 2)) OR (numNeighbors EQ 8)) then begin
         if (((col + j) LT IMAGEWIDTH) AND $
             ((col + j) GE 0) AND $
             ((row + i) LT IMAGEHEIGHT) AND $
             ((row + i) GE 0)) then begin if (image(col + j,row + i) LT 0) then begin
```

B-4/2

```
Jan 13 09:48 1996   classifyneighbors.pro Page 2 image(col + j,row + i) = objectNum
         ClassifyNeighbors,image,objectNum,row + i,col + j,numNeighbors
       endif endif; Inside array bounds
    endif; Neighboring is valid
  endfor; j
endfor; i End; ClassifyNeighbors
```

B-5/1

```
Mar 20 09:47 1996  common.pro Page 1 common histogramVariables,    hist,histX,histPrime,filtHist,filtHistPrime
IMAGEWIDTH = 128
IMAGEHEIGHT = 128

DISPLAYWIDTH = 256
DISPLAYHEIGHT = 256

LOGFILE = 'histseg.log'
RESULTSFILE = 'results.dat'

;Histogram for ROI determination
;-------------------------------
HISTBINSIZE = 1
HISTMIN = 1
HISTSMOOTHLENGTH = 10

;Filter constants
;----------------
GAUSS3X3FILTER = 0
GAUSS5X5FILTER = 1
GAUSS9X9FILTER = 2

PRINTING = 0

VERTEBRA = 1

ROITHRESHFACTOR = 1.00   ; 1.05 for non-vertebra, 1.0 for vertebra

DISTANCEPOWER = 0.25     ; 0.15 for cows, 0.25 for rats

ROINUMEROSIONS = 0       ; 1 for non-vertebra, 0 for vertebra
ROIEROSIONTHRESH = 0

RINGNUMEROSIONS = 2      ; 1 for non-vertebra, 2 for vertebra
RINGEROSIONTHRESH = 0

CENTRUMNUMEROSIONS = 0
CENTRUMEROSIONTHRESH = 0

NUMFLICKERS = 100

MANUSCRIPTOUTPUT = 1

;Voxel size definitions
;----------------------
VOXELWIDTH = 0.197    ;(units are mm) 0.590 for cows, 0.148 for rats, 0.197 for rat
VOXELHEIGHT = 0.197   ;(units are mm) 0.590 for cows, 0.148 for rats, 0.197 for rat
VOXELDEPTH = 1.20     ;(units are mm)

;Linear equation for density
;---------------------------
DENSITYSLOPE = 0.982723
DENSITYINTERCEPT = -229.0
```

B-5/2

```
Feb 16 09:23 1996 computestats.pro Page 1

Pro ComputeStats,img,segImg,imageFileName
;*****************************************
; * Write out simple statistics for each region *
; * of the segmented image.                     *
; *                                             *
; * img:                                        *
; * The original image read from disk.          *
; *                                             *
; * segImg:                                     *
; * The image segmented into the following      *
; * regions:                                    *
; *                                             *
; * Background      = 0                         *
; * Cortical        = 1                         *
; * Marrow/Trabecular = 2                       *
; * Spine           = 3                         *
; * Centrum         = 4                         *
; *                                             *
; * imageFileName:                              *
; * The name of the image to compute stats for  *
;*****************************************
@common index = where(segImg EQ 1,count)
corticalCount = count
corticalAvgInten = 0.0
corticalMinInten = 0.0
corticalMaxInten = 0.0
corticalAvgDensity = 0.0
corticalXArea = 0.0
corticalContent = 0.0
if (corticalCount GT 0) then begin
  corticalAvgInten = Avg(img(index))
  corticalMinInten = Min(img(index))
  corticalMaxInten = Max(img(index))
  corticalAvgDensity = boneDensity(img(index))
  corticalXArea = boneXArea(corticalCount)
  corticalContent = boneContent(corticalAvgDensity,corticalXArea)
endif index = where(segImg EQ 2,count)
marrowTrabCount = count
marrowTrabAvgInten = 0.0
marrowTrabMinInten = 0.0
marrowTrabMaxInten = 0.0
marrowTrabAvgDensity = 0.0
marrowTrabXArea = 0.0
marrowTrabContent = 0.0
if (marrowTrabCount GT 0) then begin
  marrowTrabAvgInten = Avg(img(index))
  marrowTrabMinInten = Min(img(index))
  marrowTrabMaxInten = Max(img(index))
  marrowTrabAvgDensity = boneDensity(img(index))
  marrowTrabXArea = boneXArea(marrowTrabCount)
  marrowTrabContent = boneContent(marrowTrabAvgDensity,marrowTrabXArea)
endif
```

```
Feb 16 09:23 1996  computestats.pro Page 2 index = where(segImg EQ 3,count)
spineCount = count
spineAvgInten = 0.0
spineMinInten = 0.0
spineMaxInten = 0.0
spineAvgDensity = 0.0
spineXArea = 0.0
spineContent = 0.0
if (spineCount GT 0) then begin
   spineAvgInten = Avg(img(index))
   spineMinInten = Min(img(index))
   spineMaxInten = Max(img(index))
   spineAvgDensity = boneDensity(img(index))
   spineXArea = boneXArea(spineCount)
   spineContent = boneContent(spineAvgDensity,spineXArea)
endif index = where(segImg EQ 4,count)
centrumCount = count
centrumAvgInten = 0.0
centrumMinInten = 0.0
centrumMaxInten = 0.0
centrumAvgDensity = 0.0
centrumXArea = 0.0
centrumContent = 0.0
if (centrumCount GT 0) then begin
   centrumAvgInten = Avg(img(index))
   centrumMinInten = Min(img(index))
   centrumMaxInten = Max(img(index))
   centrumAvgDensity = boneDensity(img(index))
   centrumXArea = boneXArea(centrumCount)
   centrumContent = boneContent(centrumAvgDensity,centrumXArea)
endif index = where((segImg EQ 1) OR (segImg EQ 2) OR (segImg EQ 4),count)
wholeBoneCount = count
wholeBoneAvgInten = 0.0
wholeBoneMinInten = 0.0
wholeBoneMaxInten = 0.0
wholeBoneAvgDensity = 0.0
wholeBoneXArea = 0.0
wholeBoneContent = 0.0
if (wholeBoneCount GT 0) then begin
   wholeBoneAvgInten = Avg(img(index))
   wholeBoneMinInten = Min(img(index))
   wholeBoneMaxInten = Max(img(index))
   wholeBoneAvgDensity = boneDensity(img(index))
   wholeBoneXArea = boneXArea(wholeBoneCount)
   wholeBoneContent = boneContent(wholeBoneAvgDensity,wholeBoneXArea)
endif ;Append stats to results file
;----------------------------
t = systime()
timeString = Strmid(t, 0, Strlen(t) - 1)
```

```
Feb 16 09:23 1996  computestats.pro  Page 3

;Determine if results file exists
fileNames = FindFile(RESULTSFILE, Count=resultsExist)

openw,unit,RESULTSFILE,/Append,/Get_Lun

;Write out a column header if results file did not previously exist
;------------------------------------------------------------------
if ((VERTEBRA) AND (Not(resultsExist))) then begin
   printf, unit, $
         'Time,File,' + $
         'CortPixelCnt,CortPixelAvg,CortPixelMin,CortPixelMax,CortAvgDensity,CortXAre'
         'MaTrPixelCnt,MaTrPixelAvg,MaTrPixelMin,MaTrPixelMax,MaTrAvgDensity,MaTrXAre'
         'SpinPixelCnt,SpinPixelAvg,SpinPixelMin,SpinPixelMax,SpinAvgDensity,SpinXAre'
         'CentPixelCnt,CentPixelAvg,CentPixelMin,CentPixelMax,CentAvgDensity,CentXAre'
         'WBonPixelCnt,WBonPixelAvg,WBonPixelMin,WBonPixelMax,WBonAvgDensity,WBonXAre'
endif if ((Not(VERTEBRA)) AND (Not(resultsExist))) then begin
   printf, unit, $
         'Time,File,' + $
         'CortPixelCnt,CortPixelAvg,CortPixelMin,CortPixelMax,CortAvgDensity,CortXAre'
         'MaTrPixelCnt,MaTrPixelAvg,MaTrPixelMin,MaTrPixelMax,MaTrAvgDensity,MaTrXAre'
         'WBonPixelCnt,WBonPixelAvg,WBonPixelMin,WBonPixelMax,WBonAvgDensity,WBonXAre'
endif if (VERTEBRA) then begin
   printf,unit,strCompress(timeString) + "," + $
              strCompress(imageFileName) + "," + $
              strCompress(string(corticalCount)) + "," + $
              strCompress(string(corticalAvgInten)) + "," + $
              strCompress(string(corticalMinInten)) + "," + $
              strCompress(string(corticalMaxInten)) + "," + $
              strCompress(string(corticalAvgDensity)) + "," + $
              strCompress(string(corticalXArea)) + "," + $
              strCompress(string(corticalContent)) + "," + $
              strCompress(string(marrowTrabCount)) + "," + $
              strCompress(string(marrowTrabAvgInten)) + "," + $
              strCompress(string(marrowTrabMinInten)) + "," + $
              strCompress(string(marrowTrabMaxInten)) + "," + $
              strCompress(string(marrowTrabAvgDensity)) + "," + $
              strCompress(string(marrowTrabXArea)) + "," + $
              strCompress(string(marrowTrabContent)) + "," + $
              strCompress(string(spineCount)) + "," + $
              strCompress(string(spineAvgInten)) + "," + $
              strCompress(string(spineMinInten)) + "," + $
              strCompress(string(spineMaxInten)) + "," + $
              strCompress(string(spineAvgDensity)) + "," + $
              strCompress(string(spineXArea)) + "," + $
              strCompress(string(spineContent)) + "," + $
              strCompress(string(centrumCount)) + "," + $
              strCompress(string(centrumAvgInten)) + "," + $
              strCompress(string(centrumMinInten)) + "," + $
              strCompress(string(centrumMaxInten)) + "," + $
              strCompress(string(centrumAvgDensity)) + "," + $
              strCompress(string(centrumXArea)) + "," + $
```

B-7/1

```
Feb 16 09:23 1996  computestats.pro Page 4 strCompress(string(centrumContent)) + "," + $
              strCompress(string(wholeBoneCount)) + "," + $
              strCompress(string(wholeBoneAvgInten)) + "," + $
              strCompress(string(wholeBoneMinInten)) + "," + $
              strCompress(string(wholeBoneMaxInten)) + "," + $
              strCompress(string(wholeBoneAvgDensity)) + "," + $
              strCompress(string(wholeBoneXArea)) + "," + $
              strCompress(string(wholeBoneContent))
endif else begin
   printf,unit,strCompress(timeString) + "," + $
              strCompress(imageFileName) + "," + $
              strCompress(string(corticalCount)) + "," + $
              strCompress(string(corticalAvgInten)) + "," + $
              strCompress(string(corticalMinInten)) + "," + $
              strCompress(string(corticalMaxInten)) + "," + $
              strCompress(string(corticalAvgDensity)) + "," + $
              strCompress(string(corticalXArea)) + "," + $
              strCompress(string(corticalContent)) + "," + $
              strCompress(string(marrowTrabCount)) + "," + $
              strCompress(string(marrowTrabAvgInten)) + "," + $
              strCompress(string(marrowTrabMinInten)) + "," + $
              strCompress(string(marrowTrabMaxInten)) + "," + $
              strCompress(string(marrowTrabAvgDensity)) + "," + $
              strCompress(string(marrowTrabXArea)) + "," + $
              strCompress(string(marrowTrabContent)) + "," + $
              strCompress(string(wholeBoneCount)) + "," + $
              strCompress(string(wholeBoneAvgInten)) + "," + $
              strCompress(string(wholeBoneMinInten)) + "," + $
              strCompress(string(wholeBoneMaxInten)) + "," + $
              strCompress(string(wholeBoneAvgDensity)) + "," + $
              strCompress(string(wholeBoneXArea)) + "," + $
              strCompress(string(wholeBoneContent))
endelse close,unit End; ComputeStats
```

```
Feb 14 09:49 1996  dilateimage.pro Page 1

Function DilateImage,image,numNeighbors
;********************************************************
;* Performs a dilation on image.                         *
;* Objects in the images are assumed to be 1             *
;* with a backgound of 0.                                *
;*                                                       *
;* A pixel is changed from 0 to 1 if                     *
;* it is touching a lit pixel. Touching is               *
;* defined by numNeighbors. If numNeighbors              *
;* is 4 then any off 4 neighbor pixels touching          *
;* an on pixel are turned on. A similar                  *
;* operation is performed for numNeighbors = 8.          *
;*                                                       *
;* image:                                                *
;* Array representing image (byte,int,float)             *
;*                                                       *
;* numNeighbors:                                         *
;* Defines neighborhood (must be either 4 or 8)          *
;********************************************************
@common if ((numNeighbors NE 4) AND (numNeighbors NE 8)) then begin
  WriteLogFile, '*** Error: DilateImage: numNeighbors not = 4 or 8'
endif index = where(image EQ 1,count)

outImage = image if (count GT 0) then begin
  for i=0,count-1 do begin
    row = index(i) / IMAGEWIDTH
    col = index(i) - (row * IMAGEWIDTH)
    if ((row GT 0) AND (row LT IMAGEHEIGHT - 1) AND $
        (col GT 0) AND (col LT IMAGEWIDTH - 1)) then begin if (image(col,row-1) EQ 0) then begin
        outImage(col,row-1) = 1
      endif if (image(col,row+1) EQ 0) then begin
        outImage(col,row+1) = 1
      endif if (image(col-1,row) EQ 0) then begin
        outImage(col-1,row) = 1
      endif if (image(col+1,row) EQ 0) then begin
        outImage(col+1,row) = 1
      endif if ((image(col-1,row-1) EQ 0) AND (numNeighbors EQ 8)) then begin
        outImage(col-1,row-1) = 1
      endif
```

B-8/1

```
Feb 14 09:49 1996  dilateimage.pro Page 2 if ((image(col-1,row+1) EQ 0) AND (numNeighbors EQ 8)) then begin
         outImage(col-1,row+1) = 1
      endif if ((image(col+1,row-1) EQ 0) AND (numNeighbors EQ 8)) then begin
         outImage(col+1,row-1) = 1
      endif if ((image(col+1,row+1) EQ 0) AND (numNeighbors EQ 8)) then begin
         outImage(col+1,row+1) = 1
      endif endif
  endfor; i
endif return, outImage End; DilateImage
```

```
Feb 16 09:24 1996  erodeimage.pro Page 1

Function ErodeImage, image, threshold
;****************************************************
;* Performs an erosion on image.                     *
;* Objects in the images are assumed to be 1         *
;* with a backgound of 0.                            *
;*                                                   *
;* A pixel is changed from 1 to 0 if                 *
;* > threshold of its 8 neighbors are 0.             *
;*                                                   *
;* image:                                            *
;* Array representing image (byte,int,float)         *
;*                                                   *
;* threshold:                                        *
;* Must have > threshold 8 neighbor pixels           *
;* equal to 0 in order to make central pixel 0.      *
;****************************************************
@common if ((threshold LT 0) OR (threshold GT 7)) then begin
   WriteLogFile, '*** Error: ErodeImage: Must Satisfy - 0<=threshold<= 7 '
endif index = where(image EQ 1,count)

outImage = image if (count GT 0) then begin
   for i=0,count-1 do begin
      row = index(i) / IMAGEWIDTH
      col = index(i) - (row * IMAGEWIDTH)
      if ((row GT 0) AND (row LT IMAGEHEIGHT - 1) AND $
         (col GT 0) AND (col LT IMAGEWIDTH - 1)) then begin offIndex = where(image(col-1:col+1,row-1:row+1) EQ 0,offCount)
         if (offCount GT threshold) then begin
            outImage(col,row) = 0
         endif endif
   endfor; i
endif return, outImage End; ErodeImage
```

```
Feb 14 09:52 1996  filterimage.pro Page 1

Function FilterImage,image,type
;******************************************************
;* Filters image with the kernel specified by         *
;* type. A floating point image is returned.          *
;* image is converted to a float prior to doing       *
;* the convolution as recommended in the              *
;* PV-Wave Reference manual.                          *
;* The ASCII files describing the filter kernel       *
;* must reside in the directory of this program       *
;*                                                    *
;* image:                                             *
;* The image to be filtered                           *
;*                                                    *
;* type:                                              *
;* A constant specifying the filter to use            *
;******************************************************
@common Case type Of
   GAUSS3X3Filter: Begin
                      kernel = IntArr(3,3)
                      filterName = 'gauss3x3.dat'
                   End
   GAUSS5X5Filter: Begin
                      kernel = IntArr(5,5)
                      filterName = 'gauss5x5.dat'
                   End
   GAUSS9X9Filter: Begin
                      kernel = IntArr(9,9)
                      filterName = 'gauss9x9.dat'
                   End
   Else:           Begin
                      WriteLogFile,'*** Error: Invalid filter type passed to FilterImag
                      exit
                   End
EndCase ;Read in the filter from ASCII kernel file
;------------------------------------------
status = DC_READ_FREE(filterName,kernel,/Col)
if (status LT 0) then begin
   WriteLogFile,'*** Error: did not read in filter kernel correctly'
   exit
endif ;Filter the image
;----------------
filtImage = convol(float(image),kernel)

return, filtImage

End; FilterImage
```

B-9/2

```
Feb 16 09:26 1996  growcortical.pro Page 1

Pro GrowCortical,innerImage,cortImage,cortStat,cortThresh
;****************************************************
;* Grows the cortical region by classifying any     *
;* pixel above the cortical stat threshold that     *
;* is touching the cortical region as cortical.     *
;* Procedure is recursively called for any          *
;* pixel classified.                                *
;* An 8-connected cortical region is assumed        *
;*                                                  *
;* innerImage:                                      *
;* Pixels inside cortical ring = 1                  *
;*                                                  *
;* cortImage:                                       *
;* Pixels in cortical region = 1                    *
;*                                                  *
;* cortStat:                                        *
;* 2-D array containing the cortical statistic      *
;* value for each pixel in the inner ROI.           *
;*                                                  *
;* cortThresh:                                      *
;* Threshold where any pixel touching cortical      *
;* region with a cortStat value >= cortThresh       *
;* should be classified as a cortical pixel.        *
;****************************************************
@common img = bytArr(IMAGEWIDTH,IMAGEHEIGHT)

index = where(innerImage EQ 1,count)

img = innerImage + 2 * cortImage growthCounter = 0
for i=0,count-1 do begin
  row = index(i) / IMAGEWIDTH
  col = index(i) - (row * IMAGEWIDTH)
  if ((col NE 0) AND (col NE IMAGEWIDTH - 1) AND $
      (row NE 0) AND (row NE IMAGEHEIGHT - 1)) then begin
    m = max(img(col-1:col+1,row-1:row+1))
    if ((m EQ 2) AND $
        (cortStat(col,row) GE cortThresh)) then begin
      innerImage(col,row) = 0
      cortImage(col,row) = 1
      growthCounter = growthCounter + 1
    endif
  endif
endfor; i if (growthCounter GT 0) then begin
  GrowCortical,innerImage,cortImage,cortStat,cortThresh
endif End; GrowCortical
```

B-10/1

```
Mar 20   1996  histseg.pro Page 1

Pro HistSeg
;*****************************************************
;* Segment animal QCT images into cortical,          *
;* marrow/trabecular, spine, and centrum             *
;* regions.  Spine and centrum regions only          *
;* apply to vertebra.                                *
;*                                                   *
;* For each region compute and write to disk a       *
;* set of statistics describing the region.          *
;*                                                   *
;* The UNIX environment variable PVFNAME             *
;* contains the name of the QCT image to             *
;* analyze.                                          *
;*                                                   *
;* Constants and parameters defining the             *
;* analysis are contained in the file                *
;* common.pro                                        *
;*****************************************************
@common WriteLogFile,'Raloxifene QCT Imaging'

;File to analyze specified in environment variable
imageFileName = getenv('PVFNAME')

;Allocate some array space for images
;------------------------------------
img          = IntArr(IMAGEWIDTH,IMAGEHEIGHT) ;Original image read from file
filtImg      = FltArr(IMAGEWIDTH,IMAGEHEIGHT) ;Filtered original image
byteImg      = BytArr(IMAGEWIDTH,IMAGEWIDTH)  ;Byte scaled version of img
roiImg       = BytArr(IMAGEWIDTH,IMAGEHEIGHT) ;Largest bone + interior holes = 1, e
cortImg      = BytArr(IMAGEWIDTH,IMAGEHEIGHT) ;Cortical bone = 1, everything else =
ringImg      = BytArr(IMAGEWIDTH,IMAGEHEIGHT) ;Cortical ring = 1, everything else =
inRingImg    = BytArr(IMAGEWIDTH,IMAGEHEIGHT) ;Inside cortical ring = 1, everything
grownRingImg = BytArr(IMAGEWIDTH,IMAGEHEIGHT) ;Grown cortical ring = 1, everything
grownInRingImg = BytArr(IMAGEWIDTH,IMAGEHEIGHT) ;Inner ring after growing = 1, everyt
spinalImg    = BytArr(IMAGEWIDTH,IMAGEHEIGHT) ;Spinal cavity = 1, everything else =
centrumImg   = BytArr(IMAGEWIDTH,IMAGEHEIGHT) ;Centrum cavity = 1, everything else
tempImg      = BytArr(IMAGEWIDTH,IMAGEHEIGHT) ;Temporary working image
roiEroded1Img = BytArr(IMAGEWIDTH,IMAGEHEIGHT) ;roiImg eroded image
roiEroded2Img = BytArr(IMAGEWIDTH,IMAGEHEIGHT) ;roiImg eroded image
innerImg     = BytArr(IMAGEWIDTH,IMAGEHEIGHT) ;Marrow + trabecular = 1, everything
segImg       = BytArr(IMAGEWIDTH,IMAGEHEIGHT) ;Background=0,Cortical=1,Marrow+Trab=
ringSpineImg = BytArr(IMAGEWIDTH,IMAGEHEIGHT) ;Cortical ring & spinal cavity = 1, e ;Read in the binary image file produced by Stratec
openr,unit,imageFileName, /Get_Lun
readu,unit,img
close,unit
byteOrder,img,/Sswap byteImg = bytscl(img,min=0)
filtImg = FilterImage(img,GAUSS3X3FILTER)
byteFiltImg = bytscl(filtImg,min=0)

;Create a segmented image based on our ROI threshold
```

```
Mar 20 09:47 1996  histseg.pro Page 2

;--------------------------------------------------------
roiThresh = ROIThreshold(byteFiltImg)
roiThresh = roiThresh * ROITHRESHFACTOR
roiEroded1Img(*,*) = 0
roiEroded1Img(where(byteFiltImg GE roiThresh)) = 1
roiEroded2Img = roiEroded1Img
for i=1, ROINUMEROSIONS do begin
  roiEroded2Img = ErodeImage(roiEroded1Img,ROIEROSIONTHRESH)
  roiEroded1Img = roiEroded2Img
endfor; i
roiImg = roiEroded2Img
LargestObject,roiImg,8

;Find the cortical ring
;----------------------
roiEroded1Img = roiImg
for i=1, RINGNUMEROSIONS do begin
  roiEroded2Img = ErodeImage(roiEroded1Img,RINGEROSIONTHRESH)
  roiEroded1Img = roiEroded2Img
endfor; i
ringImg = roiImg - roiEroded2Img ; Find the intensity and distance of pixels inside ring
; --------------------------------------------------------
if (Not(VERTEBRA)) then begin
  distArray = fltArr(IMAGEWIDTH * IMAGEHEIGHT)
  intenArray = bytArr(IMAGEWIDTH * IMAGEHEIGHT)
  ringIndex = where(ringImg EQ 1,count)
  ringCount = count
  roiIndex = where(roiEroded2Img EQ 1,count)
  roiCount = count for i=0,roiCount - 1 do begin
    row = roiIndex(i) / IMAGEWIDTH
    col = roiIndex(i) - (row * IMAGEWIDTH)

minDist = (float(IMAGEWIDTH))^2 + (float(IMAGEHEIGHT))^2 for j=0,ringCount-1 do begin
      ringRow = ringIndex(j) / IMAGEWIDTH
      ringCol = ringIndex(j) - (ringRow * IMAGEWIDTH)
      dist = (float(ringRow - row))^2 + (float(ringCol - col))^2
      if (dist LT minDist) then begin
        minDist = dist
      endif
    endfor; j distArray(i) = minDist
    intenArray(i) = byteFiltImg(col,row)
  endfor; i innerIntensities = intenArray(0:roiCount - 1)
  innerDistances = distArray(0:roiCount - 1)

;Compute the cortical statistic used to classify inner pixels
;--------------------------------------------------------
```

B-11/1

```
Mar 20 09:47 1996  histseg.pro Page 3 corticalStat = FltArr(roiCount)
  cortical2x2Stat = FltArr(IMAGEWIDTH,IMAGEHEIGHT)
  interMax = float(max(innerIntensities))
  distMax = float(max(innerDistances))
  interMin = float(min(innerIntensities))
  distMin = float(min(innerDistances))
  for i=0, roiCount-1 do begin
    row = roiIndex(i) / IMAGEWIDTH
    col = roiIndex(i) - (row * IMAGEWIDTH)
    numer = (float(innerIntensities(i)) - interMin) / interMax
    denom = (float(innerDistances(i)) - distMin) / distMax
    denom = denom ^ (DISTANCEPOWER)
    if (denom GT 0) then begin
      corticalStat(i) = numer / denom
      cortical2x2Stat(col,row) = corticalStat(i)
    endif else begin
      corticalStat(i) = -1.0
      cortical2x2Stat(col,row) = -1.0
    endelse
  endfor; i corticalStatMax = max(corticalStat)
  index = where(corticalStat LT 0, count)
  if (count GT 0) then begin
    corticalStat(index) = corticalStatMax
  endif
  index = where(cortical2x2Stat LT 0,count)
  if (count GT 0) then begin
    cortical2x2Stat(index) = corticalStatMax
  endif ;Cluster the cortical statistic into 3 clusters
  ;Cortical threshold is the min cort stat of the middle cluster
  ;-------------------------------------------------------------
  x = FltArr(roiCount,1)
  x(*,0) = corticalStat seeds = FltArr(3,1)
  seeds(0,0) = min(corticalStat)
  seeds(1,0) = median(corticalStat)
  seeds(2,0) = max(corticalStat)

clusters = k_means(x,seeds)

index = where(clusters EQ 2)
  corticalThresh = min(corticalStat(index))
endif

;Find the region inside the cortical ring
;----------------------------------------
inRingImg = roiImg + 2 * ringImg
inRingImg(where(inRingImg NE 1)) = 0

;Grow the coritcal ring
;----------------------
grownRingImg = ringImg
```

B-11/2

```
Mar 20 09:47 1996  histseg.pro Page 4 grownInRingImg = inRingImg
if (Not(VERTEBRA)) then begin
  GrowCortical, grownInRingImg, grownRingImg, $
            cortical2x2Stat,corticalThresh LargestObject, grownInRingImg,4 grownRingImg = roiImg
  index = where(grownInRingImg EQ 1,count)
  if (count GT 0) then begin
    grownRingImg(index) = 0
  endif
endif ;Find spinal cavity threshold for vertebra
;------------------------------------------
if (VERTEBRA) then begin
  spinalImg(*,*) = 0
  spinalImg(where(byteFiltImg LT (roiThresh / ROITHRESHFACTOR))) = 1
  spinalImg = spinalImg * roiImg
  LargestObject,spinalImg,8
  tempImg = DilateImage(spinalImg,4)
  spinalImg = tempImg
endif ;Find the centrum area for vertebra
;----------------------------------
if (VERTEBRA) then begin
  centrumImg = CentrumRoi(spinalImg,inRingImg)
  roiEroded1Img = centrumImg
  roiEroded2Img = roiEroded1Img
  for i=1, CENTRUMNUMEROSIONS do begin
    roiEroded2Img = ErodeImage(roiEroded1Img,CENTRUMEROSIONTHRESH)
    roiEroded1Img = roiEroded2Img
  endfor; i
  centrumImg = roiEroded2Img
endif ;Create the composite segmented image
; Background         = 0
; Cortical           = 1
; Marrow/Trabecular  = 2
; Spine              = 3
; Centrum            = 4
;------------------------------------
segImg = grownRingImg index = where(grownInRingImg EQ 1,count)
if (count GT 0) then begin
  segImg(index) = 0
endif
segImg = segImg + 2 * grownInRingImg index = where(spinalImg EQ 1,count)
if (count GT 0) then begin
  segImg(index) = 0
```

```
Mar 20 09:47 1996  histseg.pro Page 5 endif
segImg = segImg + 3 * spinalImg index = where(centrumImg EQ 1,count)
if (count GT 0) then begin
   segImg(index) = 0
endif
segImg = segImg + 4 * centrumImg ComputeStats,img,segImg,imageFileName ;Write out segmented image
;-------------------------
binFileName = imageFileName + '.PV2'
openw,unit,binFileName,/Get_Lun
writeu,unit,segImg
free_lun,unit ;------------------
;Plot the images
;------------------
if (PRINTING) then begin
   Set_Plot,'ps'
   Device,/Portrait
   Device,/Color,Bits=8
   Device,/Inches,XSize=7.5
   Device,/Inches,YSize=10.0
   Device,/Inches,XOffset=1.0
   Device,/Inches,YOffset=0.5
endif ;Load Blue-Red color table
loadct,11 xOffset = 14
yOffset = 78

;Plot the original image
;-----------------------
if (Not(PRINTING)) then begin
   xPos = 0
   yPos = 760
   windowCtr = 0
   window,windowCtr,Title='Original Image',XSiz=DISPLAYWIDTH,YSiz=DISPLAYHEIGHT, $
        xPos=xPos,yPos=yPos
endif dispImg = bytscl(rebin(img,DISPLAYWIDTH,DISPLAYHEIGHT,Sample=1),min=0)
tvscl,dispImg if (PRINTING) then begin
   Device,/Close_File
   spawn,'lp wave.ps'
endif ;Plot the filtered image
```

```
Mar 20 09:47 1996  histseg.pro Page 6

;--------------------------
if (Not(PRINTING)) then begin
  xPos = xPos + xOffset + DISPLAYWIDTH
  windowCtr = windowCtr + 1
  window,windowCtr,Title='Gaussian Filtered Image',XSiz=DISPLAYWIDTH,YSiz=DISPLAYHEIG
        xPos=xPos, yPos=yPos
endif dispImg = bytscl(rebin(filtimg,DISPLAYWIDTH,DISPLAYHEIGHT,Sample=1),min=0)
tvscl,dispImg if (PRINTING) then begin
  Device,/Close_File
  spawn,'lp wave.ps'
endif ;Plot the ROI segmented image
;---------------------------
if (Not(PRINTING)) then begin
  xPos = xPos + xOffset + DISPLAYWIDTH
  windowCtr = windowCtr + 1
  window,windowCtr,Title='ROI Segment',XSiz=DISPLAYWIDTH,YSiz=DISPLAYHEIGHT, $
        xPos=xPos,yPos=yPos
endif dispImg = bytscl(rebin(roiImg,DISPLAYWIDTH,DISPLAYHEIGHT,Sample=1),min=0)
tvscl,dispImg if (PRINTING) then begin
  Device,/Close_file
  spawn,'lp wave.ps'
endif ;Plot the ring image
;--------------------
if (Not(PRINTING)) then begin
  xPos = xPos-+ xOffset + DISPLAYWIDTH
  windowCtr = windowCtr + 1
  window,windowCtr,Title='Cortical Ring',XSiz=DISPLAYWIDTH,YSiz=DISPLAYHEIGHT, $
        xPos=xPos,yPos=yPos
endif dispImg = bytscl(rebin(ringImg,DISPLAYWIDTH,DISPLAYHEIGHT,Sample=1),min=0)
tvscl,dispImg if (PRINTING) then begin
  Device,/Close_File
  spawn,'lp wave.ps'
endif ;Plot the composite segmented image
;----------------------------------
if (Not(PRINTING)) then begin
  xPos = 0
  yPos = yPos - yOffset - DISPLAYHEIGHT
```

```
Mar 20 09:47 1996  histseg.pro Page 7 windowCtr = windowCtr + 1
   window,windowCtr,Title='Composite Segment',XSiz=DISPLAYWIDTH,YSiz=DISPLAYHEIGHT, $
         xPos=xPos,yPos=yPos
endif dispImg = bytscl(rebin(segImg,DISPLAYWIDTH,DISPLAYHEIGHT,Sample=1),min=0)
tvscl,dispImg if (PRINTING) then begin
   Device,/Close_File
   spawn,'lp wave.ps'
endif ;Plot the histogram of pixel intensities for entire image
;--------------------------------------------------------
if (Not(PRINTING)) then begin
   xPos = xPos + xOffset + DISPLAYWIDTH
   windowCtr = windowCtr + 1
   window,windowCtr,Title='Histogram',XSiz=DISPLAYWIDTH + 100, $
         YSiz=DISPLAYHEIGHT,xPos=xPos,yPos=yPos
endif pText = StrCompress(String(roiThresh))
title = 'Histogram (ROI thresh = ' + pText + ')'
plot,hist,YRange=[0,max(hist)],Title=title,YTitle='Count',XTitle='Bin Number'
oplot,filtHist,color=60
oplot,histX(roiThresh:roiThresh),filtHist(roiThresh:roiThresh),color=60,PSym=2 if (PRINTING) then begin
   Device,/Close_File
   spawn,'lp wave.ps'
endif

;Plot the 1st deriv of histogram for entire image
;--------------------------------------------------------
if (Not(PRINTING)) then begin
   xPos = xPos + xOffset + DISPLAYWIDTH + 100
   windowCtr = windowCtr + 1
   window,windowCtr,Title='Derivative of Histogram',XSiz=DISPLAYWIDTH + 100, $
         YSiz=DISPLAYHEIGHT,xPos=xPos,yPos=yPos
endif plot,histPrime,YRange=[-10,10],Title='1st Derivative of Histogram', $
      YTitle='dCount/dBin',XTitle='Bin Number'
oplot,filtHistPrime,color=60
oplot,histX(roiThresh:roiThresh),filtHistPrime(roiThresh:roiThresh),color=60,PSym=2 if (PRINTING) then begin
   Device,/Close_File
   spawn,'lp wave.ps'
endif

;Plot the cortical statistic showing clustering
;--------------------------------------------------------
if (Not(VERTEBRA)) then begin
   if (Not(PRINTING)) then begin
```

B-13/2

```
Mar 20 09:47 1996  histseg.pro Page 8 xPos = 0
    yPos = yPos - yOffset - DISPLAYHEIGHT
    windowCtr = windowCtr + 1
    window,windowCtr,Title='Cortical Stat',XSiz=DISPLAYWIDTH + 100, $
        YSiz=DISPLAYHEIGHT,xPos=xPos,yPos=yPos
  endif plot, corticalStat,Psym=3,XTitle='Pixel',YTitle='Cortical Index'
  xPlot = FltArr(1)
  yPlot = FltArr(1)
  for i=0, roiCount-1 do begin
    xplot(0) = i
    yplot(0) = corticalStat(i)
    if (clusters(i) EQ 2) then begin
      oplot,xPlot,yPlot,Psym=3,Color=60
    endif
    if (clusters(i) EQ 3) then begin
      oplot,xPlot,yPlot,Psym=3,Color=60
    endif
  endfor; i
endif ;Plot the dist vs. the intensity for in ring pixels
;----------------------------------------------------
if (Not(VERTEBRA)) then begin
  if (Not(PRINTING)) then begin
    xPos = xPos + xOffset + DISPLAYWIDTH + 100
    windowCtr = windowCtr + 1
    window,windowCtr,Title='Distance vs. Intensity',XSiz=DISPLAYWIDTH + 100, $
        YSiz=DISPLAYHEIGHT,xPos=xPos,yPos=yPos
  endif plot, innerIntensities, innerDistances, XTitle='Intensity', $
      YTitle='Distance^2', Psym=3, $
      YRange=[-10,max(innerDistances)]

xPlot = FltArr(1)
  yPlot = FltArr(1)
  for i=0, roiCount-1 do begin
    if ((clusters(i) EQ 2) OR (clusters(i) EQ 3)) then begin
      xPlot(0) = innerIntensities(i)
      yPlot(0) = innerDistances(i)
      oplot, xPlot,yPlot, Psym=3,color=60
    endif
  endfor; i if (PRINTING) then begin
    Device,/Close_File
    spawn,'lp wave.ps'
  endif
endif ;Flicker between original image and segmented image
;----------------------------------------------------
if ((NUMFLICKERS GT 0) AND (Not(PRINTING))) then begin
  windowCtr = windowCtr + 1
```

B-14/1

```
Mar 20   17 1996  histseg.pro Page 9 window,windowCtr,Title='Flicker Animation',XSiz=DISPLAYWIDTH, $
          YSiz=DISPLAYHEIGHT
   for i=1,NUMFLICKERS do begin
      dispImg = bytscl(rebin(img,DISPLAYWIDTH,DISPLAYHEIGHT,Sample=1),min=0)
      tvscl,dispImg
      wait, 0.5
      dispImg = bytscl(rebin(segImg,DISPLAYWIDTH,DISPLAYHEIGHT,Sample=1),min=0)
      tvscl,dispImg
      wait, 0.5
   endfor; i
endif ;Output images and data for manuscript if specified
;------------------------------------------------------
if (MANUSCRIPTOUTPUT) then begin
  ;Output orig image for manuscript
  manuscriptImg = IntArr(256,256)
  manuscriptImg = fix(rebin(byteImg,256,256,Sample=1))
  openw,unit,'orig.img',/Get_Lun
  writeu,unit,manuscriptImg
  free_lun,unit ;Output filtered image for manuscript
  manuscriptImg = IntArr(256,256)
  manuscriptImg = fix(rebin(bytscl(filtImg),256,256,Sample=1))
  openw,unit,'filt.img',/Get_Lun
  writeu,unit,manuscriptImg
  free_lun,unit ;Output WBROI for manuscript
  manuscriptImg = IntArr(256,256)
  manuscriptImg = fix(rebin(roiImg,256,256,Sample=1))
  openw,unit,'roi.img',/Get_Lun
  writeu,unit,manuscriptImg
  free_lun,unit ;Output ring image for manuscript
  manuscriptImg = IntArr(256,256)
  manuscriptImg = fix(rebin(ringImg,256,256,Sample=1))
  openw,unit,'ring.img',/Get_Lun
  writeu,unit,manuscriptImg
  free_lun,unit ;Output segmented image for manuscript
  manuscriptImg = IntArr(256,256)
  manuscriptImg = fix(rebin(segImg,256,256,Sample=1))
  openw,unit,'seg.img',/Get_Lun
  writeu,unit,manuscriptImg
  free_lun,unit if (Not(VERTEBRA)) then begin
    ; Output histogram data for manuscript
    sz=size(hist)
    len=sz(1)
    openw,unit,'hist.dat',/Get_Lun
    for i=0,len - 1 do begin
```

B-14/2

```
Mar 20 09:47 1996  histseg.pro Page 10 printf,unit,string(histX(i)),string(hist(i)),string(filtHist(i))
    endfor; i
    close,unit ; Output region grow data for manuscript
    openw,unit,'cortStat.dat',/Get_Lun
    for i=0,roiCount - 1 do begin
      printf,unit,string(i),string(corticalStat(i)),clusters(i),innerIntensities(i),i
    endfor; i
    close,unit
  endif
endif ;exit End; HistSeg
```

B-15/1

```
Feb 16 17:11 1996  largestobject.pro Page 1

Pro LargestObject,image,numNbrs
;****************************************************
;* Generates a binary image where the largest       *
;* object plus any interior holes are set to 1      *
;* and all other pixels are set to 0.               *
;*                                                  *
;* image:                                           *
;* image to identify largest object in              *
;*                                                  *
;* numNbrs:                                         *
;* connectedness (4 or 8)                           *
;****************************************************
@common if ((numNbrs NE 4) AND (numNbrs NE 8)) then begin
  WriteLogFile, '*** Error: LargestObject: numNbrs must be 4 or 8'
endif imageCopy = fix(image)

;Flag lit pixels as to be classified
;-----------------------------------
index = where(imageCopy EQ 1.0, count)
if (count GT 0) then begin
  imageCopy(index) = -9
endif ;Classify the lit pixels
;-----------------------
finished = 0
objectNum = 1
while (Not(finished)) do begin
  index = where(imageCopy LT 0,count)
  if (count GT 0) then begin
    row = index(0) / IMAGEWIDTH
    col = index(0) - (row * IMAGEWIDTH)
    ClassifyNeighbors,imageCopy,objectNum,row,col,numNbrs
    objectNum = objectNum + 1
  endif else begin
    finished = 1
  endelse
endwhile numObjects = objectNum - 1

;Find the largest connected object
;---------------------------------
maxCount = 0
maxObject = 0
for i=1,numObjects do begin
  index = where(imageCopy EQ i,count)
  if (count GT maxCount) then begin
    maxCount = count
    maxObject = i
  endif
endfor; i
```

B-15/2

```
Feb 16 17:11 1996  largestobject.pro Page 2 image(*,*) = 0
image(where(imageCopy EQ maxObject)) = 1

;Find the rectangle that encompasses the object
;--------------------------------------------------
rectImage = IntArr(IMAGEWIDTH,IMAGEHEIGHT)

index = where(image EQ 1,count)

minRow = IMAGEWIDTH + IMAGEHEIGHT
maxRow = -1
minCol = IMAGEWIDTH + IMAGEHEIGHT
maxCol = -1
for i=0,count - 1 do begin
   row = index(i) / IMAGEWIDTH
   col = index(i) - (row * IMAGEWIDTH)
   if (row LT minRow) then minRow = row
   if (row GT maxRow) then maxRow = row
   if (col LT minCol) then minCol = col
   if (col GT maxCol) then maxCol = col
endfor; i rectImage(minCol:maxCol,minRow:maxRow) = 1

;--------------------------------------------------
;| Make any interior holes of imageCopy lit |
;--------------------------------------------------
invertedImage = Fix(image)

invertedImage(where(invertedImage EQ 1)) = 2
invertedImage(where(invertedImage EQ 0)) = 1
invertedImage(where(invertedImage EQ 2)) = 0 invertedImage = invertedImage * rectImage

;Classify the lit pixels
;------------------------
index = where(invertedImage EQ 1,count)
if (count GT 0) then begin
   invertedImage(index) = -9
endif else begin
   invertedImage(*,*) = 0
endelse finished = 0
objectNum = 1
while (Not(finished)) do begin
   index = where(invertedImage LT 0,count)
   if (count GT 0) then begin
      row = index(0) / IMAGEWIDTH
      col = index(0) - (row * IMAGEWIDTH)
      ClassifyNeighbors,invertedImage,objectNum,row,col,numNbrs
      objectNum = objectNum + 1
   endif else begin
      finished = 1
```

B-16/1

```
Feb 16 17:11 1996  largestobject.pro Page 3 endelse
  endwhile numObjects = objectNum - 1

;Eliminate any objects touching the encompassing rectangle
  ;----------------------------------------------------------
  for i=1,numObjects do begin
    index = where(invertedImage EQ i,count)
    touchingBackground = 0
    for j=0,count-1 do begin
      row = index(j) / IMAGEWIDTH
      col = index(j) - (row * IMAGEWIDTH)
      if ((row EQ minRow) or (row EQ maxRow)) then touchingBackground = 1
      if ((col EQ minCol) or (col EQ maxCol)) then touchingBackground = 1
    endfor; j
    if (touchingBackground) then begin
      invertedImage(index) = 0.0
    endif
  endfor; i index = where(invertedImage GT 0,count)
  if (count GT 0) then begin
    invertedImage(index) = 1
  endif ;Make smaller objects (holes) lit
  ;--------------------------------
  index = where(invertedImage EQ 1,count)
  if (count GT 0) then begin
    image(index) = 1
  endif End; LargestObject
```

```
Feb 07 08:03 1996  percentile.pro Page 1

Function Percentile,x,p
; ****************************************************
; * Computes the perCent percentile of the data      *
; * array x. 100th percentile is the max,            *
; * 0th percentile is the min, 50th percentile       *
; * is the median.                                   *
; *                                                  *
; * x:                                               *
; * The data array to find the percentile of         *
; *                                                  *
; * p:                                               *
; * The percentile to find (e.g. 25,40,50)           *
; **************************************************** sz = size(x)
n = sz(1)

sortIndex = sort(x)

if (p LE 0.0) then begin
   return, x(sortIndex(0))
endif if (p GE 100.0) then begin
   return, x(sortIndex(n - 1))
endif rankNum = float(p) / 100.0 * (float(n) + 1)

i = fix(rankNum)
f = rankNum - i centile = (1 - f) * x(sortIndex(i - 1)) + (f) * x(sortIndex(i))

return, centile

End; Percentile
```

```
Jan 15 09:04 1996  perimeter.pro Page 1

Function Perimeter,image,numNeighbors
;****************************************************
;* Computes the perimeter of all objects in an      *
;* image.                                           *
;*                                                  *
;* Objects are defined as pixels = 1.               *
;* Background is defined as pixels = 0.             *
;*                                                  *
;* Perimeter is the sum of all pixels that have     *
;* 1 or more of their numNeighbors                  *
;* equal to 0.                                      *
;*                                                  *
;* The outer 1 pixel border of the image is         *
;* ignored.                                         *
;*                                                  *
;* image:                                           *
;* Array representing image (int,byte,float)        *
;* binary image 1=objects, 0=background             *
;*                                                  *
;* numNeighbors:                                    *
;* Neighbor definition (must be either 4 or 8)      *
;****************************************************
@common perim = 0 for row=1,IMAGEWIDTH-2 do begin
  for col=1,IMAGEHEIGHT-2 do begin

Case numNeighbors Of
      4: Begin
        if (image(row,col) EQ 1) then begin
          edgeCand = 0
          if (image(row-1,col) EQ 0) then begin
            edgeCand = 1
          endif
          if (image(row+1,col) EQ 0) then begin
            edgeCand = 1
          endif
          if (image(row,col-1) EQ 0) then begin
            edgeCand = 1
          endif
          if (image(row,col+1) EQ 0) then begin
            edgeCand = 1
          endif
          if (edgeCand) then begin
            perim = perim + 1
          endif
        endif
      End 8: Begin
        if (image(row,col) EQ 1) then begin
          index=where(image(row-1:row+1,col-1:col+1) EQ 1,count)
          if (count LT numNeighbors) then begin
            perim = perim + 1
```

```
Jan 15 09:04 1996   perimeter.pro Page 2 endif
         endif
      End

Else: Begin
            perim = 0
         End

EndCase endfor; col
endfor; row return,perim

End; Perimeter
```

```
Mar 09 13:50 1994  roithreshold.pro Page 1

Function ROIThreshold,image
;*****************************************************
;* Computes the region of interest (ROI)              *
;* threshold for an image.  This threshold is         *
;* found by looking at the derivative of the          *
;* histogram of pixel intensities of a filtered       *
;* image.                                             *
;* The ROI threshold is defined as the pixel          *
;* intensity of the rightmost 3 sigma of the          *
;* histogram mode attributed to tissue and            *
;* marrow.                                            *
;* All pixels above the ROI threshold are             *
;* assumed to be cortical, partial volume             *
;* average, or trabecular.                            *
;*                                                    *
;* image:                                             *
;* Array representing the image (byte)                *
;*****************************************************
@common ;Histogram the pixel intensities of the image
;----------------------------------------------
hist = histogram(image,BinSize=HISTBINSIZE,Min=HISTMIN)
sz = size(hist)
len = sz(1)
histX = findgen(len)

filtHist = smooth(hist,HISTSMOOTHLENGTH)

;Find the derivative of the histogram
;-------------------------------------
histPrime = deriv(filtHist)
filtHistPrime = smooth(histPrime,HISTSMOOTHLENGTH)

;Find the threshold for ROI segmentation
;----------------------------------------
threshIndex = -999
derivThresh = -0.65
runLen = 5
;Start searching in left half of plane only
i = fix(len / 2)
while (threshIndex EQ -999) do begin
  i = i - 1
  negDeriv = 1
  for j=0,runLen-1 do begin
    if (filtHistPrime(i-j) GT derivThresh) then begin
      negDeriv = 0
    endif
  endfor; j
  if (negDeriv EQ 1) then begin
    threshIndex = i
  endif
endwhile roiThresh = -999
derivThresh = -0.5
```

```
Mar 09 13:50 1996  roithreshold.pro Page 2 while (roiThresh EQ -999) do begin
   if (filtHistPrime(threshIndex) GT derivThresh) then begin
      roiThresh = threshIndex
   endif
   threshIndex = threshIndex + 1
endwhile return, roiThresh End; ROIThreshold
```

B-19/1

```
Jan 13 09:23 1996  writelogfile.pro Page 1

Pro WriteLogFile, message
;****************************************************
;* Writes message out to LOGFILE with a              *
;* timestamp.                                        *
;*                                                   *
;* message:                                          *
;* String value to write to LOGFILE                  *
;****************************************************
@common t = Systime()
timeString = Strmid(t, 0, Strlen(t) - 1)

Openw, unit, LOGFILE, /Append, /Get_Lun
Printf, unit, timeString + ' ' + message
Close, unit End; WriteLogFile
```

B-19/2

We claim:

1. A computer implemented image processing method for identifying and measuring distinct portions of an image representing a target anatomical region which is examined for medical diagnosis, said method including the steps of:

obtaining an image and converting the image into an array of pixel intensity values representing the image;

threshholding by determining a threshold intensity value for the distinct portions of the image to be identified in the anatomical region;

augmenting the array of pixel intensity values using the threshold value in performing an augmenting operation, the augmenting operation selected from the set of operations including dilations and region growing, said augmenting step being performed until a region of the array is identified which satisfies logical constraints of the target anatomical region;

affiliating each pixel in the array with a region according to the initial intensity value of each pixel and the identified region to designate whether each pixel is part of the target anatomical region; and calculating measured values of the target anatomical region based on the affiliation of each pixel.

2. The method of claim 1 wherein said thresholding step includes the step of ascertaining the 50th percentile intensity value of the pixels of the array as the threshold value.

3. The method of claim 1 wherein said affiliating step includes an updating step, said updating step identifying boundary pixels located on the border of the identified region, said updating step comparing each intensity value of each boundary pixel in the identified region with intensity values of pixels outside the identified region, and said updating step changing the affiliation of a pixel if the value of the boundary pixel lies on the same side of the threshold value as an adjacent pixel outside the identified region.

4. The method of claim 1 wherein said calculating step includes determining dimensions of the identified anatomical region.

5. The method of claim 1 wherein said calculating step includes performing statistical analysis on a set of pixels affiliated with the identified anatomical region.

6. The method of claim 1 wherein the target anatomical region includes the femora and tibiae bones, and said affiliating step includes affiliating each pixel with one of a background region, a cortical region, and a trabecular region.

7. The method of claim 6 wherein the cortical region has a logical constraint requiring that the cortical region must be spatially connected and surround the trabecular region.

8. The method of claim 7 wherein said augmenting step includes designating a protected fence of cortical pixels which are not changed during said augmenting step.

9. The method of claim 1 wherein the anatomical region includes the femora, tibiae, and vertebra bones, and said threshold determining step includes segmenting the image by associating each pixel with one of a background region and a whole bone region.

10. The method of claim 9 wherein said augmenting step includes separating the whole bone region into a cortical region and a non-cortical region, with the cortical region defining a trabecular sub-region, and the trabecular sub-region defining a spine sub-region and a centrum sub-region.

11. The method of claim 10 wherein said augmenting step includes determining a cortical ring by performing an erosion operation on pixels of the original whole bone region to create an eroded whole bone region, and specifying the cortical ring by subtracting the eroded whole bone region from the original whole bone region.

12. The method of claim 11 wherein said augmenting step includes determining the cortical region by calculating a cortical index for each pixel within the cortical ring, the cortical index being a ratio of the intensity of a given pixel to the distance of the given pixel from the cortical ring, said augmenting step determining the cortical region by comparing the cortical index of each pixel with a predetermined value.

13. The method of claim 10 wherein the cortical region has a logical constraint requiring that the cortical region must be spatially connected and surround the trabecular sub-region.

14. The method of claim 13 wherein after the cortical region and the trabecular sub-region are determined, the spinal sub-region is determined within the trabecular sub-region by identifying pixels having an intensity value below the threshold value.

15. The method of claim 14 wherein the pixels associated with the trabecular sub-region are subject to a region growing operation to form a spatially connected spinal sub-region within the trabecular sub-region.

16. The method of claim 15 wherein the centrum sub-region is determined as being adjacent to the spinal sub-region and bounded by the cortical region and eigenvectors determined by the spinal sub-region.

17. The method of claim 1 wherein said calculating step includes determining content in the identified region by the pixel intensity values associated with the pixels in the identified region.

18. An image processing system for identifying and measuring distinct portions of an image representing a target anatomical region which is examined for medical diagnosis, said system including:

means for obtaining an image of the target anatomical region;

means for converting the image into an array of pixel intensity values representing the image;

threshholding means for determining a threshold intensity value for the distinct portions of the image to be identified in the anatomical region;

means for augmenting said array of pixel intensity values using the threshold value in performing an augmenting operation, the augmenting operation selected from the set of operations including dilations and region growing, said augmenting means performing the augmenting operations until a region of said array is identified which satisfies logical constraints of the target anatomical region;

means for affiliating each pixel in said array with a region according to the initial intensity value of each pixel and the identified region to designate whether each pixel is part of the target anatomical region; and means for calculating measured values of the target anatomical region based on the affiliation of each pixel.

19. The system of claim 18 wherein said thresholding means includes means for ascertaining the 50th percentile intensity value of the pixels of the array as the threshold value.

20. The system of claim 18 wherein said affiliating means includes updating means for identifying boundary pixels located on the border of the identified region, said updating means further comparing each intensity value of each boundary pixel in the identified region with intensity values of pixels outside the identified region, and said updating means changing the affiliation of a pixel if the value of the boundary pixel lies on the same side of the threshold value as an adjacent pixel outside the identified region.

21. The system of claim 18 wherein said calculating means includes means for determining dimensions of the identified anatomical region.

22. The system of claim 18 wherein said calculating means includes statistical analysis means for statistically analyzing a set of pixels affiliated with the identified anatomical region.

23. The system of claim 18 wherein the target anatomical region includes the femora and tibiae bones, and said affiliating means includes means for affiliating each pixel with one of a background region, a cortical region, and a trabecular region.

24. The system of claim 23 wherein said augmenting means utilizes a cortical region logical constraint requiring that the cortical region must be spatially connected and surround the trabecular region.

25. The system of claim 24 wherein said augmenting means includes means for designating a protected fence of cortical pixels which are not changed by said augmenting means.

26. The system of claim 18 wherein the anatomical region includes the femora, tibiae, and vertebra bones, and said threshold determining means includes means for segmenting the image by associating each pixel with one of a background region and a whole bone region.

27. The method of claim 26 wherein said augmenting means includes means for separating the whole bone region into a cortical region and a non-cortical region, with the cortical region defining a trabecular sub-region, and the trabecular sub-region defining a spine sub-region and a centrum sub-region.

28. The method of claim 27 wherein said augmenting means includes means for determining a cortical ring by performing an erosion operation on pixels of the original whole bone region to create an eroded whole bone region, and means for specifying the cortical ring by subtracting the eroded whole bone region from the original whole bone region.

29. The system of claim 28 wherein said augmenting means includes means for determining the cortical region by calculating a cortical index for each pixel within the cortical ring, the cortical index being a ratio of the intensity of a given pixel to the distance of the given pixel from the cortical ring, said augmenting means determining the cortical region by comparing the cortical index of each pixel with a predetermined value.

30. The system of claim 27 wherein said augmenting means utilizes a cortical region logical constraint requiring that the cortical region must be spatially connected and surround the trabecular sub-region.

31. The system of claim 30 wherein after the cortical region and the trabecular sub-region are determined, the spinal sub-region is determined within the trabecular sub-region by identifying pixels having an intensity value below the threshold value.

32. The system of claim 31 wherein said augmenting means includes means for subjecting the pixels associated with the trabecular sub-region to a region growing operation to form a spatially connected spinal sub-region within the trabecular sub-region.

33. The system of claim 32 wherein said augmenting means determines the centrum sub-region as being adjacent to the spinal sub-region and bounded by the cortical region and eigenvectors determined by the spinal sub-region.

34. The system of claim 18 wherein said calculating means includes means for determining content in the identified region by the pixel intensity values associated with the pixels in the identified region.

35. An image processing system for identifying and measuring distinct portions of an image representing a target anatomical region which is examined for medical diagnosis, said system including:
    a medical imaging device capable of providing an image of the target anatomical region; and
    a computer having a processor and a program, said program including a plurality of sets of instructions:
        a first set of instructions enabling said computer to convert the image into an array of pixel intensity values representing the image;
        a second set of instructions enabling said computer to determine a threshold intensity value for the distinct portions of the image to be identified in the anatomical region;
        a third set of instructions enabling said computer to augment said array of pixel intensity values using the threshold value in performing an augmenting operation, the augmenting operation selected from the set of operations including dilations and region growing, said augmenting operation being performed until a region is identified which satisfies logical constraints of the target anatomical region;
        a fourth set of instructions enabling said computer to affiliate each pixel in said array with a region according to the initial intensity value of each pixel and the identified region to designate whether each pixel is part of the target anatomical region; and
        a fifth set of instructions enabling said computer to calculate measured values of the target anatomical region based on the affiliation of each pixel.

36. The system of claim 35 wherein said second set of instructions includes instructions which enable said computer to ascertain the 50th percentile intensity value of the pixels of the array as the threshold value.

37. The system of claim 35 wherein said fourth set of instructions includes instructions enabling said computer to identify boundary pixels located on the border of the identified region, instructions enabling said computer to compare each intensity value of each boundary pixel in the identified region with intensity values of pixels outside the identified region, and instructions enabling said computer to change the affiliation of a pixel if the value of the boundary pixel lies on the same side of the threshold value as an adjacent pixel outside the identified region.

38. The system of claim 35 wherein said fifth set of instructions includes instructions to determine dimensions of the identified anatomical region.

39. The system of claim 35 wherein said fifth set of instructions includes instructions enabling said computer to statistically analyze a set of pixels affiliated with the identified anatomical region.

40. The system of claim 35 wherein the target anatomical region includes the femora and tibiae bones, and said fourth set of instructions includes instructions enabling said computer to affiliate each pixel with one of a background region, a cortical region, and a trabecular region.

41. The system of claim 40 wherein said third set of instructions includes instructions enabling said computer to impose a cortical region logical constraint requiring that the cortical region must be spatially connected and surround the trabecular region.

42. The system of claim 41 wherein said third set of instructions includes instructions enabling said computer to designate a protected fence of cortical pixels which are not changed by an augmenting operation.

43. The system of claim 35 wherein the anatomical region includes the femora, tibiae, and vertebra bones, and said second set of instructions includes instructions enabling said computer to segment the image by associating each pixel with one of a background region and a whole bone region.

44. The method of claim 43 wherein said fourth set of instructions includes instructions enabling said computer to separate the whole bone region into a cortical region and a non-cortical region, with the cortical region defining a trabecular sub-region, and the trabecular sub-region defining a spine sub-region and a centrum sub-region.

45. The method of claim 44 wherein said fourth set of instructions includes instructions to determine a cortical ring by performing an erosion operation on pixels of the original whole bone region to create an eroded whole bone region, and instructions enabling said computer to specify the cortical ring by subtracting the eroded whole bone region from the original whole bone region.

46. The system of claim 45 wherein said fourth set of instructions includes instructions enabling said computer to determine the cortical region by calculating a cortical index for each pixel within the cortical ring, the cortical index being a ratio of the intensity of a given pixel to the distance of the given pixel from the cortical ring, said fourth set of instructions enabling said computer to determine the cortical region by comparing the cortical index of each pixel with a predetermined value.

47. The system of claim 46 wherein said fourth set of instructions includes instructions enabling said computer to utilize a cortical region logical constraint requiring that the cortical region must be spatially connected and surround the trabecular sub-region.

48. The system of claim 47 wherein after the cortical region and the trabecular sub-region are determined, said fourth set of instructions enables said computer to determine the spinal sub-region within the trabecular sub-region by identifying pixels having an intensity value below the threshold value.

49. The system of claim 48 wherein said fourth set of instructions includes instructions enabling said computer to subject the pixels associated with the trabecular sub-region to a region growing operation to form a spatially connected spinal sub-region within the trabecular sub-region.

50. The system of claim 47 wherein said fourth set of instructions includes instructions enabling said computer to determine the centrum sub-region as being adjacent to the spinal sub-region and bounded by the cortical region and eigenvectors determined by the spinal sub-region.

51. The system of claim 35 wherein said fifth set of instructions includes instructions enabling said computer to determine content in the identified region by the pixel intensity values associated with the pixels in the identified region.

52. An image processing system for identifying and measuring distinct portions of an image representing a target anatomical region which is examined for medical diagnosis, said system including:

a medical imaging device capable of providing image data relating to the target anatomical region; and a computer having a processor and a program, said program including a first plurality of instructions enabling said computer to perform contextual segmentation on said image data, said program including a second plurality of instructions enabling said computer to determine characteristics of the target anatomical region based on said image data and a statistical compilation of previous image data.

* * * * *